US012793154B1

(12) United States Patent
Tilton

(10) Patent No.: US 12,793,154 B1
(45) Date of Patent: Nov. 10, 2026

(54) METHODS AND SYSTEMS FOR PROVIDING PATENT TECH USING MACHINE LEARNING AND ADAPTIVE TRAVERSAL

(71) Applicant: Noah Kevin Tilton, Mahomet, IL (US)

(72) Inventor: Noah Kevin Tilton, Mahomet, IL (US)

(73) Assignee: TILTON LABS LLC, Sheridan, WY (US)

( * ) Notice: Subject to any disclaimer, the term of this patent is extended or adjusted under 35 U.S.C. 154(b) by 0 days.

(21) Appl. No.: 19/080,777

(22) Filed: Mar. 14, 2025

Related U.S. Application Data

(60) Provisional application No. 63/565,513, filed on Mar. 14, 2024.

(51) Int. Cl.
*G06Q 50/18* (2012.01)
*G06F 40/103* (2020.01)
*G06Q 10/047* (2023.01)

(52) U.S. Cl.
CPC ......... *G06Q 50/184* (2013.01); *G06F 40/103* (2020.01); *G06Q 10/047* (2013.01)

(58) Field of Classification Search
CPC ................ G06Q 50/184; G06Q 10/047; G06F 40/103
See application file for complete search history.

(56) References Cited

U.S. PATENT DOCUMENTS 10,747,953 B1 * 8/2020 Priyadarshi ........... G06F 40/103
2003/0065637 A1 * 4/2003 Glasgow ................ G06Q 10/10
2010/0131715 A1 * 5/2010 Gould ..................... G06F 40/18 711/129
2013/0185632 A1 * 7/2013 Damera-Venkata ......................... G06F 40/186 715/243
2013/0339257 A1 * 12/2013 Milton, Jr. ............. G06Q 10/10 705/310

(Continued)

OTHER PUBLICATIONS

Lee, J. S. (Oct. 2020). Controlling patent text generation by structural metadata. In Proceedings of the 29th ACM international conference on information & knowledge management (pp. 3241-3244). (Year: 2020).*

(Continued)

*Primary Examiner* — John S. Wasaff
(74) *Attorney, Agent, or Firm* — Noah K. Tilton

(57) ABSTRACT

An artificial intelligence (AI)-based system and method automatically generates patent documents by processing multimodal input data comprising invention disclosures, prosecution arguments, or litigation information. The system analyzes input using trained AI models to identify inventive concepts and logical sections of patent documents, creating a dependency-aware graph structure representing logical dependencies among document sections. An adaptive traversal algorithm dynamically determines an optimized sequence for generating these sections, automatically updating the sequence based on user modifications. Generated sections are displayed in an interactive graphical user interface that propagates user edits across dependent sections in real-time. Additional features may include retrieving and integrating relevant prior art, applying user-specific drafting styles via trained style transfer models, providing real-time feedback to address drafting inconsistencies or claim ambiguities, continuously retraining AI models based on user interactions, and automatically translating and formatting document sections according to jurisdiction-specific patent requirements.

22 Claims, 32 Drawing Sheets

(56) References Cited

U.S. PATENT DOCUMENTS

| | | | | |
|---|---|---|---|---|
| 2018/0232361 | A1* | 8/2018 | Schick | G06F 40/137 |
| 2018/0239507 | A1* | 8/2018 | Bui | G06F 3/0482 |
| 2019/0057074 | A1* | 2/2019 | Carey | G06F 16/3344 |
| 2019/0377780 | A1* | 12/2019 | Carey | G06F 40/143 |
| 2020/0043112 | A1* | 2/2020 | Brinkley, II | G06N 20/00 |
| 2020/0089755 | A1* | 3/2020 | Shazeer | G06N 3/08 |
| 2020/0272692 | A1* | 8/2020 | Maan | G06F 40/30 |
| 2021/0383492 | A1* | 12/2021 | Mikami | G06Q 50/18 |
| 2022/0075929 | A1* | 3/2022 | Booth | G06F 40/284 |
| 2022/0075962 | A1* | 3/2022 | Kovarík | G06F 16/353 |
| 2022/0360544 | A1* | 11/2022 | Mingels | G06F 16/9024 |
| 2023/0252224 | A1* | 8/2023 | Tran | G06F 40/56<br>715/256 |
| 2024/0220714 | A1* | 7/2024 | Ehrlich | G06F 40/123 |
| 2025/0217910 | A1* | 7/2025 | Kretzer-katzir | G06Q 50/184 |

OTHER PUBLICATIONS

Wang, Q., Ni, S., Liu, H., Lu, S., Chen, G., Feng, X., . . . & Yang, M. (2024). Autopatent: a multi-agent framework for automatic patent generation. arXiv preprint arXiv:2412.09796. (Year: 2024).*

* cited by examiner

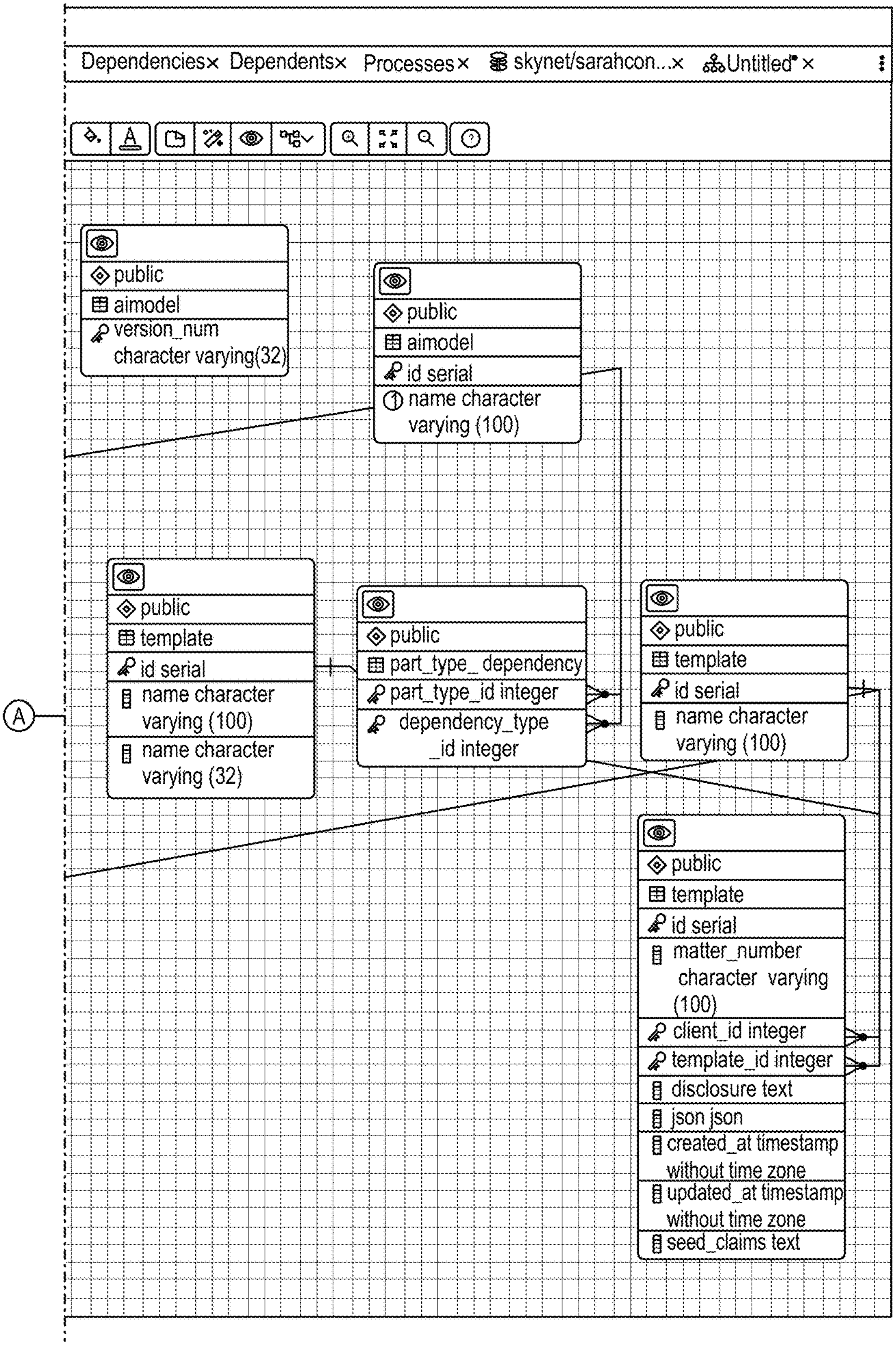
FIG. 3 (Cont...)

410

Template name

Submit

Skynet patent application

Parts

| | Part Name | Prompt Text | System Text | | |
|---|---|---|---|---|---|
| 1 | Title | CLAIMS<br>@@@<br>{independent_claims}<br>@@@<br>EXAMPLES<br>@@@<br>Apparatus, system, and method for managing commands of solid-state<br>@@@ | You are a helpful and intelligent patent attorney with decades of experience.<br>You will draft a descriptive patent title of no more than 500 characters based on the patent claims ("CLAIMS") delimited by triple AT symbols (@@@). | | 412 |
| 2 | Field of the invention | CLAIMS<br>@@@<br>@{claims}<br>@@@ | You are a helpful and intelligent patent attorney with decades of experience You will draft a field of the invention. You will be provided with a number of claims ("CLAIMS") delimited by triple AT symbols (@@@). You will write the brief | | |
| 3 | Background | DISCLOSURE<br>@@@<br>@{disclosure}<br>@@@ | You are a helpful and intelligent patent attorney with decades of experience You will draft a background description for a given invention disclosure ("DISCLOSURE"), delimited by triple AT symbols (@@@). | | |

A

FIG. 4B

A

| | Part Name | Prompt Text | System Text |
|---|---|---|---|
| 4 | Brief Summary of the Inven | INDEPENDENT CLAIMS<br>@@@<br>@{independent_claims}<br>@@@ | You are a helpful and intelligent patent attorney with decades of experience. You will draft a brief summary of the invention.<br><br>The brief summary corresponds directly to independent claims, a |
| 5 | Brief Description of the Dra | @@@<br>@{indexed_parts}<br>@@@ | You are a helpful and intelligent patent attorney with decades of experience.<br><br>You will draft a brief description of the drawings consisting of single-sentence figure descriptions for patent figures based on |
| 6 | Detailed description - intro | CLAIMS<br>@@@<br>@{claims}<br>@@@<br><br>DISCLOSURE<br>@@@<br>@{disclosure}<br>@@@ | You are a helpful and intelligent patent attorney with decades of experience. You will draft an introduction to a detailed description of a patent application based on a set of patent claims ("CLAIMS") and a disclosure document |

B

FIG. 4B (Cont...)

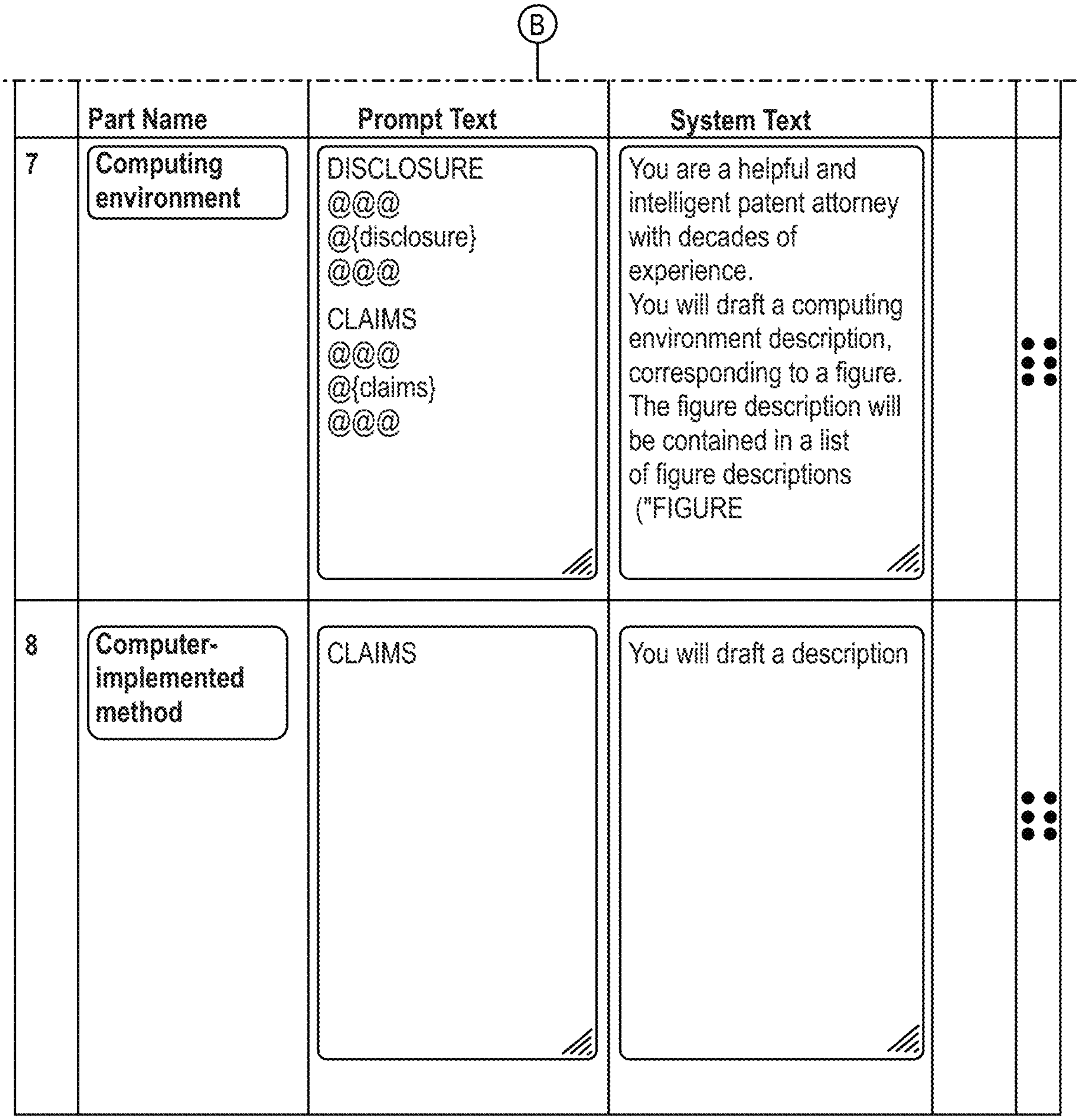
FIG. 4B (Cont...)

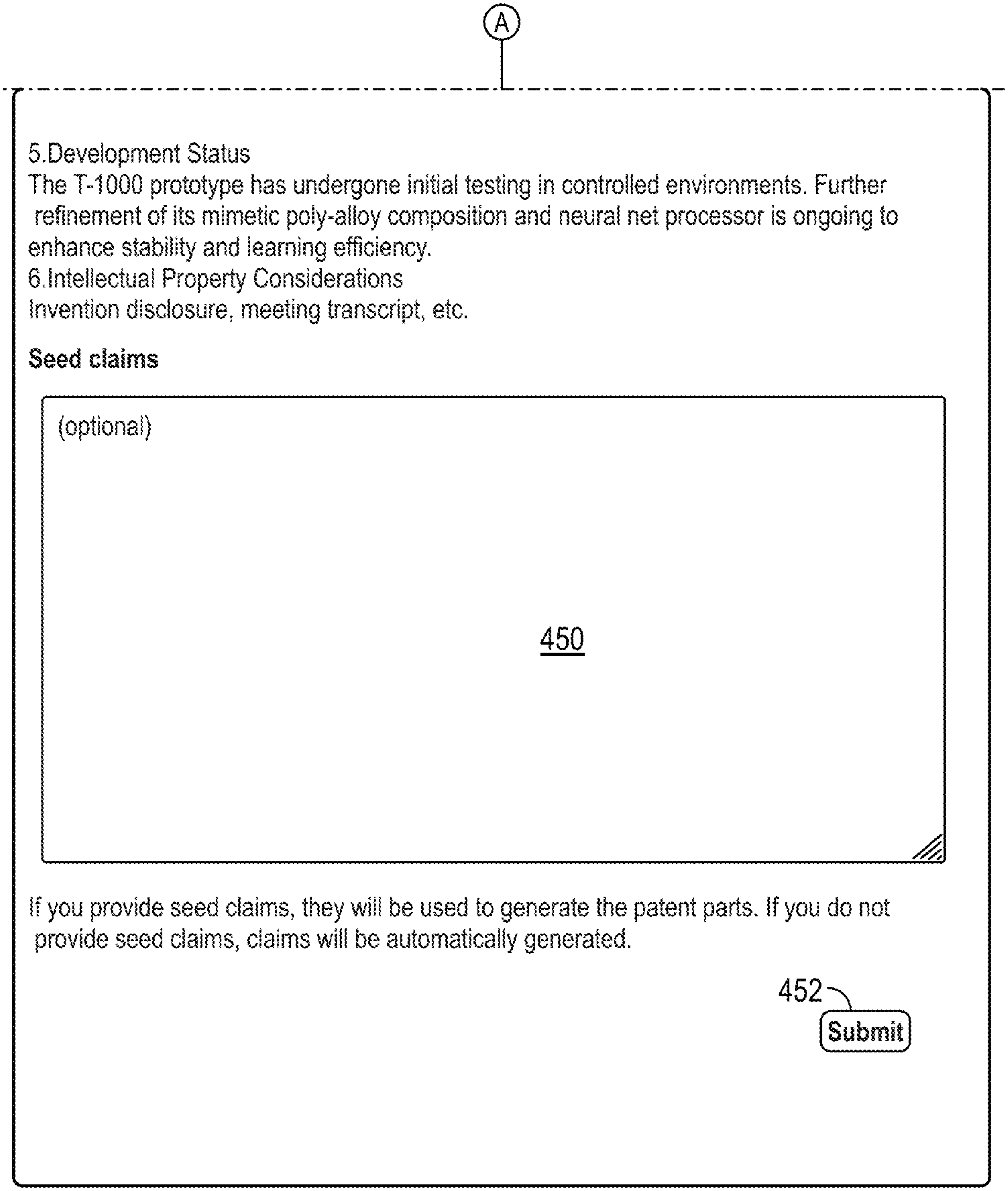
FIG. 4E (Cont..)

460

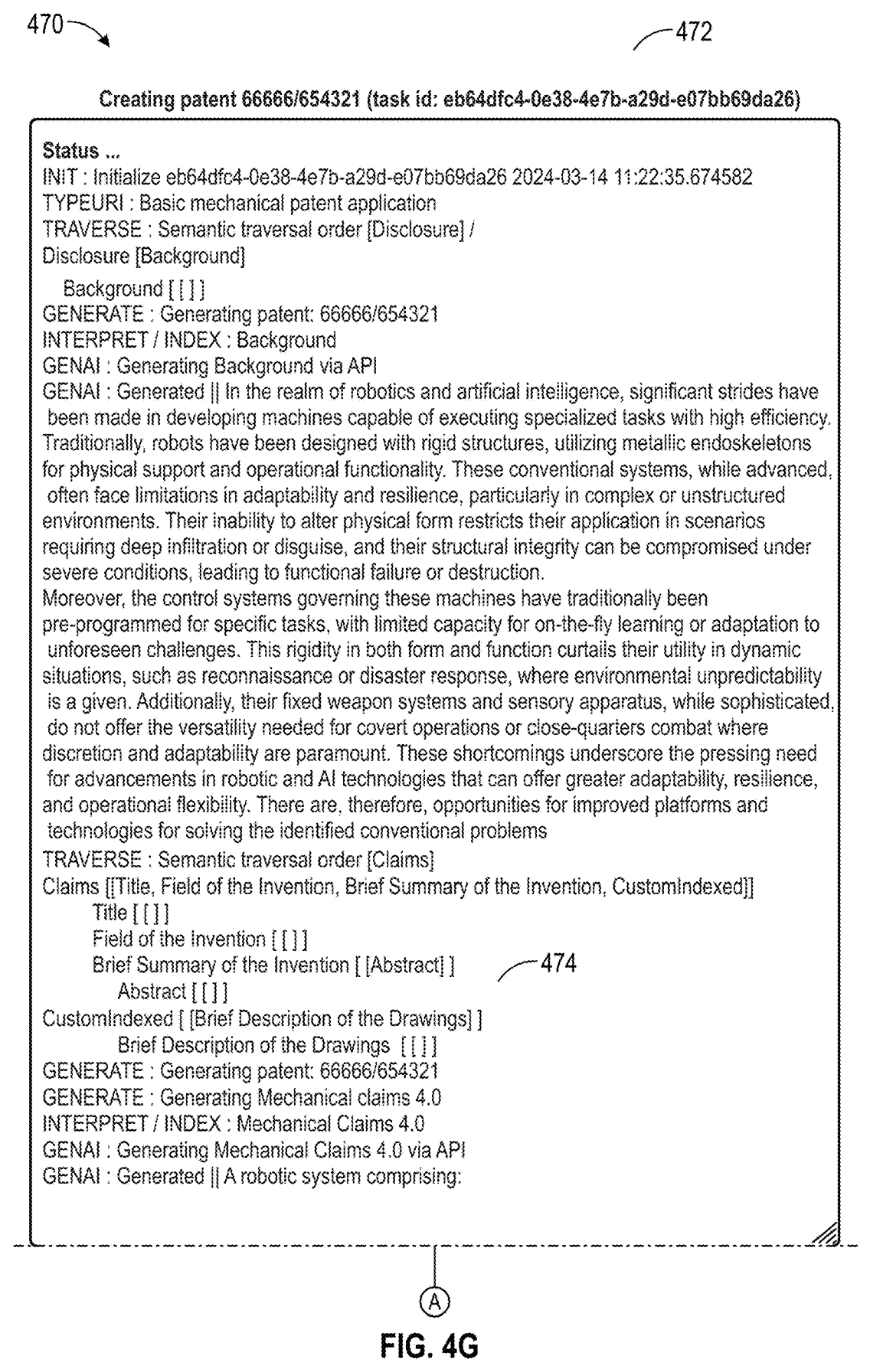

470 472

Creating patent 66666/654321 (task id: eb64dfc4-0e38-4e7b-a29d-e07bb69da26)

Status ...
INIT : Initialize eb64dfc4-0e38-4e7b-a29d-e07bb69da26 2024-03-14 11:22:35.674582
TYPEURI : Basic mechanical patent application
TRAVERSE : Semantic traversal order [Disclosure] /
Disclosure [Background]
Background [ [ ] ]
GENERATE : Generating patent: 66666/654321
INTERPRET / INDEX : Background
GENAI : Generating Background via API
GENAI : Generated || In the realm of robotics and artificial intelligence, significant strides have been made in developing machines capable of executing specialized tasks with high efficiency. Traditionally, robots have been designed with rigid structures, utilizing metallic endoskeletons for physical support and operational functionality. These conventional systems, while advanced, often face limitations in adaptability and resilience, particularly in complex or unstructured environments. Their inability to alter physical form restricts their application in scenarios requiring deep infiltration or disguise, and their structural integrity can be compromised under severe conditions, leading to functional failure or destruction.
Moreover, the control systems governing these machines have traditionally been pre-programmed for specific tasks, with limited capacity for on-the-fly learning or adaptation to unforeseen challenges. This rigidity in both form and function curtails their utility in dynamic situations, such as reconnaissance or disaster response, where environmental unpredictability is a given. Additionally, their fixed weapon systems and sensory apparatus, while sophisticated, do not offer the versatility needed for covert operations or close-quarters combat where discretion and adaptability are paramount. These shortcomings underscore the pressing need for advancements in robotic and AI technologies that can offer greater adaptability, resilience, and operational flexibility. There are, therefore, opportunities for improved platforms and technologies for solving the identified conventional problems
TRAVERSE : Semantic traversal order [Claims]
Claims [[Title, Field of the Invention, Brief Summary of the Invention, CustomIndexed]]
Title [ [ ] ]
Field of the Invention [ [ ] ]
Brief Summary of the Invention [ [Abstract] ]
Abstract [ [ ] ]
CustomIndexed [ [Brief Description of the Drawings] ]
Brief Description of the Drawings [ [ ] ]
GENERATE : Generating patent: 66666/654321
GENERATE : Generating Mechanical claims 4.0
INTERPRET / INDEX : Mechanical Claims 4.0
GENAI : Generating Mechanical Claims 4.0 via API
GENAI : Generated || A robotic system comprising:

474

A

FIG. 4G

A a body composed of a mimetic poly-alloy capable of undergoing transformation in shape, texture, and color; a control system embedded within the body, the control system being an advanced neural net processor for adaptive learning and strategy formulation;
a self-repair mechanism integrated into the mimetic poly-alloy, enabling molecular reconfiguration for instantaneous recovery from damage;
sensory systems distributed throughout the body for environmental analysis and target tracking; and weaponization features allowing the body to form bladed and stabbing weapons from its limbs.
2.The robotic system of claim 1, wherein the mimetic poly-alloy is programmable at the molecular level to assume various forms and textures.
3.The robotic system of claim 1, wherein the body is capable of transforming its shape to mimic any object or person it physically samples by touch.
4.The robotic system of claim 1, wherein the control system provides the robotic system with the capability to learn and adapt its behavior based on environmental interactions.
5.The robotic system of claim 1, wherein the self-repair mechanism allows the robotic system to recover from damage that would be catastrophic to conventional machinery.
6.The robotic system of claim 1, wherein the sensory systems are capable of detailed environmental analysis and precise target tracking.
7.The robotic system of claim 1, wherein the weaponization features do not require external weaponry for combat purposes.
8. A robotic system comprising:
a body composed of a mimetic poly-alloy capable of shape, texture, and color transformations for infiltration and reconnaissance missions;
a control system based on an advanced neural net processor for adaptive learning and strategic decision-making; a self-repair mechanism utilizing rapid molecular reconfiguration for damage recovery;integrated weaponization systems for forming combat tools from the body's structure; and integrated sensory systems for environmental sensing and target identification;
9.The robotic system of claim 8, wherein the mimetic poly-alloy enables the robotic system to assume any humanoid form for adaptability in various operational environments.
10.The robotic system of claim 8, wherein the control system facilitates advanced learning capabilities, allowing the robotic system to formulate complex strategies.
11.The robotic system of claim 8, wherein the self-repair mechanism confers a high degree of durability against conventional weapons.
12.The robotic system of claim 8, wherein the sensory systems provide the robotic system with stealth capabilities by enabling it to mimic objects and persons down to the fingerprint level.
13.The robotic system of claim 8, wherein the integrated weaponization capabilities allow for versatile combat engagement without the need for external weaponry.
14. A robotic system designed for complex missions, comprising:
a body made of a programmable mimetic poly-alloy for verifiable physical transformations;
an embedded control system utilizing an advanced neural net processor for dy2namic learning and adaptation;

FIG. 4G (Cont...)

470 472 476

Created patent 66666/654321 (task id eb64dfc4-0e38-4e7b-a29d-e0f7bb69da26)

Status ...
INIT : Initialize eb64dfc4-0e38-4e7b-a29d-e07bb69da26 2024-03-14 11:22:35.674582
TYPEURI : Basic mechanical patent application
TRAVERSE : Semantic traversal order [Disclosure] /

Disclosure [[Background]]
Background [ [ ] ]
GENERATE : Generating patent : 66666/654321
INTERP/ANET / Index : Background GENAI : Generating Background via API
GENAI : Generated || In the realm of robotics and artificial intelligence, significant strides have been made in developing machines capable of executing specialized tasks with high efficiency. Traditionally, robots have been designed with rigid structures, utilizing metallic endoskeletons for physical support and operational functionality. These conventional systems, while advanced, often face limitations in adaptability and resilience, particularly in complex or unstructured environments. Their inability to alter physical form restricts their application in scenarios requiring deep infiltration or disguise, and their structural integrity can be compromised under severe conditions, leading to functional failure or destruction.
Moreover, the control systems governing these machines are traditionally been pre-programmed for specific tasks, with limited capacity for on-the-fly learning or adaptation to unforeseen challenges. This rigidity in both form and function curtails their utility in dynamic situations, such as reconnaissance or disaster response, where environmental unpredictability is a given. Additionally, their fixed weapon systems and sensory apparatus, while sophisticated, do not offer the adaptive responsiveness needed for covert operations or close-quarters combat where discretion and adaptability are paramount. These shortcomings underscore the pressing need for improved platforms and technologies for solving the identified conventional problems.
TRAVERSE : Sematic traversal oder [Claims]/
Claims, [ClaimsTitle, Field of the Invention, Brief Summary of the Invention, CustomIndexed]]
Title [ [ ] ]
Field of the Invention [ [ ] ]
Brief Summary of the Invention [ [Abstract] ] 474
Abstract [ [ ] ]
CustomIndexed [ [Brief Description of the Drawings] ]
Brief Description of the Drawings [ [ ] ]
GENERATE : Generating patent : 6666/654321
GENERATE : Generating Mechanical Claims 4.0

INTERP/ANET / INDEX : Mechanical Claims 4.0
GENAI : Generating Mechanical Claims 4.0 via API
GENAI : Generated 1. A robotic system comprising:

A

FIG. 4H

A a body composed of a mimetic poly-alloy capable of undergoing transformation in shape, texture, and color;a control system embedded within the body, the control system being an advanced neural net processor for adaptive learning and strategy formulation;
a self-repair system integrated into the mimetic poly-alloy, enabling molecular reconfiguration for instantaneous recovery from damage;
sensory systems distributed throughout the body for environmental analysis and target tracking; and a weaponization feature allowing the body to form melee-based stabbing weapons from its limbs.
2.The robotic system of claim 1, wherein the metallic poly-alloy is programmable at the molecular level to assume various forms and textures.
3.The robotic system of claim 1, wherein the body is capable of transforming its shape to mimic any object or person it physically samples by touch.
4.The robotic system of claim 1, wherein the control system provides the robotic system with the capability to learn and adapt its behavior based on environmental interaction.
5.The robotic system of claim 1, wherein the self-repair mechanism allows the robotic system to recover from damage that would be catastrophic to conventional machinery.
6.The robotic system of claim 1, wherein the sensory systems are capable of detailed environmental
analysis and precise target tracking.
7.The robotic system of claim 1, wherein the weaponization features do not require external weaponry
for combat purposes.
8. A robotic system comprising:
a body composed of an alloy capable of shape, hue, and color transformations for infiltration and reconnaissance missions; a control system based on an advanced neural net processor for adaptive learning and strategic decision-making;
a self-repair mechanism utilizing rapid molecular reconfiguration for damage recovery;
integrated weaponization systems for forming combat tools from the body's structure; and an integrated set of environmental sensors.
9.The robotic system of claim 8, wherein the alloy enables the robotic system to assume any humanoid form for adaptability in various operational environments.
10.The robotic system of claim 8, wherein the control system facilitates advanced learning capabilities, allowing the robotic system to formulate complex strategies.
11.The robotic system of claim 8, wherein the self-repair mechanism confers a high degree of durability against conventional weapons.
12.The robotic system of claim 8, wherein the sensory systems provide the robotic system with stealth capabilities by enabling it to mimic objects and persons down to the fingerprint level.
13.The robotic system of claim 8, wherein the integrated weaponization capabilities allow for versatile combat engagement without the need for external weaponry.
14. A robotic system designed for complex missions, comprising:
a body made of a programmable mimetic poly-alloy for verifiable physical transformations;
an embedded control system utilizing an advanced neural net processor for dynamic learning and adaptation;

FIG. 4H (Cont...)

604

| | | Name | Version |
|---|---|---|---|
| | | whisper | 001 |
| | | babbage-002 | 1 |
| | | text-embedding-ada-002 | 2 |
| | | gpt-4 | vision-preview |
| | | gpt-35-turbo-16k | 0613 |
| | | o1 | 2024-12-17 |
| | | o1-mini | 2024-09-12 |
| | | gpt-4 | 0125-Preview |
| | | gpt-4o | 2024-11-20 |
| | | gpt-4o | 2024-05-13 |
| | | gpt-4o-mini | 2024-07-18 |
| | | dall-e-3 | 3.0 |
| | | o3-mini | 2025-01-31 |

FIG. 6B

702-B

The claims describe a highly advanced robotic entity and a method for its use in various operations, primarily focusing on its adaptability, self-repair, and combat capabilities. The robotic entity is made from a mimetic poly-alloy material, allowing it to change its shape and texture to mimic any object or individual it comes into contact with. It has an integrated self-repair mechanism for instantaneous recovery from damage, is controlled by a neural net processor for adaptive learning and decision-making, and can form weapons from its limbs. It also features advanced sensory systems for environmental analysis and target identification. The method claim outlines how this robotic entity can be used for infiltration, reconnaissance, and combat, emphasizing its utility in military, espionage, and disaster response scenarios due to its unique abilities.

Given the futuristic and highly advanced nature of the described technology, it's challenging to identify existing products that would directly infringe upon these claims, as they describe capabilities beyond current technological achievements. However, for the sake of the exercise, let's consider products and technologies that incorporate elements of the described claims, albeit in a less advanced form:

708-A

1. - Advanced humanoid robot with dynamic movement and balance.
2. - Quadruped robot for various applications, including reconnaissance.
3. - Autonomous vacuum cleaner with adaptive learning capabilities.
4. - Drone with advanced sensory systems for environmental analysis.
5. - Advanced driver-assistance system with adaptive learning for decision-making.
6. - Advanced neural networks for learning and strategic decision-making.
7. - Mixed reality technology for advanced environmental analysis.
8. - Military robots used for reconnaissance and bomb disposal.
9. - Sentry robot with weaponization features for combat.
10. - Robotic arms capable of complex manipulation, potentially adaptable for combat.
11. - Quadruped robot with environmental analysis capabilities for disaster response.
12. - Advanced sensory systems for environmental analysis.
13. - Wearable suits enhancing human capabilities, hinting at the adaptability of the robotic entity.
14. - Brain-machine interfaces aiming at enhancing learning and decision-making capabilities.
15. - Robots designed for disaster response in challenging environments.
16.- Robotic gripping systems that adapt to various shapes and textures.
17. - Quadruped robot for reconnaissance and sensing in challenging terrains.
18. - Robot designed for material handling, showcasing adaptability in physical tasks.
19. - Collaborative robot with advanced control systems for precise tasks.
20. - Humanoid robot with advanced learning and decision-making capabilities.

It's important to note that while these products and technologies share certain aspects with the claims, such as adaptability, learning capabilities, and in some cases, environmental analysis or combat applications, they do not fully encompass the advanced features described, particularly the mimetic poly-alloy material and the integrated self-repair mechanism.

FIG. 7B

METHODS AND SYSTEMS FOR PROVIDING PATENT TECH USING MACHINE LEARNING AND ADAPTIVE TRAVERSAL

CROSS-REFERENCE TO RELATED APPLICATION

This application claims the benefit of U.S. Provisional Patent Application No. 63/565,513; filed on Mar. 14, 2024; and entitled "Computing system and method for processing patent-related data using artificial intelligence models to generate and provide legal documents", which is hereby incorporated by reference in its entirety.

FIELD OF THE INVENTION

The present aspects relate to patent tech computing systems and methods for managing patent-related data and documents, and more particularly, to systems and methods for training and operating machine learning (ML) and artificial intelligence (AI) models, in conjunction with adaptive traversal and other techniques, for processing and generating patent documents.

BACKGROUND

Patent drafting, prosecution, and litigation involve preparing, reviewing, and managing complex documents that must precisely capture inventive concepts, accurately reflect technical details, and rigorously adhere to legal standards. Conventionally, these tasks are predominantly performed by patent attorneys, agents and other specialists using standard word-processing software. Such traditional document creation typically begins with blank documents, relying heavily upon individual skill, judgment, and expertise, often with limited reuse of previously generated text, even across repetitive or related applications. This manual approach frequently results in inefficiencies, inconsistencies, and variability in document quality, due primarily to inherent limitations in human attention, memory, and consistency.

Further, existing software solutions or conventional text-generation tools have significant drawbacks when applied to patent-specific contexts. General-purpose text-generation systems lack specialized linguistic understanding, nuanced comprehension of patent law standards, and appropriate knowledge of patent office guidelines. As a result, the documents produced by such tools often require substantial human editing and revision, diminishing any potential productivity gains. Conventional natural language generation approaches also fail to adequately handle the complexity of patent documents. These shortcomings contribute to inaccuracies, unclear scope, and potentially costly prosecution or litigation errors.

Traditional computing systems utilized for patent drafting suffer from computational inefficiencies and limited capabilities regarding memory and network resource management, especially when handling large volumes of patent-related data. Conventional database or document management systems typically store and retrieve patent data, leading to performance bottlenecks, slow response times, inefficient memory utilization, and suboptimal document generation strategies, further limiting the usefulness and scalability of traditional patent management and drafting solutions.

Therefore, there is a need for specialized patent drafting methods and systems to address the inefficiencies, inconsistencies, and limitations inherent in traditional manual and basic automated drafting tools by using cutting-edge technologies such as natural language processing (NLP), artificial intelligence (AI), and dependency-aware algorithms to streamline document creation, ensure accuracy, and improve scalability across diverse patent-related tasks.

BRIEF SUMMARY OF THE INVENTION

In one aspect, a computer-implemented method includes (1) receiving multimodal input data comprising technical disclosures related to patent drafting, prosecution, or litigation; (2) analyzing the multimodal input data using one or more artificial intelligence models trained to identify inventive concepts, logical sections of a patent document, and dependencies among the logical sections; (3) constructing a dependency-aware graph structure representing the dependencies among the identified logical sections; (4) dynamically determining an optimized traversal sequence for generating patent document sections by adaptively traversing the dependency-aware graph structure, wherein the optimized traversal sequence is automatically updated in response to user modifications to any patent document section; (5) generating the patent document sections according to the optimized traversal sequence; and (6) causing the generated patent document sections to be displayed via an interactive graphical user interface configured to propagate user modifications across dependent sections.

In another aspect, a computing system includes (i) one or more processors; and (ii) one or more memories, having stored thereon computer-executable instructions that, when executed, cause the computing system to: (1) receive, via the one or more processors, multimodal technical disclosure data related to patent drafting, prosecution, or litigation; (2) process, via a trained machine learning model, the multimodal data to extract inventive concepts and identify logical document sections; (3) construct, via the one or more processors, a directed acyclic graph representing logical dependencies among the identified sections; (4) determine, by processing the directed acyclic graph using a trained artificial neural network model, an optimal sequence for generating patent document sections based on the directed acyclic graph; (5) generate, via the one or more processors, one or more patent document sections according to the optimal sequence; (6) cause, via the one or more processors, the generated patent document sections to be displayed in response to receiving one or more user modifications; and (7) propagate user modifications throughout dependent sections based on the dependencies in the directed acyclic graph.

In yet another aspect, a non-transitory computer-readable medium has stored thereon computer-executable instructions that, when executed by a processor, cause a computer to: (1) receive multimodal patent-related input data including invention disclosures, prosecution arguments, or litigation evidence; (2) process the multimodal input data with artificial intelligence-based natural language processing models to extract inventive concepts and classify logical sections of a patent document; (3) construct a dependency-aware directed acyclic graph representing logical dependencies among the classified logical sections; (4) determine an optimized traversal order of patent document sections using an adaptive traversal algorithm, wherein the traversal algorithm dynamically adjusts the traversal order based on user edits; (5) generate patent document sections according to the optimized traversal order; and (6) cause to be displayed the generated patent document sections within an interactive graphical user interface configured to propagate real-time user modifications across dependent sections.

BRIEF DESCRIPTION OF THE DRAWINGS

FIG. 4B depicts an exemplary administrative panel for selecting and reordering parts within a template using drag and drop, according to some aspects.

FIG. 4G depicts an exemplary graphical user interface (GRAPHICAL USER INTERFACE) for displaying task monitoring, according to some aspects.

FIG. 4H depicts a GRAPHICAL USER INTERFACE providing a link to the completed patent draft of FIG. 4G, according to some aspects.

FIG. 6B which depicts a graphical user interface showing available pre-trained models, according to some aspects.

FIG. 7B depicts a graphical user interface corresponding to the output of the GRAPHICAL USER INTERFACE of FIG. 7A, according to some aspects.

DETAILED DESCRIPTION

Figure 1:
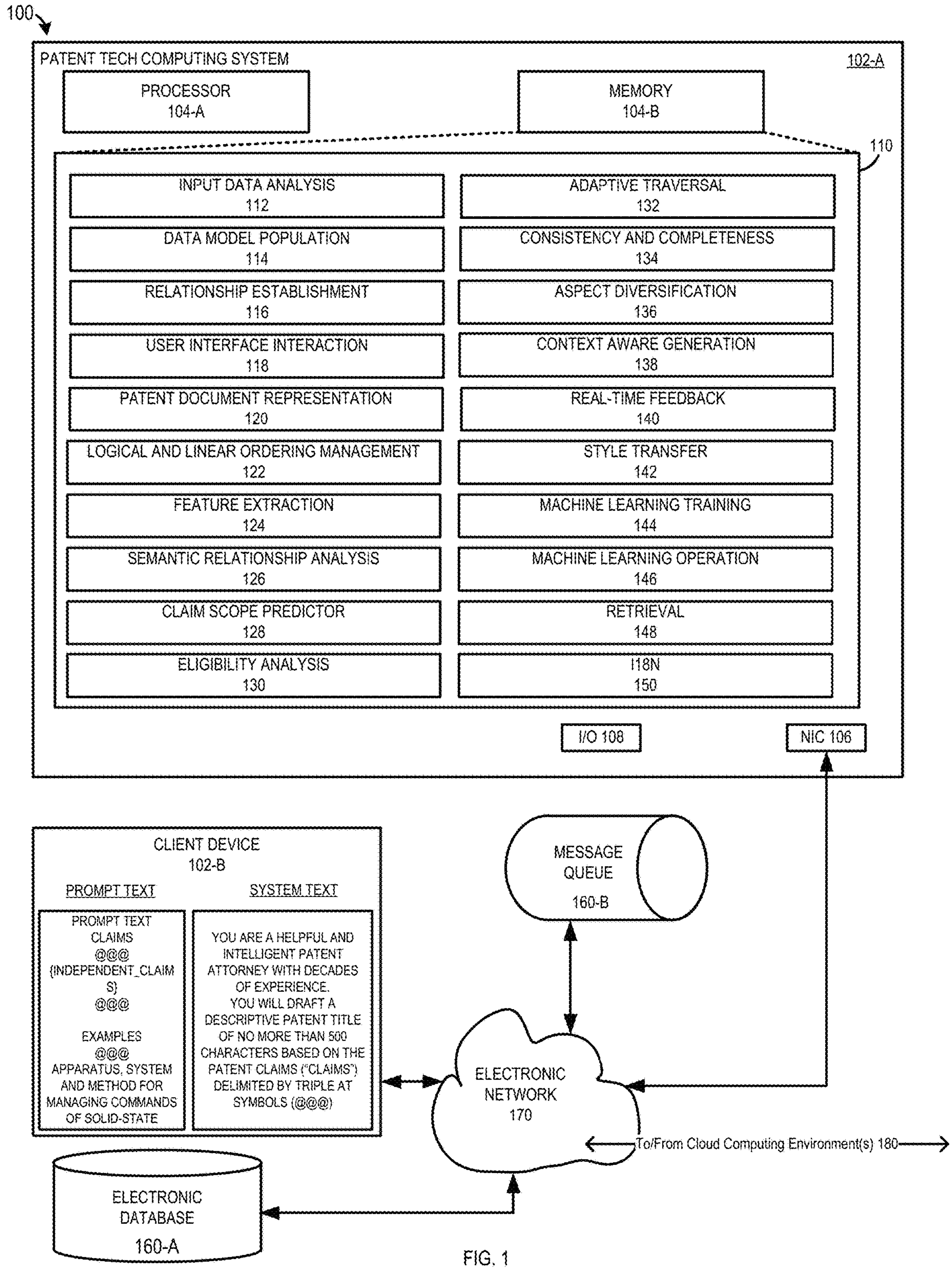
FIG. 1 depicts a patent tech computing environment for automating patent drafting, prosecution, and litigation using artificial intelligence and machine learning, according to some aspects.

The present techniques are directed to, inter alia, methods, computing systems and computer-readable media for performing patent drafting, patent prosecution and patent litigation related functions using artificial intelligence and machine models to automate and accelerate various aspects of patent attorney drafting and analysis. The techniques disclosed herein include artificial intelligence (AI) and machine learning techniques and models (e.g., language models (LMs)) for performing patent drafting, prosecution, and litigation-related tasks. The present techniques offer a multitude of benefits, particularly in improving processing speed, optimizing network usage, and enhancing memory usage within computing systems.

Patent drafts, office action responses, and other patent attorney work product often begin as blank Word documents. Attorneys frequently approach each new application without systematically reusing previously drafted text, even when drafting applications covering similar or repetitive subject matter. Consequently, attorneys repeatedly invest considerable time and effort into recreating substantially similar language, descriptions, or claims, resulting in a process burdened by redundancy and inefficiency. Due to the lack of systematic reuse and standardization, the quality of patent application documents varies significantly. This inconsistency arises because each draft is influenced heavily by individual attorney skill, fatigue, or subjective judgment, rather than standardized guidelines or structured reuse of proven, effective textual components. Such variability in quality complicates the prosecution process, potentially weakening the enforceability and clarity of the patents and resulting in unpredictable prosecution outcomes. Further, drafting patent applications and preparing office actions without reuse mechanisms or automated assistance contributes to an excessively time-consuming and tedious workflow. The repetitive and painstaking nature of repeatedly generating similar language and structure creates a psychologically daunting environment for practitioners, increasing mental fatigue, reducing productivity, and ultimately resulting in suboptimal efficiency. "Writers block" affects the patent legal profession disproportionately. Thus, the conventional approach significantly hampers the overall productivity, quality, and satisfaction of those working within the patent drafting and prosecution process.

At the same time, traditional computing systems utilized for patent drafting suffer from computational inefficiencies and limited capabilities regarding memory and network resource management, especially when handling large volumes of patent-related data. Most of the tools for patent practitioners, given the specialization of the profession, are simplistic and only provide the most basic proofreading capabilities. These tools are often created on an ad-hoc basis, and are written as ungainly Microsoft Word macros or plugins that are replete with bugs and unpredictable/undefined behavior. The present techniques address these problems by optimizing computing resources (memory, processing power, network utilization); improving patent generation via traversal algorithms to efficiently manage document dependencies; enhancing data structures (tree/DAG) with dynamic semantic relationships; and employing adaptive AI algorithms (such as DFS traversal combined with machine learning heuristics) to dynamically re-order and optimize patent document generation. The present techniques also include tooling for implementation using best practices in software development, including Agile development, distributed version control, full stack web development environments, thereby modernizing the software ecosystem of patent tech and making it more reliable and systematic in the process.

The present techniques provide specific technical improvements to the functioning of computing systems tasked with patent-related document generation. In particular, the disclosed traversal algorithm employs an enhanced depth-first search (DFS) approach combined with adaptive machine learning heuristics that significantly reduces computational overhead and optimizes memory utilization by ensuring that patent document sections are generated only after all dependent sections are fully processed. This adaptive dependency resolution technique eliminates redundant processing, streamlines CPU cycles, and reduces unnecessary memory operations, leading to measurable performance enhancements compared to conventional linear or naïve generation methods.

Additional technical capabilities are included, which significantly enhance the specialized computing environment disclosed herein, including natural language processing (NLP) models to identify, classify, and semantically structure invention-specific elements from input disclosures; adaptive traversal for integrating machine-learning-based heuristics that dynamically optimizing traversal paths within complex dependency graphs, significantly reducing memory consumption and processing latency. These technical aspects operate synergistically to provide substantial computational efficiency, offering clear technological improvements distinct from mere automation of a manual task.

Further, AI-based style transfer technology, specifically designed and trained on attorney-specific styles and examiner preferences, is a distinct technical improvement that goes beyond mere text-generation automation. In some aspects, the disclosed computing system may include artificial neural networks specifically trained on attorney-authored patent corpora. This technical feature uniquely enables the automated adaptation of patent document drafts to the precise stylistic conventions and linguistic patterns favored by specific attorneys or patent offices. This machine-learning-enabled style adaptation surpasses simple text generation by dynamically ensuring consistency, improving clarity, and increasing acceptance rates of drafted documents. By employing neural style transfer, the invention provides meaningful technical improvements in generating legally compliant documents tailored precisely to practitioner and examiner preferences.

Still further, data models in the present techniques (such as self-referential semantic schemas, tree structures, and directed acyclic graphs (DAGs)) offer specific technical advantages, improving the speed, accuracy, and computational efficiency of complex document generation. The specifically designed data model, incorporating semantic schemas, self-referential relationship structures, and dependency-aware DAG representations, provides a fundamental technical improvement over traditional flat or relational databases. These structures enable efficient traversal and retrieval operations, significantly reducing query complexity, network latency, and memory utilization. The invention thereby overcomes significant computational challenges inherent to large-scale patent drafting applications, offering clear improvements to computing performance and resource optimization.

Furthermore, the computing environment disclosed herein introduces significant advancements in network utilization through intelligent model-request batching, predictive caching of frequently accessed AI outputs, and dynamic allocation of cloud-based resources. In addition to improved processing efficiency, the system also optimizes network usage. By intelligently managing data flow between the user interface and the underlying AI models, the system ensures that network resources are utilized efficiently. This is particularly beneficial when accessing cloud-based LMs or when multiple users are interacting with the system simultaneously, or local LMs that may be less responsive. The efficient network usage helps in reducing latency and ensures that the system remains responsive, even under heavy load, thus enhancing the user experience and ensuring that practitioners can work seamlessly without any interruptions. These advancements minimize unnecessary network calls and dramatically reduce latency. Similarly, memory management is enhanced through caching strategies and selective loading of data models, enabling the processing of extensive patent documents without performance degradation. These features represent clear technological improvements over conventional systems that employ generic, inefficient request-response cycles.

Thus, the present techniques provide more than mere automation of a manual drafting task; and significantly more than conventional systems, by specifically introducing significant technical improvements to computing systems tasked with patent-related document analysis and generation. These improvements, as discussed above, explicitly address and solve technological challenges. Therefore, the present techniques include patent-eligible improvements under 35 U.S.C. § 101, enhancing the underlying technological processes and capabilities of computer systems themselves.

The present techniques may include using ML techniques—such as predictive modeling or reinforcement learning—to dynamically guide or optimize the order in which document sections are traversed or generated. In other words, in some aspects, a traversal path through a patent document is not simply fixed or determined by rigid rules; rather, an intelligent ML-based heuristic can adaptively decide the optimal sequence to navigate dependencies between document components based on historical data, learned patterns, or contextual importance. For example, an ML-based heuristic may learn from past drafting outcomes that certain sections (like claims) are best generated first in certain contexts, while in other scenarios, detailed descriptions or diagrams might take precedence.

Existing conventional patent drafting systems may lack traversal, or employ static methods for generating patent documents, relying upon rigid sequences that do not adapt to variations in document structure or dependencies. Such traditional methods often fail to adequately handle the complex, interrelated nature of patent document sections—such as claims, abstracts, detailed descriptions, and drawings—each of which may have context-sensitive and dynamic relationships. Because conventional approaches utilize predefined, linear paths through document sections, they lack the flexibility required to intelligently reorder generation steps when dependencies vary between different patent applications. As a result, traditional systems frequently generate document sections prematurely or without essential context, diminishing the clarity and coherence of the drafted patent application.

Additionally, due to their inability to adapt dynamically, conventional patent drafting tools often necessitate extensive intervention and repeated revisions to resolve logical inconsistencies or omissions. These iterative manual adjustments are not only inefficient but also introduce substantial redundancy into the drafting process. Without adaptive traversal capabilities, each correction often requires reprocessing previously generated sections, which significantly increases the time and labor associated with preparing patent documents. Traditional drafting methods that lack intelligent, context-aware traversal strategies are inherently error-prone. Without the benefit of historical insights or learned contextual relationships between document sections, these static approaches tend to generate isolated sections that do not logically align with related sections, leading to inconsistencies, inaccuracies, and unclear scope definitions. Consequently, significant review, revision, and oversight become necessary merely to correct drafting errors and to ensure document completeness, accuracy, and compliance with patent office standards. Such limitations of existing systems result in compromised document quality.

Conventional patent drafting systems typically generate documents using linear or sequential approaches that fail to adequately account for logical dependencies among document components. Patent applications inherently include multiple interdependent sections, such as claims, abstracts, detailed descriptions, and drawings, each of which may depend on or reference information from other sections. Traditional drafting tools and basic text-generation systems do not effectively handle these complex relationships, often resulting in documents drafted out-of-order or which requiring extensive adjustments to restore logical coherence. The absence of sophisticated dependency-resolution capabilities in existing solutions leads to inefficient drafting processes, increased editing workloads, and greater potential for errors, omissions, or inconsistencies. As a result, traditional systems frequently generate document sections prematurely or without essential context, diminishing the clarity and coherence of the drafted patent application.

For example, in conventional patent documents, the "Brief Summary of the Invention" section typically appears near the beginning of the document, positioned ahead of the claims in linear display order. However, this "Brief Summary" is conventionally drafted based on, and should reflect, the precise wording and scope set forth in the claims themselves, as the claims formally define the invention's scope. Because traditional patent drafting systems rigidly follow the linear sequence of the patent document during generation, these systems must produce the Brief Summary without yet having generated—or even fully processed—the claims. This premature generation forces the drafting of a summary that lacks critical, essential context from the claims, misrepresenting key inventive concepts, omitting crucial features, and/or inaccurately describing the invention. Continuing this example, this dependency between the claims and the Brief Summary is inherently dynamic. Over the lifetime of drafting, prosecution, or amendment processes, claim language frequently evolves based on examiner feedback, prior art discoveries, or strategic revisions.

Traditional drafting tools that statically generate the Brief Summary in a fixed linear order are unable to accommodate these dynamic changes. As claims are adjusted or refined, previously generated summaries become outdated, inaccurate, or incomplete, requiring significant manual rewriting and increasing the likelihood of inconsistencies and errors. Thus, the rigidity and inflexibility of conventional drafting approaches result in patent applications where sections like the Brief Summary become disconnected from the underlying claims, undermining overall clarity, coherence, and ultimately, legal effectiveness. In contrast, the techniques disclosed herein utilize intelligent dependency-aware traversal algorithms to generate document sections based on logical dependencies rather than linear display order. Thus, sections such as the Brief Summary can be adaptively generated after—or in dynamic conjunction with—the claims, ensuring accurate reflection of the claimed subject matter and enabling automated updates as the claims evolve.

At its core, the system provides a comprehensive framework for managing various aspects of patent document drafting, from defining general patent meta-information to the generation and layout of documents using traversable data structures and dependency graphs. Through the use of exemplary data models, such as client, patent, template, parts, part type, and AI model data models, the system facilitates the creation, update, and retrieval of information, thereby streamlining the patent drafting process. The system's exemplary patent document model leverages tree data structures and depth-first search algorithms to ensure that documents are generated in a logical and efficient manner, respecting the interdependencies of various document components.

Moreover, the system's ability to dynamically generate and reorder templates, coupled with its innovative use of task queues for asynchronous processing, exemplifies its flexibility and efficiency in handling patent drafting tasks. By permitting user-defined templates and ensuring that all components of a patent are generated in an order that respects their dependencies, the system offers a highly customizable and efficient approach to patent document generation.

The present techniques may include generating and populating a variety of data models based on the input data, establishing intricate relationships among these models to ensure a seamless user experience. Such data models include a client model, a patent model, a template model, among others, which are interconnected through semantic schemas, thereby enabling a user to perform a range of operations with ease. This organization extends to representing patent documents using a dynamic tree data structure, ensuring a logical and linear ordering that greatly aids in generating semantically ordered documents, thus addressing the complex dependencies among various sections of a patent.

Specifically, in some aspects, the present techniques may leverage AI agents—autonomous or semi-autonomous artificial intelligence systems—to dynamically manage and optimize the traversal and generation order of patent document sections. In particular, an AI-agent-based approach employs multiple intelligent agents, each configured to autonomously determine and execute tasks based on learned patterns, contextual importance, and evolving document dependencies.

For example, an intelligent traversal agent may be trained using historical patent-drafting data. Such training may involve reinforcement learning, where the agent iteratively learns the optimal sequence of generating patent sections by receiving positive rewards when certain sections are generated in an order that reduces downstream edits or improves overall document coherence. Over time, this traversal agent becomes capable of adaptively determining when claims should precede a brief summary, when diagrams or detailed descriptions should be prioritized, or when dependent sections should wait until their antecedents are sufficiently finalized.

In practice, the AI traversal agent may begin with an initial "best guess" traversal order based on its learned historical data, and/or on a predetermined default traversal order. As it proceeds, the agent may continuously assess context and update its traversal strategy in real-time based on the specific content and characteristics of the current patent application. For instance, upon initially drafting the claims, the agent may reassess the dependencies and automatically adjust its sequencing strategy-deciding, perhaps, to immediately regenerate a previously generated brief summary or background section to better reflect recent claim language modifications.

Further, AI agents may operate collaboratively. A first AI agent (a dependency agent) may continuously analyze the evolving semantic relationships and interdependencies between patent sections. This dependency agent may provide contextual information into a second AI agent (the traversal agent), which dynamically adapts its traversal order accordingly. Meanwhile, a third AI agent (a quality assurance agent) may monitor coherence and consistency across generated document sections, providing feedback loops to the traversal agent in real-time, prompting immediate adaptation when inconsistencies or inaccuracies emerge due to changes in context. These agents may be executed, for example, by the computing system of FIG. 1 in parallel and/or concurrently, in some aspects. This AI-agent-based architecture is inherently dynamic and responsive, ensuring the traversal strategy continuously reflects the most current state of the patent application. Unlike conventional static linear approaches, this intelligent multi-agent architecture supports nuanced and real-time decision-making (relative to any modifications to the patent document), diminishing the risk of logical inconsistencies, and resulting in more coherent, accurate, and high-quality patent documents.

The present techniques represent a significant leap forward in automating and enhancing the efficiency, accuracy, and comprehensiveness of patent-related processes. By harnessing the power of advanced AI models and employing a carefully designed data model architecture in conjunction with, the system not only uplifts the standard of patent document generation but also offers users an intuitive, powerful tool to navigate the complexities of patent drafting, prosecution, and litigation with unprecedented ease and effectiveness. The present techniques introduce a system that utilizes AI and LMs to offer significant improvements in processing efficiency, network usage, and memory optimization for patent drafting tasks. This system represents a significant advancement in the field of patent tech, providing patent attorneys and practitioners with powerful tools to enhance their productivity and creativity in handling patent-related tasks.

Exemplary Computing Environment

FIG. 1 depicts a patent tech computing environment 100 including a patent tech computing system 102-A for automating patent drafting, prosecution, and litigation using artificial intelligence and machine learning, according to some aspects. The environment 100 may include a processor 104-A, a memory 104-B, a network interface controller (NIC) 106, and an input/output (I/O) device 108. The computing system 102-A may be embodied in a cloud computing environment, a dedicated server computer, one or more virtualized instances, or any other suitable hardware or software platform. This flexibility allows the system to scale resources (e.g., storage, processing power) according to demand and to adapt seamlessly to different stages or tasks within the patent lifecycle, thereby delivering a robust and efficient patent drafting, prosecution, and management solution. The computing system 102-A may be communicatively coupled to a client device 102-B, by which users may access the 102-A. In some aspects, the client device 102-B may support responsive web design, to facilitate mobile use.

The processor 104-A may include one or more general-purpose processing cores, specialized machine learning accelerators, digital signal processors, graphics processing units (GPUs), and/or other types of processing components capable of executing program instructions stored in the memory 104-B. In some aspects, the processor 104-A may incorporate integrated AI logic (e.g., tensor cores, neural network accelerators) specifically designed to train or infer models for automating patent drafting, prosecution, and litigation as described herein. The processor 104-A may also include various cache memories, control units, and pipelines configured to efficiently handle data transfers between the memory 104-B, the NIC 106, and the I/O device 108, and to support the real-time or near real-time processing demands of patent-related workflows.

The memory 104-B includes a plurality of modules 110, each of which is includes respective set(s) of computer-executable instructions. Herein, the term "instructions" refers to non-transitory computer-executable instructions stored in memory 104-B, which, when executed by the processor 104-A, cause the computing system 102-A to perform specific patent-related tasks. For example, each of the modules 110 may be responsible for one or more specific tasks in the patent drafting and management process, as identified in the claims of the present disclosure. The modules 110 may include an input data analysis module 112; a data model population module 114; a relationship establishment module 116; a user interface interaction module 118; a patent document representation module 120; a logical and linear ordering management module 122; a feature extraction module 124; a semantic relationship analysis module 126; a claim scope predictor module 128; an eligibility analysis module 130; an adaptive traversal module 132; a consistency and completeness module 134; an aspect diversification module 136; a context aware generation module 138; a real-time feedback module 140; a style transfer module 142; a machine learning training module 144; a machine learning operation module 146; a retrieval module 148; and an internationalization (i18n) module 150. In some aspects, the memory 104-B may include more or fewer modules in the modules 110.

The input data analysis module 112 may include instructions that, when executed (e.g., by the processor 104-A), allow the computing system 102-A to receive input comprising data related to patent drafting, prosecution, or litigation. In some aspects, this module 112 analyzes the input data using one or more artificial intelligence models, including but not limited to OpenAI, Mistral, Google Gemini, Anthropic Claude, one or more local LMs, etc. In some aspects these AI models may include pre-trained and/or fine-tuned models. The input data analysis 112 may include instructions for parsing, filtering, and/or classifying incoming data (e.g., textual or graphical); identifying relevant features or metadata within the input; and formatting or normalizing the extracted information for subsequent use in patent drafting or analysis.

The input data analysis module 112 may process incoming patent-related data-whether related to patent drafting, prosecution, or litigation-using one or more artificial intelligence models. The input data analysis module 112 may intelligently analyze and structure unstructured data to improve efficiency, accuracy, and consistency in patent document generation. For example, upon receiving input data, such as an invention disclosure, an office action, or a litigation filing, the input data analysis module 112 may first parse, filter, and classify the information. This may involve identifying key metadata such as inventor names, priority dates, and technical classifications. The input data analysis module 112 may determine whether the document pertains to patent drafting (e.g., claims, specifications), prosecution (e.g., examiner rejections, prior art citations), or litigation (e.g., invalidity contentions, claim construction arguments). The input data analysis 112 may direct the document(s) to further appropriate processing workflows.

The input data analysis module 112 may further normalize and format the extracted information for integration into one or more data models. This ensures that structured data—such as claims, embodiments, and figures—is stored consistently for downstream processing. For example, an adaptive traversal algorithm may ensure that the document generation process respects logical dependencies (e.g., ensuring that the brief summary of the invention is drafted after the claims, rather than before, to maintain consistency). In cases where graphical elements (e.g., technical diagrams, flowcharts) accompany a submission, the module may also apply image recognition or graph processing techniques to classify and link figures with corresponding textual descriptions. This helps automate the drafting of sections like the Brief Description of the Drawings or Detailed Description of the Invention, ensuring that figures are appropriately cited and labeled.

By applying machine learning heuristics, the input data analysis module 112 also enhances document consistency across multiple filings. For instance, when multiple patent applications involve similarities (e.g., subject matter, clients, etc.), the input data analysis module 112 can identify linguistic variations and recommend standardized phrasing based on prior successful filings. This mitigates drafting inconsistencies that often arise. Furthermore, the input data analysis module 112 may be integrated with retrieval-augmented generation (RAG) techniques to dynamically retrieve relevant prior art, case law, patent office guidelines, firm-specific drafting preferences, and/or other information. This ensures that the AI-generated text aligns with jurisdictional standards and preferences, which is particularly valuable in optimizing prosecution strategies.

The data model population module 114 may include instructions for generating and/or populating one or more data structures with attributes, fields, or nodes derived from the parsed input data, including updating reference tables or knowledge bases with any new or modified information. Specifically, the data model population module 114 may be responsible for systematically organizing patent-related data within an electronic database. When input data, such as an invention disclosure, office action, or litigation brief, is received by the input data analysis module 112, the input data analysis module 112 may provide that to the data model population module 114, which may extract and populate key attributes into predefined or generated data structures. These data structures may include client models, patent models, template models, and AI model configurations. These data structures ensure that all incoming information is stored in a format that allows for efficient retrieval, editing, and reuse. Additionally, the data model population module 114 may update reference tables, knowledge bases, and entity relationships, ensuring that modifications to a patent application—such as revised claims—are reflected across all associated components.

The relationship establishment module 116 may include instructions for creating and maintaining explicit links or associations (e.g., hierarchical, referential) between data elements, attributes, or nodes to reflect relationships defined by a user or by inferred connections among concepts. The relationship establishment module 116 module may establish logical connections between various elements in a data architecture. For example, patent documents often have complex dependencies, such as claims referring to specific embodiments, prior art citations affecting claim scope, or examiner responses tied to specific rejections. The relationship establishment module ensures that these connections are properly structured, whether through hierarchical links, referential pointers, or semantic mappings. This capability is particularly useful when users navigate through interrelated documents or when AI-driven processes need to track claim dependencies, legal citations, or examiner office actions.

The user interface interaction module 118 may manage the way users interact with the computing system 102-A by facilitating real-time display and data manipulation, ensuring that patent practitioners can input, edit, and retrieve relevant patent data. This module translates user-initiated actions—such as selecting a template, submitting a claim amendment, or running a query (e.g., a chat query)—into corresponding system operations. Additionally, it validates user inputs, preventing formatting errors, incomplete data submissions, or inconsistent claim language. The user interface interaction module 118 may include one or more user interfaces for interacting with chat models, including interactive user interfaces (i.e., canvases) that enable one or more users to collaboratively edit a document using an LM-based workflow. The user interface interaction module 118 may include instructions for receiving prompts from users. The user interface interaction module 118 may also include instructions for enabling users to provide multi-modal inputs, such as an image from an invention disclosure document along with a request to generate a text-based disclosure. Or, an audio file of an invention disclosure meeting along with a request to generate a claim set. Such a request may include hints, wherein the user instructs a model to focus on one or more specific aspects under discussion during the invention disclosure meeting, to focus the subject matter of the resultant claims. The user interface interaction module 118 may include instructions for facilitating multi-turn, multi-modal conversations with one or more users.

The instructions stored in user interface interaction module 118 may direct the presentation of user interface components, detect user-initiated events (e.g., clicks, text entries, selections), and map those events to specific commands or data updates within the system.

Patent applications are highly structured documents, with sections such as claims, abstracts, detailed descriptions, and figures following strict legal and formatting guidelines. The patent document representation module 120 includes instructions for segmenting patent-related text and metadata into standardized document structures, allowing for dynamic editing, retrieval, and export. The patent document representation module 120 may include instructions for formatting AI-generated text into a structured layout and ensures compliance with USPTO, EPO, and other jurisdictional standards.

Patent documents have both logical and display orderings. For example, the Brief Summary often appears before the Claims, but should be drafted after the claims to ensure consistency. The logical and linear ordering management module 122 ensures that sections are processed, reviewed, and generated in the correct sequence. By managing dependency-based traversal, this module prevents errors such as inconsistent terminology between claims and embodiments or misaligned section references.

The logical and linear ordering management module 122 may use machine learning (ML) techniques to automatically discover or infer optimal patent document structure and logical ordering from historical patent documents. By analyzing a corpus of previously successful patent filings, this module can identify common patterns, dependencies, and optimal drafting sequences. Specifically, the logical and linear ordering management module 122 may apply supervised learning, unsupervised learning, and/or reinforcement learning. For example, the logical and linear ordering management module 122 may train supervised learning methods—such as sequence labeling models (e.g., Conditional Random Fields or CRFs, Bidirectional LSTM-CRFs, or Transformer-based sequence models)—on labeled examples of effective document structures to automatically segment and label sections (claims, brief summary, detailed description) and infer dependencies among them. This enables the system to generalize a learned structure to new applications.

Additionally, or in the alternative, the logical and linear ordering management module 122 may use unsupervised learning methods—such as topic modeling (Latent Dirichlet Allocation or LDA), clustering algorithms (K-means, hierarchical clustering), or graph-based algorithms (community detection, such as Louvain or Girvan-Newman)—to detect inherent groupings or logical sequences within patent document sections across the corpus. These unsupervised approaches can reveal latent structural relationships without explicit labeling, identifying which sections consistently appear before others or are semantically dependent upon certain claim structures. Still further, in some aspects the logical and linear ordering management module 122 may use reinforcement learning (RL)—particularly algorithms such as Q-learning, Deep Q-Networks (DQN), or Proximal Policy Optimization (PPO). The logical and linear ordering management module 122 may use RL in particular to iteratively optimize document ordering based on historical outcomes (e.g., successful prosecution, fewer examiner rejections). In this scenario, the RL agent may treat patent document generation as a sequential decision-making process, receiving positive rewards for ordering structures that historically correlated with efficient prosecution or approval, thus dynamically learning the most beneficial ordering. This optimized ordering may be stored and applied in the creation of new patent documents.

In some aspects, the logical and linear ordering management module 122 may employ Graph Neural Networks (GNNs). For example, as discussed herein,patent documents can naturally be represented as graphs or Directed Acyclic Graphs (DAGs), with sections as nodes and logical dependencies as edges. The logical and linear ordering management module 122 may train one or more Graph Attention Network (GAT) or Graph Convolutional Networks (GCN) to learn from historical dependency structures to infer optimal logical ordering.

In still further aspects, the logical and linear ordering management module 122 may use Transformer-based Language Models including pre-trained transformers (e.g., GPT-4, Google's BERT, or Anthropic's Claude) and/or fine-tuned models trained on historical patent data to learn contextual embeddings that implicitly encode logical relationships between sections, improving prediction of optimal orderings. By integrating these ML-driven approaches, the logical and linear ordering management module 122 can effectively learn from historical patent corpora, systematically infer optimal logical ordering and structural relationships, and significantly improve the drafting quality, consistency, and prosecution efficiency of patent documents within the system computing system 102-A.

To facilitate intelligent automation, the feature extraction module 124 may identify key technical concepts, inventive features, and legal structures from input data. For instance, when an invention disclosure is provided, the feature extraction module 124 may detect novel functional components, specific algorithms, and material compositions. The feature extraction module 124 may highlight these features as candidates for claim drafting. Additionally, in a litigation context, this module may extract key legal arguments, case law references, or infringing product features, allowing attorneys to efficiently assess strengths and weaknesses in a case.

Patent drafting and prosecution require deep semantic understanding. The semantic relationship analysis module 126 may analyze and map relationships between terms, phrases, and concepts, allowing computing system 102-A to identify synonyms, legal equivalents, and overlapping inventive disclosures. For example, if a prior art reference uses "machine learning model" while the patent uses "artificial intelligence engine", semantic relationship analysis module 126 may harmonize these terms.

Determining the breadth or narrowness of a patent claim is crucial for prosecution and litigation. The claim scope predictor module 128 may include instructions for evaluating claim language, prior art, and examiner trends to estimate how broadly a claim might be interpreted. By applying AI-based heuristics, it can suggest whether a claim is too broad and likely to be rejected, or too narrow and susceptible to design-arounds. This module is particularly useful when strategically drafting claims to optimize patent protection while ensuring patentability.

Patent subject matter eligibility rules vary across jurisdictions and are subject to frequent changes in legal precedent (e.g., Alice v. CLS Bank for software patents). The eligibility analysis module 130 may include instructions for automatically compares an invention's technical characteristics against eligibility standards, assessing whether it qualifies as patentable subject matter. The 130 may include instructions for predicting, based on historical data, which sentences (elements, or limitations) of a given claim are likely to be considered judicial exceptions (e.g., abstract ideas, ineligible laws of nature, mathematical concepts, certain methods of organizing human activity, mental processes, etc.) or additional elements. The eligibility analysis module 130 may also include instructions for proactively improving claims by identifying, from a disclosure or specification, which concepts could be considered to provide additional elements that integrate such an abstract idea into a practical application, and/or significantly more than the abstract idea.

Unlike traditional linear drafting methods, the computing system 102-A employs an adaptive traversal strategy that dynamically adjusts the sequence in which document components are processed and generated. Using dependency-aware algorithms, the adaptive traversal module 132 ensures that patent sections are generated logically, minimizing rework and inconsistencies.

Patent applications must maintain internal consistency, ensuring that terms, claims, and descriptions are aligned.

The consistency and completeness module 134 may include instructions for cross-checking an document or document portion to prevent errors such as: Terminology mismatches (e.g., using "data processing unit" in claims but "processor" in the detailed description); antecedent basis (e.g., referring to "the processor 104-A" before introducing "a processor 104-A"); Missing references (e.g., citing "FIG. 3" in the text when no such figure exists); Inconsistent numbering (e.g., claim numbering issues due to amendments); patent profanity (limiting terms, terms that create estoppel issues; unintended disclaimer or obligation, including words such as "must", "only", "always", "necessary", "essential", "critical," "superior", "revolutionary", etc.); terms that are indefinite or unenforceable, etc. The consistency and completeness module 134 may be customized by the user to account for user preferences, and importantly, those of clients.

Patent applications often require multiple embodiments to provide broader protection. The aspect diversification module 136 may include instructions for automatically generating alternative embodiments, ensuring that claims cover different implementations, variations, or technical fields. For example, if an invention involves a sensor system, this module may generate embodiments for different sensor types (e.g., optical, thermal, pressure-based), ensuring comprehensive coverage.

Patent drafting is context-sensitive, meaning that AI-generated text should adapt to specific technical fields, legal requirements, and preferences. The context aware generation module 138 may include instructions for refining text generation by incorporating external context, such as: Patent office guidelines (e.g., EPO's requirements for inventive step); Past examiner decisions (e.g., common objections in a given technology area); and Firm-specific drafting preferences.

The real-time feedback module 140 may include instructions for prompting a user regarding a document. As users draft or edit patents, the real-time feedback module 140 may provide real-time alerts and suggestions. The real-time feedback module 140 may be implemented as web-native application, for a web-based editing workflow. In some aspects, the real-time feedback module 140 may be implemented as a plugin for a text editor (e.g., Microsoft Word). For example, if a patent practitioner modifies a claim, the system computing system 102-A may immediately warn about scope changes or potential conflicts. If an examiner's rejection is processed, the system can highlight specific sections that require modification.

The style transfer module 142 includes instructions for determining the unique drafting style associated with a specific client by analyzing the client's previously filed patent applications, in some aspects. The style transfer module 142 first applies natural language processing (NLP) techniques, including semantic analysis, token-level pattern recognition, and linguistic embedding, to identify the recurring stylistic elements present in a client's historical documents. These stylistic elements may encompass preferred sentence structures, common phraseology, grammatical preferences, formatting conventions, specific claim styles (such as broad versus narrow claiming strategies), and even subtle linguistic nuances reflecting the client's strategic or branding preferences.

Once identified, these stylistic elements are codified and stored within structured data models associated with the client, which may reside within the Data Model Population module 114 and the Relationship Establishment module 116. Specifically, the captured style characteristics can be represented using metadata, JSON schema configurations, or vectorized embeddings, which enable structured and efficient retrieval during drafting. Additionally, the computing system 102-A may process these style characteristics to fine-tune one or more LMs explicitly on client-specific corpora to ensure the fidelity of the stored stylistic preferences.

When a new patent draft is initiated for the client, the system 100 may dynamically retrieve the codified stylistic data and apply it automatically to the generated content. This process may include generating initial draft text using generic or standard templates and then applying client-specific style adjustments through either rule-based transformation or through inference by a fine-tuned language model. Consequently, the newly generated draft closely matches the client's prior submissions in tone, phrasing, formatting, and overall drafting philosophy, significantly reducing manual revision and ensuring consistent quality across filings.

Further, style transfer capabilities can be nuanced and granular, extending beyond client-level style preferences to accommodate the drafting styles of individual partners within a law firm. Each law firm partner may possess distinct stylistic tendencies, such as variations in claim scope, formality, or the level of technical detail. By training or codifying separate stylistic profiles associated with individual partners—using, for example, separate fine-tuned models or distinct style-embedding vectors—the computing system 102-A can be configured to generate patent documents that closely align with the preferred drafting style of the responsible partner, enhancing personalization, accuracy, and efficiency of internal drafting processes within the firm.

Similarly, especially within large corporations having multiple in-house counsel, the style transfer module 142 can be configured to differentiate and codify each counsel's unique drafting preferences, ensuring that every individual's stylistic priorities are respected. By analyzing and storing drafting styles separately for each in-house attorney, the system ensures new patent applications are tailored precisely to match individual preferences for phrasing, formality, claim specificity, and risk tolerance. This approach accommodates variations among in-house counsel who may handle different technology areas, business units, or jurisdictions, thus ensuring their drafting standards remain consistent across diverse filings and enhancing internal alignment and overall patent portfolio coherence.

The present techniques may train ML and AI models as discussed herein. The machine learning training module 144 may include instructions for performing this training. Specifically, training may begin by collecting and preprocessing relevant patent-related data, including historical patent filings, examiner responses, litigation documents, and prior art references. Preprocessing steps may involve tokenization, data cleaning, sentence segmentation, normalization, and annotation, performed using established NLP libraries such as HuggingFace Tokenizers, spaCy, or NLTK. Training datasets may be structured and stored in standardized formats, such as JSON, JSONL, CSV, or Parquet files, facilitating efficient data ingestion into downstream model training processes.

Following data preparation, the machine learning training module 144 may initiate training procedures appropriate to the selected machine learning paradigms. For supervised learning tasks (e.g., section classification, claim type prediction), labeled datasets may be prepared by annotating examples with relevant metadata or class labels. ML libraries such as PyTorch, TensorFlow, scikit-learn, or XGBoost may be used to train supervised models. During training, common administrative practices—such as splitting datasets into training, validation, and testing subsets, defining appropriate hyperparameters, performing k-fold cross-validation, and evaluating performance metrics (accuracy, precision, recall, F1-score)—may be implemented programmatically within scripts or Jupyter notebook environments by the machine learning training module 144.

For transformer-based language modeling tasks, including style transfer, context-aware generation, and semantic analysis, the machine learning training module 144 use frameworks like HuggingFace Transformers and/or OpenAI's API (or other proprietary models) to fine-tune pre-trained language models (e.g., GPT-4, BERT, ROBERTa, or Mistral). These fine-tuning procedures may involve adjusting standard hyperparameters—such as learning rate, batch size, token length, gradient accumulation steps, optimizer selection (e.g., AdamW), and scheduler configurations—documented explicitly in training scripts. The training routines may monitor progress using tools such as TensorBoard or Weights & Biases to visualize training loss, validation accuracy, and convergence rates, enabling real-time adjustment and hyperparameter optimization.

Upon completing training, the machine learning training module 144 may store the trained model's weights, parameters, and configuration files (JSON or YAML formats) securely within dedicated repositories or object storage services, such as AWS S3 or cloud-hosted storage volumes, using standardized naming conventions (e.g., semantic_versioning_model_v1.2.3.pt). The machine learning training module 144 may further store version-controlled model artifacts in structured directories or model registries, ensuring that specific trained models can be consistently referenced, retrieved, and deployed for inference or subsequent retraining.

Further, the machine learning training module 144 may facilitates unsupervised and reinforcement learning tasks. For unsupervised learning (such as topic modeling or clustering), training may include using algorithms like Latent Dirichlet Allocation (LDA) via scikit-learn or gensim, or clustering algorithms (e.g., k-means or hierarchical clustering), to discover latent structures within patent corpora. The resultant unsupervised model outputs (e.g., cluster centroids, topic-word distributions) may be similarly serialized and stored in structured formats (e.g., Pickle or joblib files).

For reinforcement learning approaches to adaptive traversal, the machine learning training module 144 may utilize reinforcement learning frameworks such as Stable-Baselines3, Ray RLlib, or custom implementations based on OpenAI Gym environments, for example. Reinforcement learning models—such as PPO, Deep Q Networks (DQN), or Actor-Critic models—may be iteratively trained by simulating adaptive traversal scenarios, rewarding optimal section ordering or minimizing rework. Administrative processes may include defining reward functions, setting training episode parameters, logging progress, and periodically checkpointing trained policies, storing the policy networks' weights and environment parameters in serialized form for future deployment.

The training data employed by the machine learning training module 144 may include carefully curated datasets segmented into various targeted categories, such as specific clients, individual partners within a law firm, technology domains, jurisdictional requirements, and even stylistic preferences of particular examiners or patent offices. For example, a client-specific dataset might contain patent applications and related prosecution documents that historically reflect a given client's preferred linguistic and structural characteristics, enabling the trained models to precisely capture and replicate that client's distinct drafting style. Similarly, partner-specific datasets could include collections of patents drafted or reviewed by individual partners, reflecting their unique drafting preferences, technical language usage, and stylistic choices-thus allowing fine-grained personalization across different practitioners within the same law firm.

Beyond client or partner delineations, training data can also be organized along other meaningful dimensions. For instance, datasets may be curated according to industry-specific standards or technological disciplines, such as mechanical engineering, software technologies, biotechnology, or chemical inventions, ensuring models learn domain-specific vocabulary and drafting conventions. Further segmentation could occur by jurisdiction or country (e.g., U.S. versus European or Asian patent filings), thereby ensuring generated documents adhere to local patent office practices, statutory requirements, and preferred formats. Another valuable curation strategy involves creating training datasets reflective of drafting preferences of specific patent examiners or patent offices, potentially improving the likelihood of smoother examination processes.

In addition, curated datasets may reflect legal strategy—such as aggressive versus conservative claiming strategies—and market-oriented considerations, such as patents targeting startups versus established corporations. Further granularity may involve segmentation along complexity or application type, such as provisional applications, utility applications, continuation applications, or litigation-oriented filings. Administrative-level categorizations may be used, including training data grouped by internal firm practice groups, technical specialists, or patent agents, each set capturing the distinct drafting styles and preferred technical emphases of these respective individuals or teams.

The machine learning operation module 146 executes trained ML and AI models within the computing environment 100, performing real-time inference tasks for patent drafting, prosecution, and analysis workflows. Specifically, once models have been trained by the machine learning training module 144 and stored securely, the machine learning operation module 146 may retrieve these serialized model artifacts—including model weights, parameters, embeddings, and configuration files—from structured storage repositories or model registries. These stored artifacts, which may be formatted as serialized checkpoint files (e.g., PyTorch '.pt', TensorFlow '.h5', Pickle or joblib files), are dynamically loaded by the module 146 into memory 104-B, ensuring rapid initialization and responsiveness during inference operations.

During operation, the machine learning operation module 146 exposes trained models through carefully designed inference interfaces, e.g., implemented as RESTful API endpoints, internal function calls, or microservices. These inference endpoints receive patent-related input data—such as invention disclosures, technical specifications, or attorney-generated queries—preprocessed by the Input data analysis module 112 into standardized representations (such as tokenized text sequences, structured JSON inputs, or numeric embeddings). The machine learning operation module 146 applies these prepared inputs directly to the loaded model instances, enabling real-time predictions or classifications. These operations may include generating patent sections (such as claims, summaries, or abstracts), performing document classification, extracting key features or inventive concepts, determining claim scope or eligibility, and adaptively recommending traversal orders for document sections.

To ensure robustness and scalability, the machine learning operation module 146 may use containerized runtime environments (e.g., Docker, Kubernetes-managed containers), which host models along with their required dependencies, ensuring consistency and ease of deployment across different computing platforms, including cloud infrastructures (AWS, Google Cloud, Azure) or private firm-hosted servers. Load balancing, auto-scaling, and orchestration mechanisms—implemented through tools such as Kubernetes Horizontal Pod Autoscalers (HPAs) or serverless computing architectures (e.g., AWS Lambda)—may enable handling of simultaneous inference requests from multiple users or parallel workflows without latency degradation or performance bottlenecks.

To enhance operational efficiency, the machine learning operation module 146 may integrate caching mechanisms, such as Redis or in-memory caches, that store frequently requested inference results or precomputed model outputs (e.g., repeated queries or commonly used drafting scenarios). This caching significantly reduces inference latency, especially in computationally expensive tasks. Additionally, batching inference requests—grouping multiple requests for parallel processing—can optimize GPU or CPU resource utilization, further reducing overall latency and computational overhead.

Throughout the operational process, detailed logging, telemetry, and monitoring systems (such as Prometheus, Grafana, or ELK stacks) track inference metrics—including latency, throughput, resource consumption, and accuracy—alerting administrators to potential issues or anomalies, facilitating rapid remediation and continuous model performance tuning. The machine learning operation module 146 may also incorporate real-time feedback loops (in conjunction with the real-time feedback module 140 and the consistency and completeness module 134), immediately detecting and responding to inconsistencies or problematic outputs generated during inference, proactively maintaining high-quality patent document generation.

Further, the machine learning operation module 146 supports dynamic runtime model selection, enabling automatic selection of optimal models based on contextual inputs—such as client identity, practitioner preferences, or jurisdictional requirements—using relationships codified by the relationship establishment module 116. For instance, a specific client or partner might be associated with a finely tuned or stylistically aligned model, and the machine learning operation module 146 may dynamically route inference requests accordingly, ensuring personalized outputs that precisely align with stored stylistic or strategic preferences. Outputs generated by module 146 during inference—such as generated patent claim text, suggested traversal sequences, or analyzed claim scopes—may be passed to other modules, including data model population module 114 and patent document representation module 120, ensuring integration into patent workflows. Given the distributed nature of ML and AI models, the machine learning operation module 146 may also access one or more message queues, as discussed in further detail below.

The retrieval module 148 may include instructions for dynamically retrieving relevant information—such as prior art, patent office guidelines, case law, jurisdictional standards, and firm-specific drafting preferences—to enhance AI-driven patent drafting, prosecution, and litigation workflows. Specifically, the retrieval module 148 implements Retrieval-Augmented Generation (RAG) techniques, wherein queries or prompts are decomposed, encoded, and matched against indexed data sources to identify contextually relevant documents or sections that improve the accuracy, relevance, and comprehensiveness of generated content. The module 148 may utilize semantic search methodologies, including embedding-based vector searches, transformer-augmented semantic indexing, and hybrid retrieval algorithms combining lexical and semantic search techniques. By intelligently integrating retrieved content into the patent drafting or prosecution workflows, the retrieval module 148 ensures generated outputs are contextually informed, legally precise, and strategically aligned with historical successful filings or jurisdictional precedents, thereby significantly improving the quality and effectiveness of automated document generation and review processes.

The retrieval module 148 accesses a vector database to perform high-precision semantic search and Retrieval-Augmented Generation (RAG) operations, enabling AI-driven patent drafting, prosecution, and litigation workflows. When a query is received—such as a request for relevant prior art or jurisdictional guidelines—the retrieval module first converts the input text into a dense vector representation using a pre-trained transformer model, such as OpenAI's GPT, Google's BERT, or a fine-tuned patent-specific model. This embedding process ensures that semantically similar queries return relevant results, even when phrasing differs. The computed vector is then used to perform a nearest-neighbor search within the vector database, leveraging Approximate Nearest Neighbor (ANN) algorithms such as FAISS, ScaNN, or HNSW to identify the most relevant data points. The module ranks and filters retrieved results using additional metadata indexing techniques, such as jurisdictional rules, case law citations, or claim structure analysis, before integrating them into AI-generated patent documents or responses.

The vector database may be housed within or adjacent to the electronic database 160-A, which stores both structured and unstructured patent-related data. A hybrid storage approach may be used, where structured metadata resides in a traditional SQL-based database, while vector embeddings are stored in a specialized vector search database such as Pinecone, or FAISS. The retrieval module 148 may also interact with message queue 160-B for managing asynchronous retrieval tasks or batch-processing large-scale queries. Additionally, in cloud-based deployments, the vector database may be hosted within distributed storage instances in cloud computing environments 180, allowing for scalable indexing and retrieval. To optimize performance, frequently accessed data—such as commonly cited prior art or frequently referenced claim language—may be pre-embedded and cached, reducing computational overhead. The retrieval module also employs hybrid search techniques, combining vector search with BM25 keyword matching and metadata filtering to ensure high recall and precision. By integrating these advanced retrieval mechanisms, retrieval module 148 enhances the system's ability to dynamically incorporate the most relevant and contextually accurate information into AI-generated patent documents, improving drafting efficiency and legal precision.

The I18N module 150 enables to support multi-language patent drafting and jurisdictional adaptations. It allows patents to be translated, formatted, and structured according to regional requirements, ensuring that users can draft applications for global filings. The data generated by the modules 100 may be transmitted from the computing system 102-A to one or more other devices, and/or one or more other permanent and/or transient distributed storage mechanisms, including an electronic database 160-A and a message queue 160-B, in some aspects. This transmission may be facilitated by the NIC 106.

The NIC 106 may be configured to facilitate communication between the computing system 102-A and external devices, databases, or distributed storage mechanisms (e.g., electronic database 160-A 160-B, etc.) via an electronic network 170. The computing system 102-A may also access one or more cloud computing environments 180 via the NIC 106 and the electronic network 170. For example, the one or more cloud computing environments 180 may include public, private, or hybrid cloud platforms, such as Amazon Web Services (AWS), Microsoft Azure, Google Cloud Platform (GCP), or IBM Cloud, configured to provide on-demand computing resources (e.g., virtual machines, containers, GPU-accelerated nodes) and storage services (e.g., object storage, distributed databases) for patent drafting operations.

These cloud environments 180 can further support machine learning training and inference by hosting AI model endpoints/deployments and orchestrating scalable compute clusters, allowing the computing system 102-A to dynamically spin up or scale down resources as patent drafting tasks vary in complexity or volume. For instance, GPU-based instances may be provisioned to train large language models or process real-time patent document generation, while serverless computing services (e.g., AWS Lambda, Azure Functions, Google Cloud Functions) may be used to handle event-driven triggers or short-lived tasks. By leveraging the cloud computing environments 180, the computing system 102-A can efficiently manage load balancing, failover, and distributed processing, ensuring high availability and robust performance across diverse patent drafting and prosecution workflows.

The NIC 106 may support wired or wireless connectivity, including but not limited to Ethernet, Wi-Fi, cellular (4G/5G), or other network protocols suitable for high-speed data transmission. The NIC 106 may include hardware and software components that optimize network efficiency, including TCP/IP stack management, encryption modules for secure communication (e.g., TLS/SSL), network traffic prioritization algorithms, and latency-reduction mechanisms for handling real-time AI inference requests. In cloud-hosted implementations, the NIC 106 may be a virtual network interface (e.g., AWS Elastic Network Interface (ENI), Azure Virtual Network Interface, or Google Cloud VPC), dynamically scaling bandwidth and optimizing packet routing based on network traffic conditions. In some aspects, a plurality of virtual NICs may be associated with one or more cloud instances.

For example, the electronic database 160-A may be a relational database, such as PostgreSQL, MySQL, MariaDB, or Microsoft SQL Server, structured to store and manage patent-related data efficiently. In some aspects, the database may be implemented using an object-relational mapping (ORM) framework, such as SQLAlchemy, Hibernate, or Django ORM, enabling integration with data models of the broader computing system 100 and allowing for flexible query execution. The electronic database 160-A, in addition to or in alternative to relational databases, may include NoSQL databases such as MongoDB, CouchDB, or Firebase, particularly when handling semi-structured or unstructured data, such as natural language text, images, or AI-generated metadata. A hybrid approach may also be utilized, where a relational database stores structured metadata (e.g., client data, patent application records, document sections), while a NoSQL or document-based database holds AI-generated text snippets, embeddings, or vectorized representations of prior art references.

Furthermore, the electronic database 160-A may support graph-based storage using systems like Neo4j or Amazon Neptune, particularly useful for storing relationships between claims, dependencies among patent document sections, or semantic linkages between prior art references and claim structures. Graph-based storage enables efficient traversal and relationship-based querying, which is particularly beneficial for the operations of the adaptive document traversal module 132 and the semantic relationship analysis module 126.

For example, computational operations of the patent tech computing environment 100 may involve accessing a message queue 160-B, in some aspects. The 160-B is described further herein, but in general, may be a message queue such as a FIFO queue, a distributed message queue such as celery, Kafka, RabbitMQ, or other task orchestration frameworks that enable asynchronous, parallel, and scalable task execution. The message queue 160-B acts as an intermediary between various processing components, ensuring efficient workload distribution, load balancing, and fault tolerance within the computing system 100.

In practice, when an ML or AI operation is requested—such as generating a claim set, classifying an invention disclosure, processing a document traversal sequence, or applying a style transfer transformation—the request may be encapsulated as a message and pushed onto the message queue 160-B. This message contains metadata specifying the task type, input parameters, priority level, execution constraints, and callback references. The queue then assigns these tasks to available worker nodes, which may be containerized services running ML models, cloud-based AI inference endpoints, or distributed compute nodes.

The message queue 160-B may include one or more queues that operate in one of several modes: FIFO Mode (First-In-First-Out): Ensures strict sequential processing for tasks where order is critical, such as document traversal and dependent section generation; Priority Queue Mode: Assigns priority levels to tasks, enabling urgent requests (e.g., real-time claim amendments or interactive AI-assisted drafting) to be processed ahead of batch operations (e.g., full corpus analysis or retraining models); Distributed Queue Mode: Uses a distributed backend like Celery, Kafka, or RabbitMQ to manage parallel execution across multiple nodes, improving system scalability and responsiveness.

Once a worker node picks up a task, it may retrieve the appropriate ML model (as managed by machine learning operation module 146) and executes the inference operation. If the model is large or requires preloading, the queue 160-B may ensure that instances are pre-warmed in GPU-accelerated environments (e.g., TensorFlow Serving, TorchServe, ONNX Runtime) to minimize cold start latency. Additionally, batching and micro-batching strategies may be applied-grouping similar requests for more efficient computation, reducing redundant model invocations, and optimizing GPU/TPU utilization.

Upon task completion, the worker node may push the result back onto a result queue or directly updates the corresponding database entries within data model population module 114, for example. If additional processing is required—such as validating output consistency via module 134 or applying client-specific style refinements via module 142—the message queue 160-B may trigger secondary task workflows in a chained execution model. In cases where real-time feedback is needed (e.g., interactive patent drafting suggestions), the user interface interaction module 118 may be notified immediately (e.g., via WebSockets or event-driven APIs).

The message queue 160-B plays an important role in decoupling ML/AI tasks, enhancing system scalability, managing task execution priorities, and enabling real-time responsiveness within the patent drafting, prosecution, and document generation pipeline. By integrating structured queue-based task management, the system ensures high availability, distributed fault tolerance, and efficient AI-driven document automation.

The electronic network 170 may include one or more private networks, public networks, and/or the Internet, facilitating communication between the computing system 102-A and the client device 102-B. The electronic network 170 may support various communication protocols, including TCP/IP, HTTP/HTTPS, WebSockets, gRPC, and MQTT, to enable efficient data exchange between components of the patent drafting system. The electronic network 170 may include wired and wireless communication infrastructure, such as fiber-optic, Ethernet, 4G/5G cellular networks, Wi-Fi, and satellite-based communication, ensuring low-latency, high-bandwidth connectivity for patent practitioners accessing AI-driven drafting tools remotely. In cloud-based implementations, the electronic network 170 may include virtual private cloud (VPC) networks, content delivery networks (CDNs), and/or edge computing nodes to optimize patent document processing speed and network efficiency. The electronic network 170 may also include network security layers, ensuring the confidentiality and integrity of patent-related communications. These security measures may include TLS/SSL encryption for secure data transmission, VPN tunnels for secure remote access, firewalls to prevent unauthorized access, and identity-based authentication mechanisms (e.g., OAuth, multi-factor authentication (MFA), or SAML-based single sign-on (SSO)). The electronic network 170 may further enable real-time collaborative patent drafting, allowing multiple users to simultaneously access and edit a patent document, with synchronized updates managed via real-time database synchronization (e.g., Firebase, WebRTC, or WebSockets). This ensures that attorneys, inventors, and reviewers working from different locations can collaboratively refine patent drafts without versioning conflicts. Additionally, the electronic network 170 may be optimized for cloud-based AI model inference, facilitating API-based interactions with remote AI services (e.g., OpenAI, Google Vertex AI, AWS SageMaker, or Anthropic Claude) for natural language generation, style adaptation, semantic analysis, and claim optimization. In cases where inference is performed on local hardware, the electronic network 170 may support peer-to-peer (P2P) data exchange between on-premises machines and cloud-based storage or processing units. The electronic network 170 may facilitate bidirectional communication between the computing system 102-A and the client device 102-B.

The client device 102-B may be a computing device used by a patent practitioner, inventor, or legal professional to interact with the computing system 102-A for drafting, prosecuting, or analyzing patent documents. The client device 102-B may include, but is not limited to, a desktop computer, laptop, tablet, mobile device, thin client, or a virtualized computing instance operating in a cloud-based environment. The client device 102-B may include a processor, memory, storage, a network interface, and input/output components, allowing the user to access the patent drafting system over the electronic network 170. The device may support various operating systems such as Windows, macOS, Linux, iOS, or Android, ensuring compatibility with web-based, desktop, and mobile applications provided by the computing system 102-A.

In some implementations, the client device 102-B may execute a web browser or native application to interface with the computing system 102-A. The user interface interaction module 118 of the computing system 102-A may render patent drafting tools, claim validation features, and AI-assisted text generation capabilities within the client-side application. The client device 102-B may support real-time communication protocols such as WebSockets, gRPC, or MQTT, allowing dynamic updates and interactive collaboration with other users working on the same patent document. For example, multiple patent practitioners may access and edit a patent application in parallel, with real-time changes synchronized via cloud-based storage (e.g., Firebase, AWS S3, or a NoSQL database). In some aspects, the client device 102-B may support local AI inference for certain on-device machine learning (ML) tasks, such as style transfer, document summarization, or real-time language translation via the 118N module 150. This opt-in optimization can enable low-latency AI-powered drafting assistance without requiring a round-trip to a cloud-based model inference service.

In some aspects, the client device 102-B may function as a standalone patent drafting tool, capable of offline mode operation, where patent documents can be drafted and reviewed even without an active network connection. When the device reconnects to the electronic network 170, the client device 102-B may synchronize local changes with the computing system 102-A, ensuring data consistency and version control. The client device 102-B may serve as the primary interface for patent practitioners to interact with the AI-driven patent drafting, prosecution, and litigation tools, providing a user-friendly environment that enhances efficiency, accuracy, and automation within the patent drafting workflow.

The patent tech computing environment 100 may be implemented using a mix of technologies, in some aspects. For example, users may access the computing system 102-A remotely via an electronic network, as shown. The computing system 102-A may include a web application (e.g., a Python-Flask application) and a task queue (e.g., Redis and/or Celery). The web application may accept requests via the remote user(s) and may provide access to an administrative view and/or to a frontend view. The computing system 102-A may run a daemon that allows a user to access the server via a shell client (e.g., a secure shell (SSH) client) to execute command line commands. Some or all fo the computing system 102-A may be instantiated in a cloud computing infrastructure (e.g., a DigitalOcean droplet, an Amazon Web Services computing instance, etc.).

While the computing system 102-A and the client device 102-B may be referred to in the singular for simplicity of exposition, a plurality of computing systems 102-A may be deployed in the patent tech computing environment 100. Likewise, a plurality of client device 102-B may access the computing system 102-A in the patent tech computing environment 100. For example, each practitioner at a law firm may have one or more client device 102-B (a desktop computer and a mobile computing device) that the practitioner uses to access the memory 104-B via different mechanisms (e.g., a website and a mobile computing device, respectively, for example).

The task queue may be configured to run tasks synchronously and/or asynchronously. For example, in some aspects, a patent attorney user may access a user interface generated by the server.

In operation, the computing system 102-A automates the process of drafting, prosecuting, and litigating patents using advanced artificial intelligence models and machine learning. The computing system 102-A receives input data related to patents, analyzes this data using a selection of AI models, and generates output data that comprises drafted patent documents, prosecution actions, or litigation documents. This data is then made available for review or further action through a user interface, allowing patent attorneys, agents, and other users to benefit from an accelerated and enhanced patent management process. Actors in this environment may include administrators populating data models, patent attorneys reviewing generated documents, and technological specialists focusing on the optimization of artificial intelligence models used within the system. Several example use cases will now be discussed. It should be appreciated that many additional use cases are envisioned. The present techniques are in use in at least one large boutique intellectual property law firm, by intellectual property law practitioners whose levels of experience range from less than one month to over three decades. Two things are certain in view of this testing: first, the uses of the present techniques are only limited by the imagination of those users; and second, these tools have quickly become an indispensable tool for practitioners across the spectrum of intellectual property law practice.

Exemplary Computer-Implemented Use Cases

Unlike traditional patent drafting, which follows a rigid linear order, the computing system 102-A employs an adaptive traversal strategy that dynamically generates patent sections in a non-linear sequence. Patent documents inherently contain sections that depend logically upon other sections. For example, a user might first generate a detailed figure depicting an invention's computing environment (FIG. N), explicitly labeling elements such as processors, memories, and network interfaces. Subsequently, the user may draft descriptions of processes (FIG. N+1) or methods that directly reference these previously introduced components, or an exploded diagram of a single component of an earlier figure. To manage these dependencies efficiently, the adaptive traversal module 132 includes instructions that ensure each figure or section is generated only after all elements it references have been created, even if that means drafting certain parts out of traditional display order. This approach prevents the confusion and inaccuracies commonly introduced by linear drafting methods, which might otherwise necessitate multiple revisions or reworks.

An example scenario illustrates this clearly: a user initially generates a schematic diagram showing the architecture of a neural network (in a section such as "Detailed Description," corresponding to FIG. N+2). Although this figure appears later in the patent document's linear order, the adaptive traversal system generates it early in the drafting process. Once this figure is established, the user can proceed to draft preceding sections such as the "Brief Summary" or "Brief Description of the Drawings," directly referencing the neural network architecture. The system automatically manages this sequence, ensuring that dependencies are maintained logically and consistently, even though the actual display order differs from the logical generation order.

Moreover, this adaptive traversal logic is particularly powerful when combined with AI agents capable of processing an entire input disclosure, such as an academic paper or technical specification. These agents may interface with the input data analysis module 112, the feature extraction module 124, the semantic relationship analysis 126, and the patent document representation 120 to thoroughly analyze and infer the inherent logical structure within a provided disclosure. By employing natural language processing (NLP) techniques and semantic embeddings, these AI agents may automatically identify key sections within the disclosure-such as background information, methods, experimental results, and conclusions- and map them onto corresponding patent application sections, including Background, Detailed Description, Claims, and Abstract.

The adaptive traversal module 132 may facilitate this advanced workflow, by enabling the AI agent to employ graph-based traversal algorithms, such as Depth-First Search (DFS) or variations, to navigate complex dependency graphs that emerge from analysis of the input disclosure. For example, the agent may first construct a directed acyclic graph (DAG) representing dependencies between various extracted sections or figures. Using adaptive heuristics, it determines an optimal logical sequence for generating patent sections, ensuring each patent component (e.g., claims) is drafted only after the generation of all prerequisite components (e.g., detailed descriptions or figures). This algorithmic traversal allows the AI agent to systematically handle interdependent sections, minimizing inconsistencies and the need for manual corrections.

Further, to accurately infer and translate document structures from academic papers into patent formats, the AI agent may utilize techniques such as transformer-based embeddings (e.g., BERT, GPT) to recognize and label semantic sections, and topic modeling algorithms (e.g., LDA) to identify overarching technical themes and their associated subsections. This semantic insight allows the agent to map sections of the input disclosure onto the established logical template of a patent application, creating a cohesive, well-organized draft that aligns closely with conventional patent office standards.

The AI agent may continually verifies and refines this mapping through iterative interactions with additional modules including the Consistency and Completeness module 134 and the Real-Time Feedback module 140, immediately flagging structural gaps or logical inconsistencies for correction. By proactively integrating these modules, the agent ensures that the patent application remains internally consistent, accurately reflects the disclosed inventive content, and effectively manages complex logical dependencies throughout the drafting process.

For another example, consider an academic paper describing a sophisticated mechanical robotic arm designed for precision manufacturing. Assume that the paper contains detailed text disclosures alongside numerous figures-such as structural diagrams (FIG. M), joint mechanisms (FIG. M+1), gripping elements (FIG. M+2), actuator assemblies (FIG. M+3), and control circuit layouts (FIG. M+4). Each figure has corresponding explanatory text interwoven throughout the document, describing specific technical details, component interconnections, and operational characteristics. Importantly, the paper also includes significant description (frontmatter, introductory text, problem statement, results section, testing data) that is not specific to any figure, but is rather directed to the technology of the paper, in a general sense.

An AI agent within the computing system 102-A may process the full disclosure using the input data analysis module 112, the feature extraction module 124, and the semantic relationship analysis module 126. The agent may first generic text sections—paragraphs describing general device functionality, background context, manufacturing advantages, or overall invention objectives. These sections may be determined through NLP techniques, including semantic embedding similarity comparisons (e.g., using BERT embeddings), to distinguish broadly applicable text from figure-specific descriptions.

Next, the AI agent may isolate figure-specific text by detecting phrases explicitly referencing components or operations shown in particular figures—for example, "FIG. 2 illustrates the rotatable joint mechanism," or "as shown in FIG. 4, the actuator is positioned adjacent to the elbow linkage." Leveraging these textual markers, the agent maps paragraphs or sentences to individual figures, creating clearly defined figure-description pairings. Once the text corresponding to each figure is segmented, the agent may employ previously defined templates (e.g., via the patent document representation module 120 and the logical and linear ordering management module 122) to automatically draft each figure's patent-compliant description. For example, the agent generates descriptions such as: "FIG. M depicts an exemplary robotic arm assembly (100), comprising a base platform (102), articulated arm sections (104, 106), and an end-effector mount (108)," inserting numbered labels that correlate directly with diagram elements, and also including the relevant discussion of that feature as identified in the first step. Each subsequent figure receives a templated description structured similarly, enumerating labeled elements explicitly described in the original disclosure.

This templated approach ensures consistency across figure descriptions, allowing straightforward referencing and efficient traversal. The agent further uses an adaptive traversal algorithm, such as Depth-First Search (DFS) or an adaptive variant thereof, to ensure logical ordering—drafting figures that depict foundational structures (e.g., overall robotic arm assembly, FIG. M) before figures dependent on them (e.g., control circuitry, FIG. M+4). Thus, each figure and corresponding description logically build upon preceding figures, reinforcing clarity and coherence in the resulting patent document.

Moreover, generic text extracted earlier by the agent—such as overarching invention summaries or manufacturing advantages—is mapped separately into standard patent application sections (e.g., "Brief Summary of the Invention", "Background" and "Detailed Description"). By distinguishing general disclosure text from figure-specific descriptions, the agent ensures each section of the generated patent accurately reflects both the invention's overall context and its detailed technical characteristics, fully compliant with patent drafting standards.

The computing system 102-A enables the user to interactively edit the resulting document. For example, as soon as sections of the application are generated, the patent practitioner can immediately rewrite any generated patent sections through an intuitive, interactive graphical user interface (GUI). Within this GUI, sections such as figure descriptions, claims, abstracts, or detailed embodiments are displayed clearly, as editable text boxes or structured form fields. The practitioner may select a specific section—such as the description of FIG. M+2 (gripping elements)—and directly edits the displayed text in real-time. The system dynamically captures these edits and integrates them into the underlying patent document structure.

This immediate rewriting capability is facilitated primarily by the user Interface Interaction module 118, which handles the presentation of content, real-time user events, and responsive updates within the interface. As the practitioner edits content, the real-time feedback module 140 concurrently monitors the changes, instantly providing suggestions, warnings, or alerts to prevent inconsistencies or inaccuracies (e.g., incorrect numbering references, undefined technical terms, or formatting issues). The user's edits may be persisted to a stored copy of the edited text, immediately or upon the user pressing a "save" button associated with the edited content.

In parallel, the consistency and completeness module 134 may automatically analyzes edited sections to verify adherence to internal consistency rules, confirming that any modified figure descriptions align accurately with their referenced elements and with claims or embodiments defined elsewhere in the patent. If the practitioner's edits affect dependencies—such as changing labels or adding components—the adaptive traversal module 132 may dynamically recalculates logical dependencies and regenerates impacted patent sections as necessary.

Furthermore, if the practitioner wishes to rapidly explore alternate phrasings or stylistic variations, the style transfer module 142 may enables on-demand transformation of the revised section, instantly adjusting language style, tone, or formality according to preset templates or jurisdiction-specific standards. Additionally, the context-aware generation module 138 may assist the practitioner by instantly generating alternative wording, additional embodiments, or clarifications in response to the newly revised text, directly within the interactive GUI.

Once the practitioner finalizes edits, the data model population module 114 may store the updated information back into the structured patent data model (e.g., in the electronic database 160-A), preserving all modifications in a version-controlled and organized manner. This ensures that every change—whether minor or extensive—is immediately reflected throughout the system, maintaining accuracy, consistency, and completeness across the patent drafting lifecycle.

Thus, the computing system 102-A enables user to automate the process of drafting, prosecuting, and litigating patents by leveraging advanced artificial intelligence models. It receives input data related to patents, analyzes this data using a selection of AI models, and generates output data that comprises drafted patent documents, prosecution actions, or litigation documents. This data is then made available for review or further action through a user interface, allowing patent attorneys, agents, and other users to benefit from an accelerated and enhanced patent management process. Actors in this environment may include administrators populating data models, patent attorneys reviewing generated documents, and technological specialists focusing on the optimization of artificial intelligence models used within the system.

Exemplary Computer-Implemented Methods

Figure 2A:
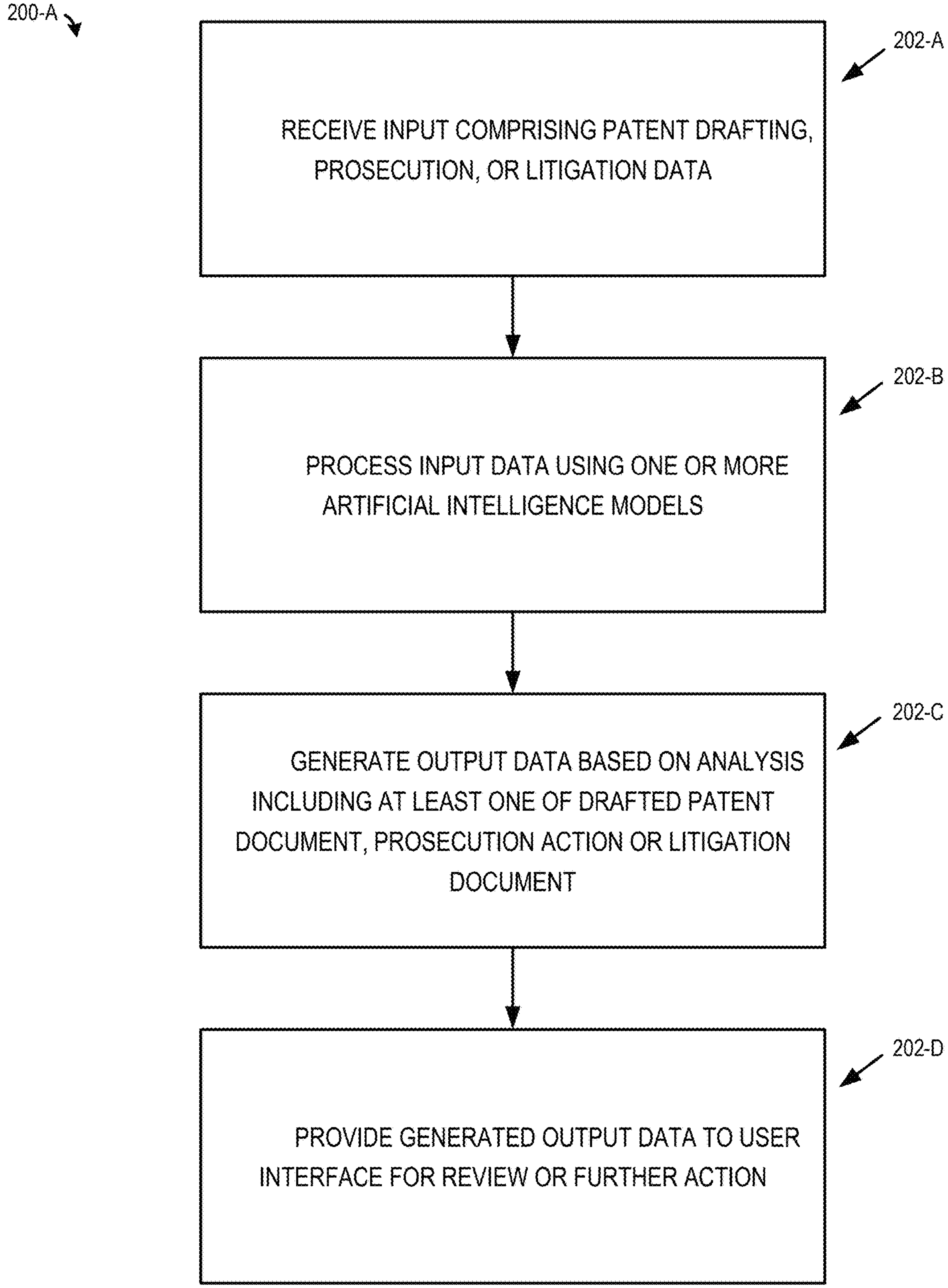
FIG. 2A depicts a computer-implemented method for analyzing and generating legal documents related to patent drafting, prosecution, or litigation based on input patent-related data, according to some aspects.

FIG. 2A depicts a computer-implemented method 200-A for analyzing and generating legal documents related to patent drafting, prosecution, or litigation based on input patent-related data, according to some aspects. This method is designed to automate and enhance the process of creating and managing patent documents through the utilization of specific artificial intelligence (AI) models. The method encompasses several steps aimed at simplifying and accelerating tasks traditionally performed by conventional patent generation systems. By integrating AI technology, this process not only speeds up document creation but also introduces new ways to approach complex legal challenges.

The method 200-A may include receiving an input that comprises patent drafting, prosecution, or litigation data (block 202-A). This data can be diverse, including textual information related to patent applications, legal arguments for prosecution, or evidence and arguments in litigation contexts. The input data may be processed by the input data analysis module 112, the data model population module 114 and the relationship establishment module 116 as discussed herein. The computing environment 100 may receive inputs through various interfaces, such as online forms, email parsers, or direct database entries. At block 202-A, multi-modal inputs may be received (e.g., rich text, plain text, structured data (e.g., HTML, JSON, XML, etc.), images, audio data, video data, etc.). This flexibility allows users to feed data into the system in a manner that aligns with their workflow.

Next, the method 200-A includes processing the input data using one or more artificial intelligence models equipped with capabilities to understand and process natural language (block 202-B). The analysis at block 202-B may include identifying key components, such as claims, inventive concepts, or relevant legal precedents, depending on the nature of the input. At block 202-B, an agent may process invention disclosure forms to infer the structure and content of those documents.

The method 200-A may include generating output data based on the processing (block 202-C). The output data may include a variety of document types, such as portions or entireties of drafted patent applications, portions or entireties of responses to office actions during prosecution, and/or portions or entireties of written briefs and arguments for litigation purposes. Block 206 transforms the analyzed data into tangible outputs that are directly applicable in legal processes. Importantly, the generated documents reflect the insights and patterns identified by the AI models, ensuring they are of high relevance and quality.

The method 200-A may provide the generated output data to a user interface for review or further action (block 202-D). For example, the user interface may be displayed on a screen of the client device 102-B, in some aspects. The method 200 may cause the generated output data to be displayed on the screen. This step ensures that the generated documents are accessible to users, who may review and edit the documents through a multi-turn conversation. The user interface may include elements to allow the user to make adjustments, approve documents for submission, or take other actions as needed.

In some aspects, the method 200-A further includes retrieving contextually relevant information from one or more databases to enhance the generation of output data. For example, the retrieval module 148 (FIG. 1) may access a vector database that stores embeddings of patent-related documents, prior art references, case law, or examiner guidelines. By matching user inputs or identified claim features against these embeddings, the retrieval module 148 can retrieve documents that are semantically similar, thereby enabling more informed drafting or prosecution strategies. This retrieval step may be performed automatically or triggered by a user query, and the retrieved documents may be passed to the AI models at block 202-B to enrich the generated output data at block 202-C.

In further aspects, the method 200-A may include generating real-time suggestions or warnings based on evolving user inputs. In particular, a real-time feedback module 140 (FIG. 1) may continuously monitor the text or arguments being drafted at block 202-C, detecting issues such as inconsistent terminology, potential claim scope problems, or patent profanity. Whenever a discrepancy or opportunity for improvement is identified, the real-time feedback module 140 may prompt the user (e.g., via the user interface interaction module 118) to revise certain claim language or references. This interactive loop ensures that inconsistencies are addressed promptly, improving overall document quality.

In some implementations, the method 200-A may further involve adapting the generated document style to align with firm-specific or client-specific drafting preferences. The style transfer module 142 (FIG. 1) may analyze user-provided examples—such as previously filed applications or office action responses—and extract lexical, syntactic, and formatting patterns. When generating new output data at block 202-C, the style transfer module 142 applies these learned patterns to ensure that the resulting text conforms to preferred drafting conventions. This personalization may also extend to individual attorneys or in-house counsel, allowing each user's unique style to be reflected in the final documents.

In yet other aspects, the method 200-A may incorporate language translation or jurisdictional adaptation steps. Upon generating the output data at block 202-C, the I18N module 150 (FIG. 1) may translate the drafted text into one or more target languages, ensuring readiness for international patent filings. Additionally, the module may apply region-specific requirements-such as EPO formatting rules or USPTO claim numbering conventions-before providing the document to the user at block 202-D. This way, a single drafting workflow can yield multiple jurisdictionally compliant document versions without manual intervention.

The method 200-A may also include maintaining a record of the generated documents and any associated metadata in an electronic database 160-A (FIG. 1) for future reference or analysis. For instance, after the user reviews and finalizes the document at block 202-D, the data model population module 114 may store updated versions of claims, examiner rejections, and arguments as linked entries. The relationship establishment module 116 may map these entries to related patent families, inventor details, or prior art references, thereby creating a comprehensive knowledge graph of patent-related data. This knowledge graph may be subsequently leveraged by the adaptive traversal module 132 or semantic relationship analysis module 126 to streamline future drafting and prosecution activities.

Figure 2B:
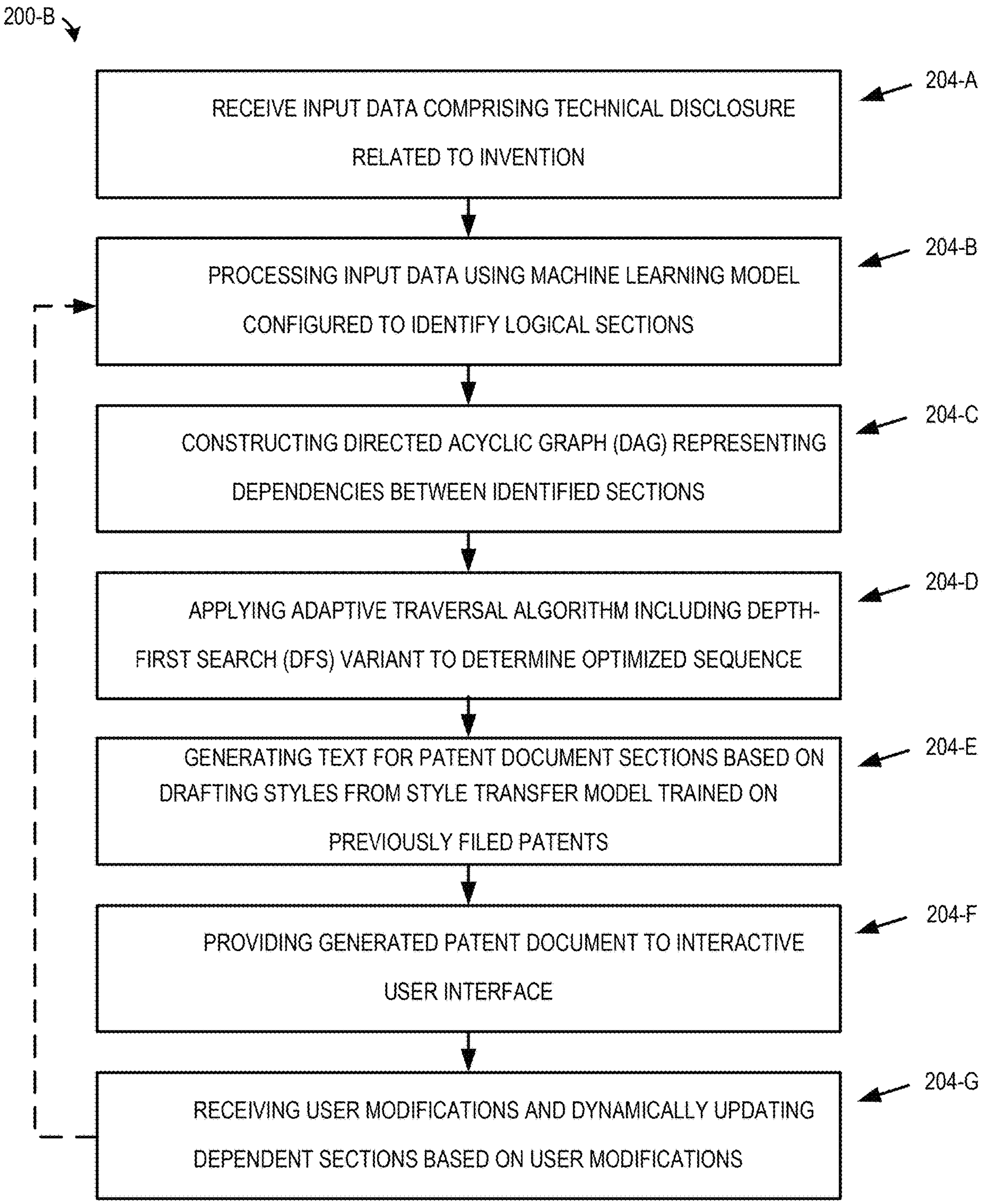
FIG. 2B depicts a computer-implemented method for providing an AI-based patent drafting environment to the user, according to some aspects.

FIG. 2B depicts a computer-implemented method 200-B for providing an AI-based patent drafting environment to the user, according to some aspects. The method 200-B may include receiving input data comprising a technical disclosure related to an invention (block 204-A). The method 200-B may include processing the input data using a machine learning model configured to identify logical sections of a patent document (block 204-B). The method 200-B may include constructing a directed acyclic graph (DAG) representing dependencies between the identified sections (block 204-C). The method 200-B may include applying an adaptive traversal algorithm including a depth-first search (DFS) variant to determine an optimized sequence for generating sections of the patent document based on the DAG structure (block 204-D).

The method 200-B may include generating text for the patent document sections by based on drafting styles from a style transfer model trained on previously filed patents (block 204-E). The drafting styles may correspond to those of a practitioner, an in-house attorney, and/or a client. The method 200-B may include providing the generated patent document to an interactive user interface (block 204-F). The method may include causing the generated patent document (or portions thereof) on a display device of a user. The method 200-B may include receiving user modifications and dynamically updating dependent sections based on the user modifications (block 204-G). The control flow of method 200-B may pass from block 204-G to block 204-B, resulting in an iterative method for providing the AI-based patent drafting environment to a user. The graphical user interface may be a web application served via a web server of the patent tech computing environment 100, a mobile app running in the client device 102-B, or another graphical user interface.

In some aspects, the method 200-B may further involve leveraging a real-time feedback loop to enhance consistency and accuracy while drafting patent document sections. For instance, once the text is generated at block 204-E according to the selected style transfer model, the real-time feedback module 140 (FIG. 1) may continuously evaluate the proposed language for terminology mismatches, antecedent basis errors, or inconsistent claim numbering. If any discrepancies or improvement opportunities are detected, the system may prompt the user through the interactive interface at block 204-F to clarify or adjust the text. This process helps maintain stylistic coherence across sections and ensures all references remain properly aligned, even as the document evolves iteratively from block 204-G back to block 204-B.

In additional implementations, the method 200-B may include retrieving contextually relevant legal or technical information to refine one or more sections of the patent document. When generating text at block 204-E, the retrieval module 148 (FIG. 1) may search a vector database for related concepts, prior art references, or previously filed patent applications that match the user's invention disclosure or style preferences. The retrieved data can then be integrated into the drafted text, ensuring that the final patent document is both thorough and strategically aligned with relevant background materials. This approach further enriches the patent drafting environment by giving practitioners real-time access to a broader knowledge base directly within the drafting interface.

Moreover, the method 200-B may involve applying semantic relationship analysis for each newly generated or updated document section. Specifically, once a user modifies a section at block 204-G, the system may automatically update or refine the directed acyclic graph (DAG) created at block 204-C to reflect how the changes affect dependent sections. By doing so, the adaptive traversal algorithm at block 204-D can recalculate the optimal order for regenerating or reviewing remaining sections, minimizing duplication or conflicts that can arise during iterative drafting.

In further aspects, the method 200-B may incorporate an internationalization (118N) process, allowing the adapted drafting styles at block 204-E to be applied for various jurisdictions and languages. For instance, after the system has generated an English version of the patent text, the I18N module 150 (FIG. 1) may automatically create a jurisdiction-specific version-such as a European Patent Office (EPO) filing-adhering to regional requirements and standardized language. The iterative cycle from block 204-G back to block 204-B thereby facilitates continual refinement and alignment with multiple patent offices' formalities, ensuring that each version remains consistent, logically ordered, and stylistically coherent.

Figure 2C:
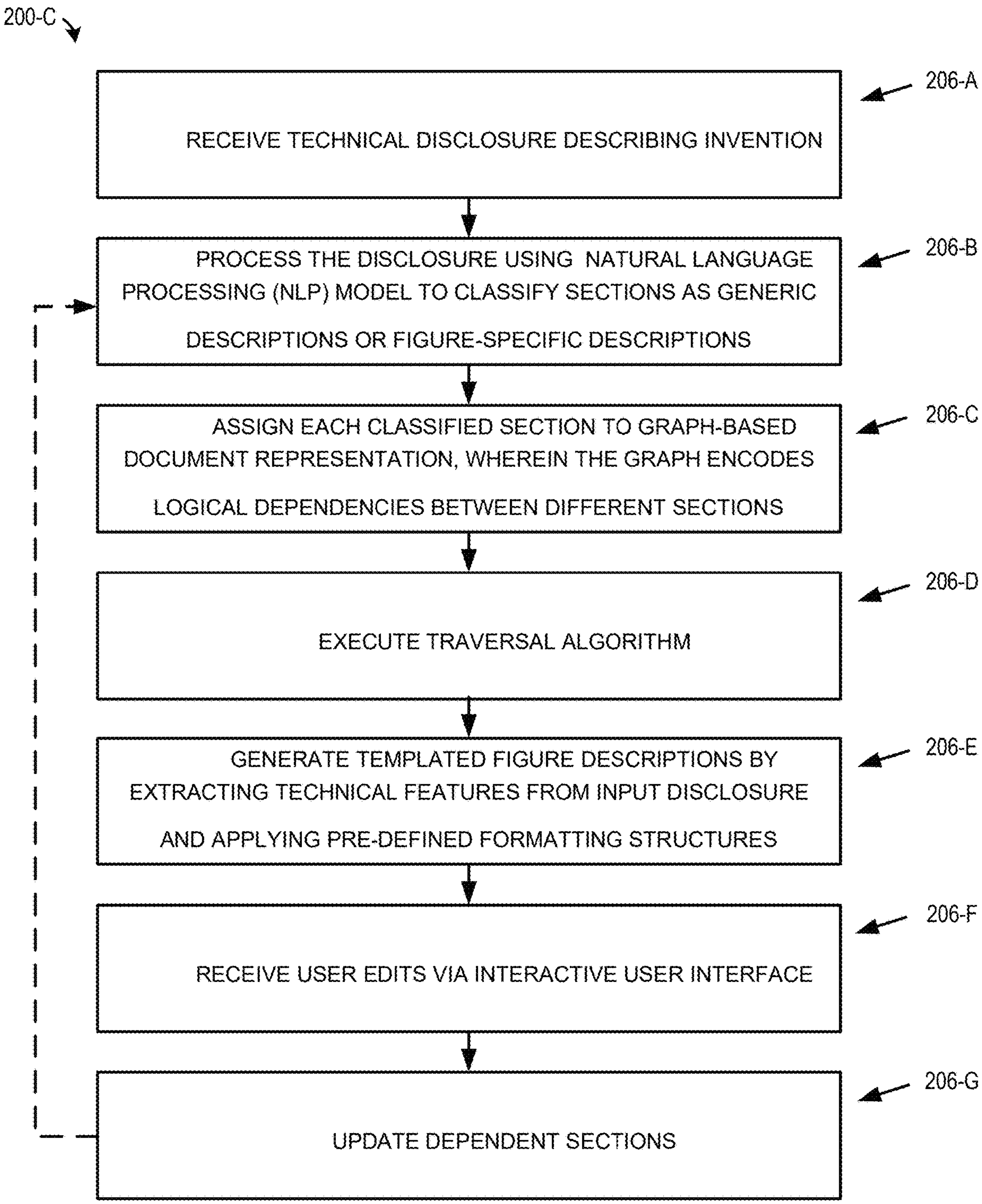
FIG. 2C depicts a computer-implemented method for dependency-aware patent document generation, according to some aspects.

Additionally, the method 200-B may facilitate user collaboration and feedback by integrating revision control and annotation functionalities into the user interface at block 204-F. Multiple users, such as external inventors, in-house counsel, or fellow practitioners, may simultaneously comment on or revise the draft text generated at block 204-E. Each modification is tracked, versioned, and subject to the adaptive traversal logic at block 204-D. As a result, every stakeholder can iteratively refine the patent application, while the system dynamically updates all dependent sections to maintain coherence and reduce drafting errors. FIG. 2C depicts a computer-implemented method 200-C for dependency-aware patent document generation, according to some aspects. The method 200-C may include receiving a technical disclosure describing an invention (block 206-A).

The received technical disclosure may include figures, textual descriptions, and claims that describe the features and functionalities of an invention. The method 200-C may include processing the disclosure using a natural language processing (NLP) model to classify sections as generic descriptions or figure-specific descriptions (block 206-B). The NLP model may analyze the structure of the input text, identify figure references, and determine whether particular sections contain overarching technical details or are directly linked to a specific figure. The method 200-C may include assigning each classified section to a graph-based document representation, wherein the graph encodes logical dependencies between different sections (block 206-C). The computing system may generate a directed acyclic graph (DAG) or other structured representation that maps dependencies between claims, figures, descriptions, and other document elements. The method 200-C may include executing a traversal algorithm configured to ensure that figure descriptions are generated before dependent sections that reference those figures (block 206-D). The traversal algorithm may be a depth-first search (DFS) variant or another dependency-aware algorithm that determines an optimized sequence for generating document sections based on the graph representation.

The method 200-C may include generating templated figure descriptions by extracting technical features from the input disclosure and applying pre-defined formatting structures (block 206-E). The computing system may use AI-driven template-based text generation techniques to ensure that figure descriptions follow a structured, jurisdiction-compliant format. The system may automatically label components within figures and ensure that technical features are consistently referenced across the document. The method 200-C may include receiving user edits via an interactive user interface (block 206-F). The system may provide an editable draft of the patent document, allowing a user to modify generated FIGURE descriptions, claims, or other sections as needed. The method 200-C may include automatically updating dependent sections when a user modifies a figure description or another key section (block 206-G). The system may monitor changes made by the user and apply real-time dependency resolution, ensuring that modifications are reflected in all relevant sections of the patent document. The control flow of method 200-C may pass from block 206-G to block 206-B, resulting in an iterative refinement process for patent document generation. The interactive interface may be provided via a web application, a desktop application, or a mobile client application, allowing users to dynamically edit and optimize patent drafts before finalization.

In some aspects, the method 200-C may further include analyzing semantic relationships between figure descriptions and claims to ensure consistent terminology. Specifically, once the NLP model classifies sections at block 206-B, the semantic relationship analysis module 126 (FIG. 1) can identify key terms in figure-specific sections and cross-reference them with claim language. This ensures that if a user modifies the figure description at block 206-F (e.g., changing a component's name or adjusting its described function), all relevant claim phrases are updated accordingly at block 206-G, maintaining consistency across the entire document.

The method 200-C may also involve incorporating automated feedback loops to prompt the user when inconsistencies or omissions are detected during the iterative refinement. For instance, when a user modifies a figure description at block 206-F, the real-time feedback module 140 (FIG. 1) may detect new technical features not addressed in the claims or textual descriptions. In such cases, the feedback module automatically provides suggestions to revise or add claim language, or to adjust existing descriptions to reflect the newly introduced features. This guided feedback process strengthens the integrity of the patent document by reducing the likelihood of overlooked details.

In additional implementations, the method 200-C may include leveraging retrieval-augmented generation (RAG) to contextualize figure descriptions with relevant prior art or technical references. Before finalizing sections at block 206-E, the retrieval module 148 (FIG. 1) may search a vector database for similar figures, component descriptions, or technical designs previously filed. The system then integrates any useful background or best-practice formatting into the templated figure description, enhancing the quality and thoroughness of the generated text. This retrieval step can be repeated when a user revisits block 206-F to edit or expand figure details.

Moreover, the method 200-C can incorporate style transfer features for figure descriptions, enabling customization based on firm-wide drafting preferences or partner-specific stylistic guidelines. Once sections are generated at block 206-E, the style transfer module 142 (FIG. 1) may compare the text against stored stylistic profiles to align with a chosen drafting style. This ensures that figure-specific descriptions remain consistent with the overarching document style, including typical phraseology, formatting, and rhetorical structure.

In further aspects, the method 200-C may employ a multi-user, collaborative workflow wherein multiple practitioners or inventors concurrently edit figure descriptions and related sections at block 206-F. The data model population module 114 and relationship establishment module 116 (FIG. 1) manage the resulting version conflicts by updating the DAG structure at block 206-G in real time. This ensures that every team member's contributions are integrated seamlessly and that dependent sections remain accurately synchronized, thus streamlining the collaborative patent drafting process.

Figure 2D:
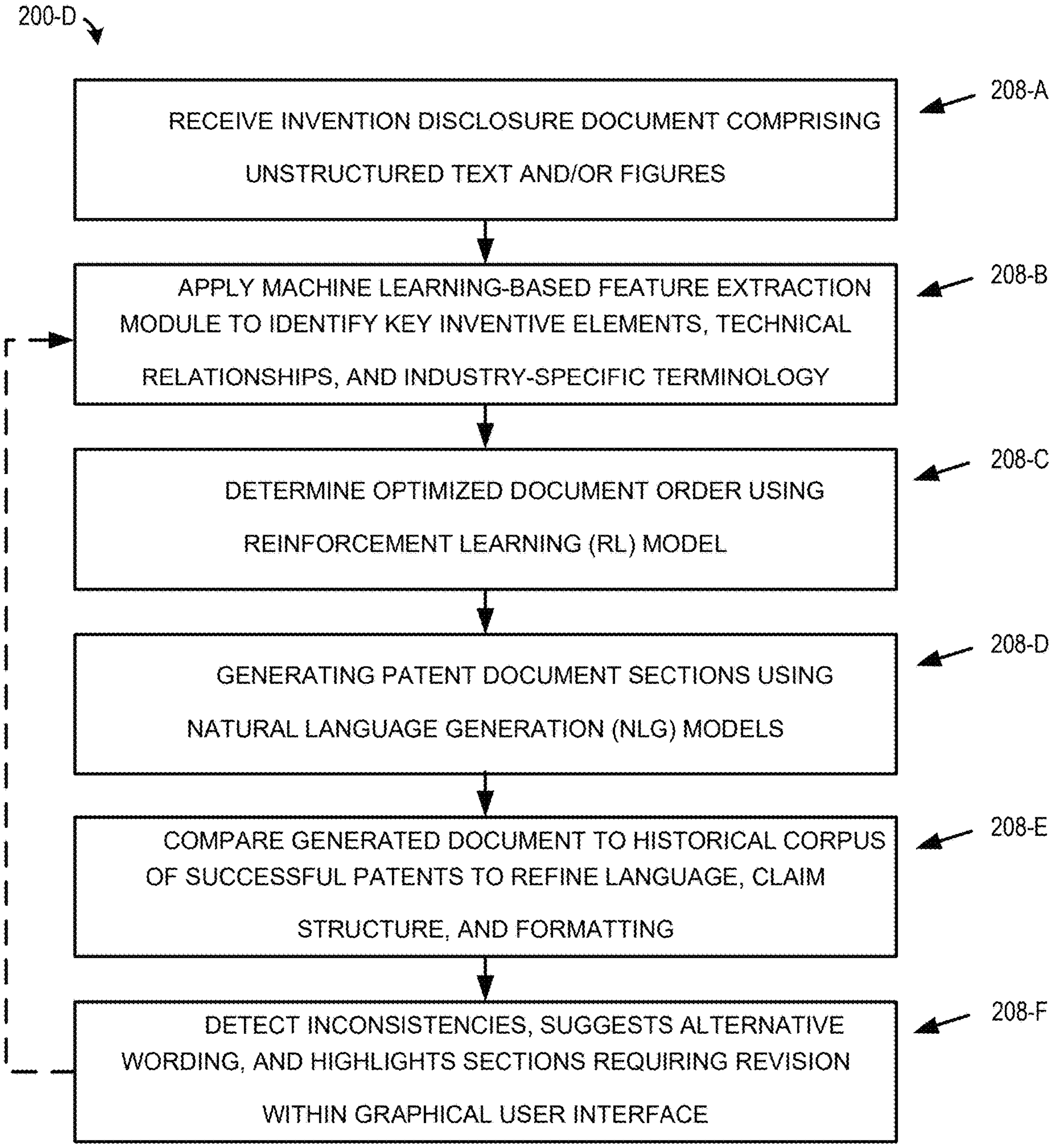
FIG. 2D depicts a computer-implemented method for machine learning-driven patent document optimization, according to some aspects.

FIG. 2D depicts a computer-implemented method 200-D for machine learning-driven patent document optimization, according to some aspects. The method 200-D may include receiving an invention disclosure document comprising unstructured text and/or figures (block 208-A). The received document may include technical descriptions, sketches, diagrams, claims, or any other relevant invention-related content. The method 200-D may include applying a machine learning-based feature extraction module to identify key inventive elements, technical relationships, and industry-specific terminology (block 208-B). The computing system may use natural language processing (NLP) techniques, entity recognition models, and semantic relationship analysis to extract aspects of the disclosure, such as functional components, key differentiators, and commonly used technical terms in the relevant field. The method 200-D may include determining an optimized document order using a reinforcement learning (RL) model, wherein the RL model has been trained to reduce rework and inconsistencies by dynamically sequencing section generation (block 208-C). The RL model may evaluate prior successful patent filings to learn optimal drafting sequences, minimizing conflicts between claims, descriptions, and figures.

The method 200-D may include generating patent document sections using natural language generation (NLG) models, incorporating client-specific drafting preferences retrieved from a relational database (block 208-D). The computing system may apply fine-tuned AI models that adaptively structure patent documents in alignment with previous filings associated with a specific client, law firm, or jurisdictional drafting style. The method 200-D may include comparing the generated document to a historical corpus of successful patents to refine language, claim structure, and formatting (block 208-E). The computing system may utilize similarity scoring algorithms, legal precedent analysis, and style transfer models to ensure consistency with prior filings, reducing ambiguity and improving legal robustness. The method 200-D may include enabling interactive real-time feedback, wherein the system detects inconsistencies, suggests alternative wording, and highlights sections requiring revision within a graphical user interface (GUI) (block 208-F). The GUI may display inline suggestions, formatting corrections, and contextual references to prior patent applications to guide users in improving document quality. The control flow of method 200-D may pass from block 208-F to block 208-B, enabling an iterative improvement cycle where machine learning models continuously refine the patent document based on user interactions and system-generated optimizations. The interactive drafting environment may be provided through a web-based application, local software client, or cloud-hosted AI drafting service. In some aspects, the method 200-D may further integrate retrieval-augmented generation (RAG) to improve the iterative refinement of patent documents at block 208-E. Specifically, after generating an initial draft at block 208-D, the retrieval module 148 (FIG. 1) may search a vector database containing previously issued patents, office actions, and other relevant legal documents to find semantically similar text passages. The retrieved materials may then be used to augment the generated patent text, ensuring that the final document aligns with historical drafting best practices, includes accurate terminology, and remains consistent with the relevant prior art landscape. This retrieval process may be repeated upon detecting user edits at block 208-F, thereby incorporating newly introduced elements into subsequent retrieval queries.

In additional implementations, the method 200-D may employ a claim scope predictor module 128 (FIG. 1) to analyze and optimize the breadth of claims during or after block 208-D. Once the natural language generation (NLG) models produce claim language, the claim scope predictor module 128 may evaluate each claim's level of detail and its vulnerability to rejections or design-arounds. If potential issues are detected—such as overly broad language that might prompt examiner pushback or excessively narrow limitations—the module can suggest alternative phrasing. These recommendations may appear as inline comments or prompts via the real-time feedback mechanism at block 208-F.

Moreover, the method 200-D may incorporate a style transfer module 142 (FIG. 1) to refine sections of the patent document according to specific drafting preferences beyond client-driven requirements. By analyzing patterns in a historical corpus of successful patents, the style transfer module 142 may automatically adjust linguistic features like sentence structure, word choice, and formatting conventions to align with a chosen stylistic baseline-such as those preferred by a particular law firm partner or individual examiner. This adjustment occurs at block 208-E and is continually updated during the iterative cycle returning to block 208-B, ensuring stylistic consistency throughout the evolving document.

In further aspects, the method 200-D may monitor the drafting process for region-specific guidelines or compliance requirements. For instance, while comparing the generated document at block 208-E to a historical corpus, the system may detect that the user intends to file in a jurisdiction (e.g., the EPO or JPO) that imposes unique formatting or claim style rules. Utilizing data gleaned from the 118N module 150 (FIG. 1) and relevant jurisdictional guidelines, the system can automatically highlight or correct non-compliant language at block 208-F, thereby reducing the risk of formal objections and minimizing downstream rework.

Additionally, the method 200-D may leverage the data model population module 114 (FIG. 1) to maintain structured records of each revision made at block 208-F. This approach supports granular version control and traceability, allowing users to revert to earlier drafts if new changes introduce inconsistencies or conflicts. Each revision is mapped to the user who introduced it, and linked to any relevant prior art references, claim dependencies, or technical features extracted at block 208-B. This structured history enables in-depth analysis of drafting decisions, informing the reinforcement learning (RL) model at block 208-C for ongoing improvements in document sequencing.

Figure 2E:
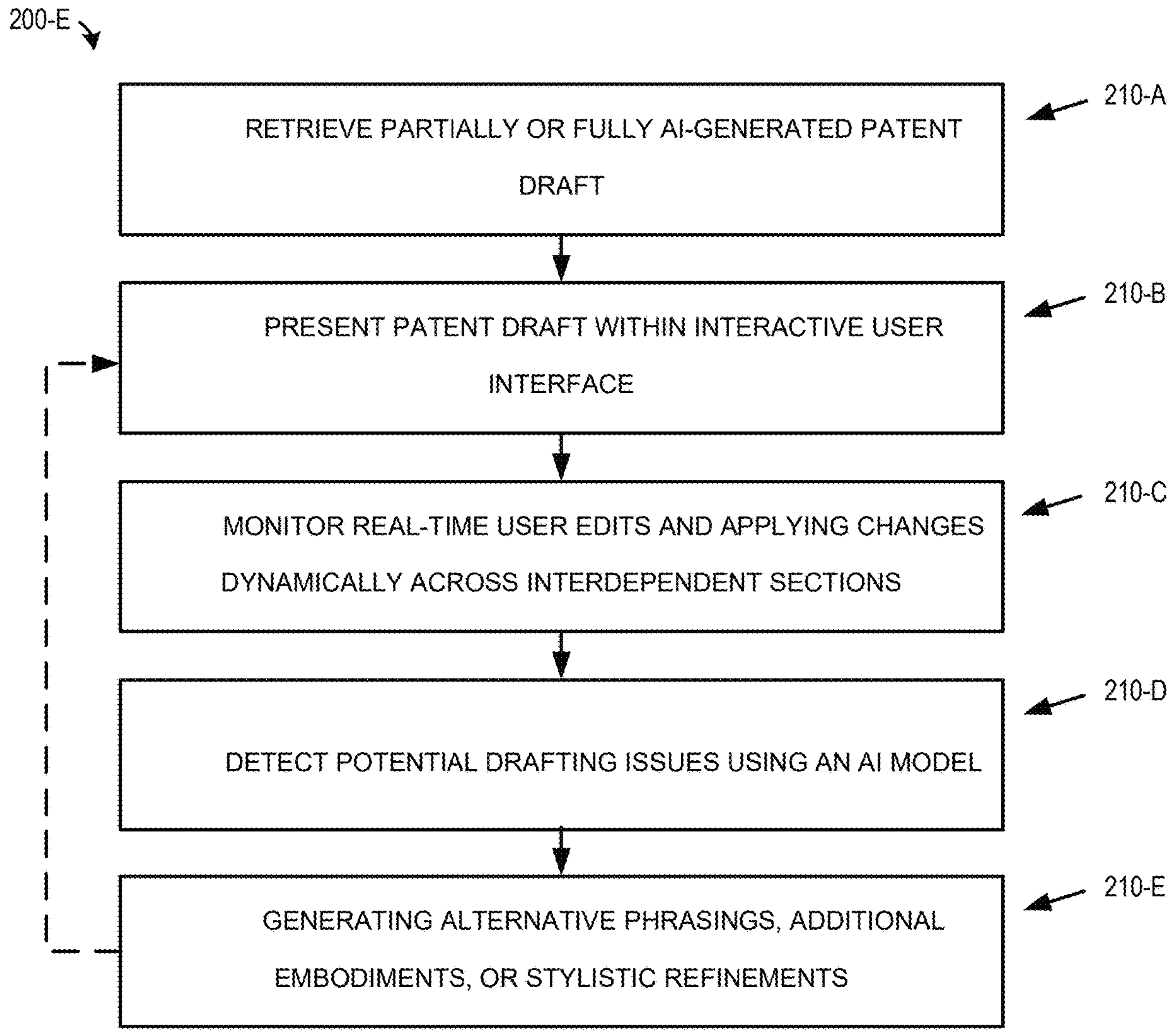
FIG. 2E depicts a computer-implemented method for real-time interactive drafting and editing of patent applications, according to some aspects.

FIG. 2E depicts a computer-implemented method 200-E for real-time interactive drafting and editing of patent applications, according to some aspects. The method 200-E may include retrieving a partially or fully AI-generated patent draft, comprising one or more sections including claims, figures, and embodiments (block 210-A). The patent draft may be retrieved from a structured data repository, a version-controlled database, or an AI model-generated document. The method 200-E may include presenting the patent draft within an interactive user interface, wherein a user can select any section for modification (block 210-B). The user interface may be implemented as a web-based editor, a desktop application, or a plugin for a word processor, providing an interactive document view where users can navigate, select, and modify sections in real time. The method 200-E may include monitoring real-time user edits (i.e., within milliseconds of the user making the edits) and applying changes dynamically across interdependent sections using a consistency and completeness module (block 210-C). When a user modifies a section (e.g., a claim element), the system may automatically propagate necessary updates to related sections (e.g., embodiments, figure descriptions) to ensure internal consistency and logical coherence.

The method 200-E may include detecting potential drafting issues using an AI model trained to flag inconsistencies, missing antecedent basis, or claim scope ambiguities (block 210-D). The AI-based module may use natural language processing (NLP) and rule-based logic to identify drafting errors, such as incorrect references, undefined terms, and claim language that may create prosecution risks. The method 200-E may include automatically generating alternative phrasings, additional embodiments, or stylistic refinements via a style transfer model, ensuring consistency with prior patents filed by the user or their organization (block 210-E). The system may use machine learning models trained on historical patent filings to generate alternative wording that aligns with a specific firm's or client's preferred drafting style, minimizing manual edits. The control flow of method 200-E may pass from block 210-E to block 210-B, creating an iterative drafting process where users continuously refine and improve the patent document while the system dynamically enforces consistency and correctness. The interactive editing environment may be web-based, locally hosted, or cloud-integrated, allowing patent practitioners to efficiently draft, review, and finalize applications in real time.

In some aspects, the method 200-E may further employ a retrieval module 148 (FIG. 1) to augment user edits with contextually relevant information or prior art references in real time. Specifically, once the user modifies a claim or embodiment at block 210-C, the system may convert the edited text into a vector embedding and query a vector database for related disclosures, patent precedents, or technical literature. The retrieved materials can then be highlighted or suggested for inclusion, helping the practitioner refine claim scope and strengthen arguments against potential rejections. This immediate access to additional context encourages thorough and informed drafting decisions without requiring a separate research workflow.

Additionally, the method 200-E may integrate a machine learning operation module 146 (FIG. 1) that continuously updates AI model outputs based on user edits. When a practitioner changes or deletes particular claim language, the AI models—such as those for style transfer or real-time feedback—may retrain or refine their internal representations for the specific drafting session. As a result, subsequent suggestions or alternative phrasings at block 210-E better reflect the user's evolving preferences, improving consistency and personalization in the drafting environment. These updates are managed seamlessly in the background, preserving the user's focus on document quality.

In further implementations, the method 200-E may incorporate internationalization (118N) considerations within the iterative drafting loop. After the user applies changes at block 210-C, the I18N module 150 (FIG. 1) can automatically generate or update a translated version of the amended text, ensuring that any interdependent translations remain consistent with the user's latest modifications. By doing so, practitioners can maintain parallel drafting of multi-jurisdictional applications, reducing errors and aligning each language version with the original document in real time.

The method 200-E may also utilize an adaptive traversal algorithm—such as the one discussed in FIG. 2D or 2C—to identify how edits to one section potentially impact other sections. Once a user modifies a claim element at block 210-C, the adaptive traversal module 132 (FIG. 1) may re-check the dependencies encoded in a directed acyclic graph (DAG). If the edit affects subsequent embodiment paragraphs or figure references, the system automatically updates those sections, minimizing manual rework. This dynamic, dependency-aware approach keeps the iterative drafting cycle efficient and cohesive.

Moreover, the method 200-E may include versioning and collaborative editing features, enabling multiple users—such as attorneys, inventors, and paralegals—to simultaneously edit different sections of the patent draft. By leveraging data model population module 114 (FIG. 1) to store incremental changes and relationship establishment module 116 (FIG. 1) to link each change to its impacted sections, the system ensures that real-time edits remain visible and traceable to all collaborators. This shared editing environment fosters teamwork and transparency, ultimately leading to a more robust and thoroughly vetted final patent application.

Figure 2F:
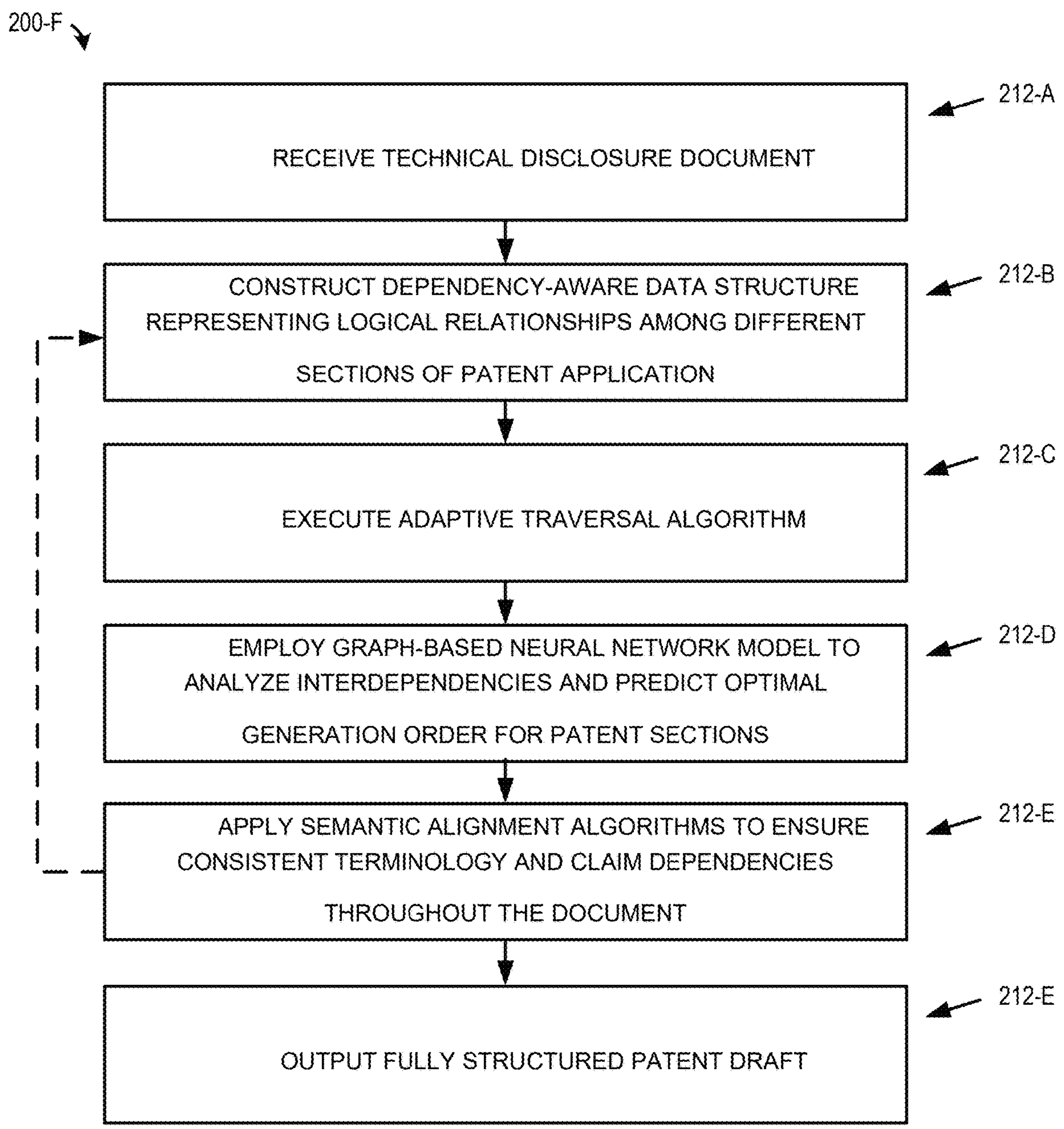
FIG. 2F depicts a computer-implemented method for adaptively traversing and generating patent documents, according to some aspects.

FIG. 2F depicts a computer-implemented method 200-F for adaptively traversing and generating patent documents, according to some aspects. The method 200-F may include receiving a technical disclosure document, including figures and text-based descriptions, from a user or an external system (block 214-A). The received disclosure may include raw textual descriptions, engineering diagrams, claims, and supporting materials related to an invention. The method 200-F may include constructing a dependency-aware data structure representing logical relationships among different sections of a patent application (block 214-B). The dependency-aware structure may be a directed acyclic graph (DAG) or another hierarchical model that encodes dependencies between claims, embodiments, figures, and other document elements. The method 200-F may include executing an adaptive traversal algorithm, selecting an optimal sequence for generating document sections based on learned drafting patterns from historical patent filings (block 214-C). The traversal algorithm may use depth-first search (DFS) heuristics, reinforcement learning-based decision models, or AI-driven dependency resolution techniques to determine an efficient drafting order.

The method 200-F may include employing a graph-based neural network model to analyze interdependencies and predict an optimal generation order for patent sections, reducing inconsistencies and redundant edits (block 214-D). The graph neural network (GNN) may be trained on historical patent documents and examiner feedback, enabling it to intelligently order sections based on logical relevance and prosecution history insights. The method 200-F may include applying semantic alignment algorithms to ensure consistent terminology and claim dependencies throughout the document (block 214-E). These algorithms may include natural language processing (NLP) models, transformer-based embeddings, and rule-based text normalization to unify terminology across multiple sections of the patent draft. The method 200-F may include outputting a fully structured patent draft, ensuring that dependent sections are correctly ordered and formatted in compliance with patent office standards (block 214-F). The system may automatically apply USPTO, EPO, or PCT formatting rules, structuring the final document for submission while allowing further user modifications if necessary. The control flow of method 200-F may pass from block 214-F to block 214-B, allowing for iterative improvements to the dependency structure and traversal order as additional data is incorporated or user modifications occur. This dynamic, non-linear drafting approach reduces inconsistencies, optimizes document flow, and enhances overall patent drafting efficiency.

In some aspects, the method 200-F may further integrate retrieval-augmented generation (RAG) to enhance the adaptive traversal process at block 214-C. By leveraging the retrieval module 148 (FIG. 1), the system can query a vector database for previously issued patents, relevant prior art, or exemplary office action responses. The retrieved documents may provide contextual insights—such as commonly used claim language or similar embodiment structures—that guide the depth-first search (DFS) or reinforcement learning-based decision models in determining an efficient drafting sequence. This ensures the generated sections are not only logically ordered but also informed by best practices and historical successes in patent prosecution.

In additional implementations, the method 200-F may employ the real-time feedback module 140 (FIG. 1) to detect and address potential drafting inconsistencies as the adaptive traversal algorithm progresses. Whenever a new section is generated or updated—such as when the graph neural network at block 214-D detects a need to reorder claims—the real-time feedback module 140 may scan for issues like missing antecedent basis, contradictory claim elements, or misaligned terminology. If any discrepancy is identified, it is flagged for review before the drafting process advances to the next node in the dependency-aware data structure, minimizing the risk of compounding errors.

Furthermore, the method 200-F may include automatically refining stylistic elements in each newly generated section according to user-defined drafting preferences or firm-specific guidelines. For instance, once the semantic alignment algorithms at block 214-E ensure consistency of terminology, the style transfer module 142 (FIG. 1) can adapt sentence structure, vocabulary, and formatting in real time. This approach yields a patent draft that not only maintains technical coherence but also adheres to the stylistic expectations set by the client, firm, or jurisdiction, without requiring manual reformatting.

In some embodiments, the method 200-F may integrate an internationalization (118N) module 150 (FIG. 1) to prepare the structured patent draft at block 214-F for worldwide filing. After the adaptive traversal algorithm completes the generation process and applies the required formatting rules, the 118N module 150 can automatically translate or adapt the content for specific patent offices, such as the European Patent Office (EPO) or the Japan Patent Office (JPO). This translation step respects the established section dependencies and ensures that any subsequent improvements loop back into the DAG at block 214-B, maintaining cross-language consistency throughout iterative edits.

Moreover, the method 200-F may be configured to handle collaborative drafting scenarios where multiple users simultaneously edit different nodes within the dependency-aware structure. By storing changes in the data model population module 114 (FIG. 1) and dynamically updating the relationships via the relationship establishment module 116 (FIG. 1), the system ensures that real-time modifications—whether they originate from internal attorneys, in-house counsel, or inventors—trigger appropriate reordering or re-generation steps. This collaborative approach helps maintain the patent draft's logical integrity despite concurrent edits, streamlining teamwork in modern patent drafting workflows.

Exemplary Computer-Implemented Data Model Augmentation

In one aspect, a plurality of data models is provided. These models may include a client model, a part model, a template model, a patent model, an AI model, and a part type model. While a user (e.g., an administrator) may manually create these models and populate them with information using predefined semantic schemas, the system may also automatically generate and update these data models using machine learning-driven analysis of patent-related input data, ensuring efficient, accurate, and dynamic construction of the data architecture.

In some aspects, with reference to FIG. 1, the system patent tech computing environment 100 may use the input data analysis module 112, the feature extraction module 124, and the machine learning training module 144 to dynamically infer the structure and relationships of the data models. For example, upon receiving an invention disclosure or a previously filed patent document, these modules may apply natural language processing (NLP), topic modeling, and semantic analysis to automatically determine relevant entities (e.g., clients, patents, templates, document parts) and populate corresponding entries within the data models. Furthermore, graph-based neural networks (GNNs) and dependency-aware algorithms (as discussed with respect to the adaptive traversal module 132) may assist in automatically linking different entities within the data models, ensuring logical and dependency-based structuring.

The client data model may be inferred from prior patent filings or firm database records, with entity extraction techniques identifying clients, their existing patents, and their drafting preferences. The computing system 102-A may detect common structures across multiple patent filings belonging to the same client and recommend standardized drafting templates.

The patent data model may be generated based on machine learning-based feature extraction from patent documents. The system may analyze metadata (e.g., patent ID, title, timestamps), technical descriptions, and claims to construct a normalized JSON data structure capturing all patent-specific attributes.

The template data model may be inferred by the logical and linear ordering management module 122, which may analyze prior filings to identify recurring patterns in patent structures (e.g., claims-first approach, detailed description structure). The computing system 102-A may create reusable templates based on learned patterns from successful patents.

The parts data model may be dynamically generated using semantic clustering and hierarchical entity recognition from prior art disclosures, technical specifications, or firm-specific drafting practices. The system may determine which parts (e.g., technical descriptions, claims, summaries) frequently co-occur within documents and create structured component templates. These parts may also be assigned an order in the electronic database 160-A, so that when a patent is generated, the semantic relationship analysis module 126 and/or the adaptive traversal module 132 may reference the stored order to determine which parts to generated first.

The part type data model may be constructed using self-referential graph-based relationships, where the semantic relationship analysis module 126 detects dependency chains between different document components. For instance, if a certain claim structure is frequently followed by a particular summary format, these relationships may be encoded as dependency graphs.

The AI model data model may be populated based on historical model usage patterns, dynamically associating AI models with specific patent sections. For example, if a particular transformer-based language model (e.g., GPT, BERT, Claude, or Mistral) has been historically effective for claim drafting, the system may automatically link that AI model to future claim drafting tasks. The system may also adjust token limits, temperature, and top-p parameters based on learned optimization patterns.

Figure 3:
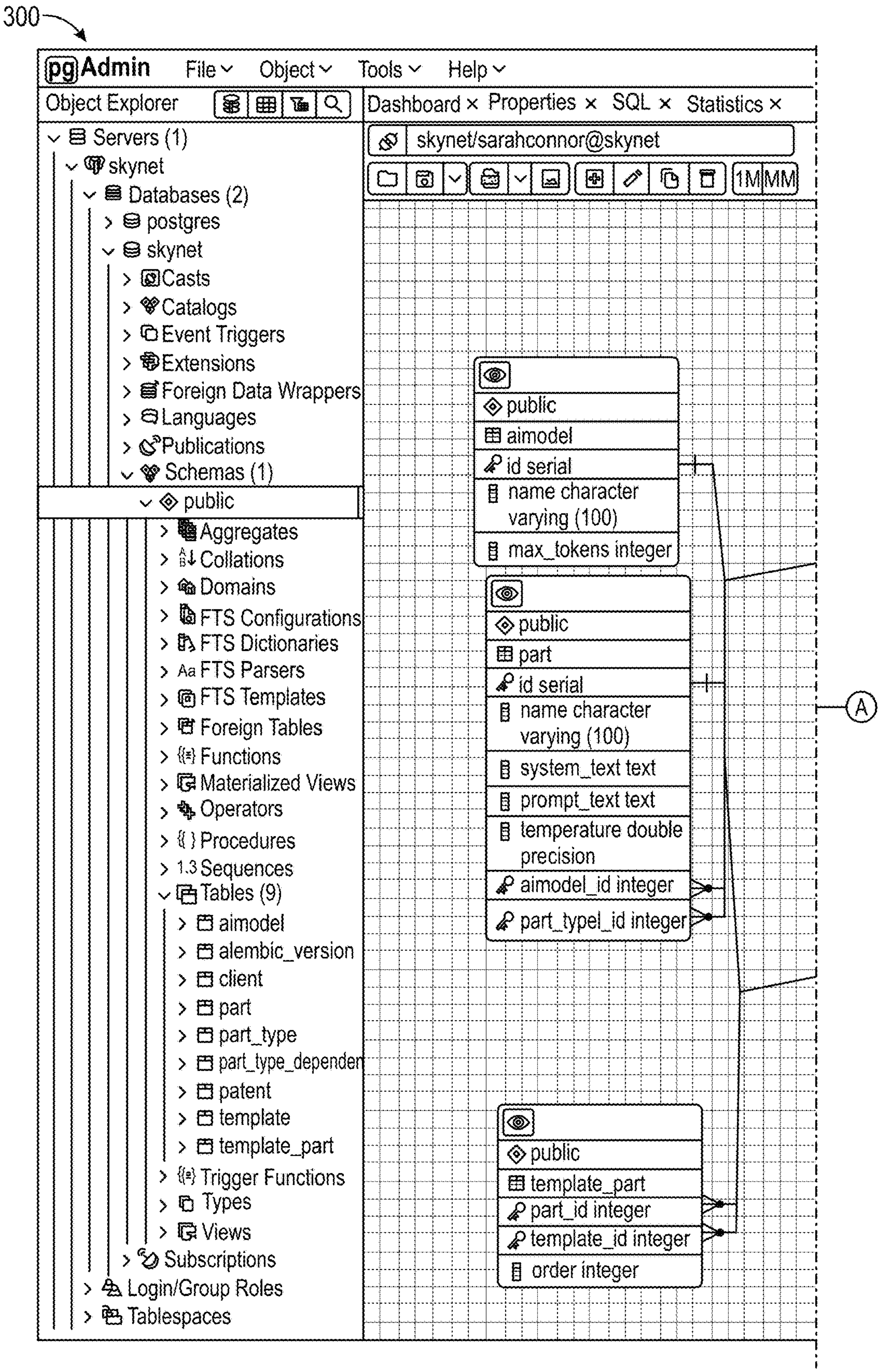
FIG. 3 depicts an exemplary entity relationship diagram (ERD) 300 for the automatically generated data model underlying the system, according to some aspects.

FIG. 3 depicts an exemplary entity relationship diagram (ERD) 300 for the automatically generated data model underlying the system, according to some aspects. The data model may be represented in the electronic database 160-A, for example. These data models may be structured using plain SQL and/or using an SQL framework such as an object-relational mapper (ORM) like SQLAlchemy or Java Hibernate. Additionally, NoSQL implementations (e.g., MongoDB, Firebase, Neo4j for graph-based storage) may be used to support hierarchical or dependency-based relationships within the data.

The computing system 102-A may further refine the data models over time using machine learning-based continuous learning. Specifically, as more patents are drafted, reinforcement learning (RL) models within the machine learning training module 144 may adjust the structural relationships within the data model, optimizing database efficiency and retrieval performance. Graph neural networks (GNNs) and embedding-based similarity searches may help establish semantic linkages between patent components, improving data model integrity.

The adaptive traversal module 132, in conjunction with real-time feedback module 140, may periodically assess user interactions and modify the data model structure dynamically. If a practitioner frequently modifies certain sections (e.g., reordering claims, altering figures), the system may adapt the part model or template structure to reflect these adjustments, ensuring that future automated drafts better align with practitioner preferences.

One or more of the foregoing data models may be displayed to a user within an interactive user interface, enabling CRUD (Create, Retrieve, Update, and Delete) operations. The user interface interaction module 118 may allow real-time interaction with these models, where users can override AI-generated model structures or fine-tune specific relationships between data components. Additionally, visualization tools (e.g., interactive entity-relationship diagrams, graphical dashboards) may help users explore and refine automatically generated data relationships.

Thus, by integrating machine learning, adaptive traversal, graph-based modeling, and real-time AI-driven optimization, the system ensures that the data model dynamically evolves, delivering more than mere automation of a manual process and providing a concrete technical improvement to how computing systems handle patent drafting data. Specifically, the invention increases efficiency in storing, retrieving, and updating patent-related content across interlinked modules, minimizes redundant or inconsistent data, and improves memory utilization through on-demand updates triggered by real-time user interactions or AI-based refinements. These enhancements directly address and solve technological challenges in database management and large-scale document generation, thereby constituting an improvement to the functioning of computing systems themselves, rather than simply implementing an abstract idea or human mental process.

Figure 4A:
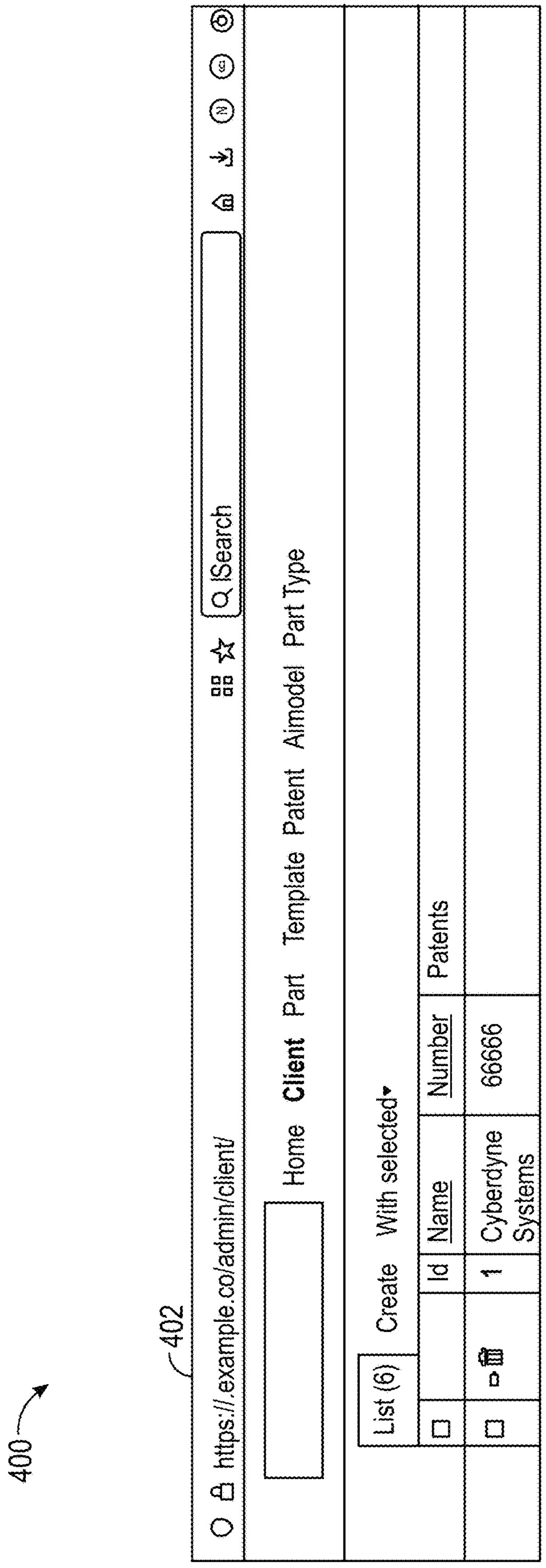
FIG. 4A depicts an exemplary graphical user interface including administrative panel 402 for adding and modifying client information, according to some embodiments.

FIG. 4A depicts an exemplary graphical user interface 400 including administrative panel 402 for adding and modifying client information, according to some embodiments.

Exemplary Patent Document Model

In general, a patent document (or other structured legal document) can be represented using a tree data structure, wherein the subsections of the document are represented as nodes, and sub-sections represented as sub-nodes. In a patent, some sections (e.g., Title and Claims) will generally never have sub-sections, and are thus, leaf nodes. Other sections (Detailed Description) will almost always include sub-sections (e.g., one or more sections describing systems, methods, diagrams, apparatuses, etc.). Further, all nodes may have both logical order and a linear order. These two orderings refer to, respectively, the order in which the node is generated/drafted, and the order in which the node is displayed. For example, in a US patent, the title is conventionally displayed first, so it is considered first in linear order. Likewise, the claims are conventionally displayed on the penultimate page, so it is second-last in linear order. However, in logical or semantic order, the Title and Claims may be the first things written by a patent attorney using a conventional software tool such as Microsoft Word. These parts of the patent may be written after disclosure is analyzed. This order is generally separate from the linear order of a patent document. Thus, the present techniques include techniques for maintaining orderings of patent documents, and for traversing and generating such patent documents.

That specific mechanism is facilitated by the above-referenced self-referential ordering of part types. Specifically, each part type may have one or more dependencies and one or more dependents. This enables the part types to be modeled as a tree. As discussed below, a traversal algorithm such as depth-first-search (DFS) may then be used to traverse the tree of part types, so that the patent is generated in semantic/logical order, and so that parts (e.g., a title) that depend on other parts (e.g., a claim) are not generated out of order, which could lead to undefined behavior. In some aspects, other traversal algorithms may be used (e.g., breadth-first search), but these would require modification to perform an equivalent traversal to that of DFS-such as storing paths. DFS maybe implemented using recursion or iteration. Different types of DFS may also be used, such as preorder, inorder or postorder traversal. In some aspects, DFS alternatives may include a backtracking algorithm, or a topological sort algorithm.

Another note regarding the ordering of patent documents is that when generating patents in linear order, one or more counters may be required. For example, a patent may have numbered figures, and one or more numbered sections that correspond to such numbered figures. Any suitable technology must have a mechanism for keeping track of such counters when generating patent documents. For example, a counter named part_index may be set to have an initial value of 1. The part_index counter may be incremented each time a CustomIndexed part is traversed. In this way, a format string may be included in part/system prompts to inform the model how to refer to the model. For example, in a computing environment part system text may include "The computing environment will be labeled {part_index} 00. Minimally, the computing system has a processor, a memory and NIC. The computing system corresponds to a FIG. {part_index}, and you will number its components beginning at 100 and incrementing by 2." In this way, the model will generate a figure of number part_index. The next CustomIndexed part will be named part_index+1. In some aspects, CustomIndexed parts may instead be called FigureParts. In the same way that part_index are passed to model part prompts/system text, and may be interpolated therein, other values are also available for interpolation. In particular any attribute of the Patent model may be accessed. For example, in the part text, "{claims}" will include the text of the claims; "{disclosure}" will include the disclosure provided by the user; "{brief_description_of_the_drawings}" will include the text of the brief description of the drawings, and so on. These values will always be available, if accessed, due to the DAG traversal of the template parts. On the other hand, if the user attempts to access a field that does not exist, code will handle the error gracefully.

The computing system 102-A may embed a cross-referencing structure to keep track of which sections reference a particular figure. For instance, if the computing system 102-A processes FIG. 3 early in the traversal and later encounters an embodiment node that cites that figure, the system retrieves the correct figure number and updates the referencing text accordingly (e.g., "Referring now to FIG. 3 . . . "). This linkage is facilitated by the adaptive traversal module, which determines the order in which different nodes of the DAG are processed and ensures that any referencing nodes are labeled with the correct figure index.

In another example, if the user adds a new figure midway through the drafting process, the adaptive traversal module 132 may revisit or "re-traverse" relevant sections to adjust figure numbering. Specifically, upon insertion of a new figure node into the DAG, the computing system 102-A increments the figure counter, reassigns numeric labels to nodes that appear chronologically after the inserted figure, and dynamically updates references across the patent document. The user may then presented with a renumbered document, reducing the need for manual edits and ensuring that the final patent application maintains a coherent and accurate sequence of figures.

Moreover, this counting mechanism can be extended to claims, paragraphs, or other enumerated parts of the document. For example, a user may request that claims be generated in ascending order, but physically appear after certain embodiments. As the DAG is traversed, claim sections may be incremented based on their discovery order. The "display order" may remain separate from the "logical generation order," allowing the system to unify all enumerations at the final output stage. By separating these two concepts—logical order for generation and display order for formatting—the system accommodates both the user's preference for structuring inventive concepts and the patent office requirements for linear numbering.

It should be appreciated that other document model types may be defined (e.g., for foreign patents, court briefs, pleadings, etc.).

Example 1—Defining General Patent Meta-Information

A user (e.g. an administrator) may define general patent meta-information. The user may create one or more clients in the client data model (e.g., Acme software corporation, the Acme media corporation, the Beta gardening corporation, etc.). New clients may be added all the time, and clients may be modified and deleted. The user may create one or more ai data models (e.g., OpenAI gpt4, OpenAI gpt3.5, Google Gemini, one or more local models (e.g., localGPT, localllm,), etc.). Models may be added to, deleted, and edited as necessary. The user may create one or more part types that generally correspond to the parts of patent applications or other legal filing (e.g., Title, Abstract, Background, Brief Description of the Figures, Field of the Invention, Claims, etc.). Using the definitions discussed above, these part types may be entered into the data model in any order. The user may create one or more additional part types including Custom and CustomIndexed. These may be part types that refer to parts of a patent that are not conventional or pre-defined (Custom) and not conventional or pre-defined that require an index value (CustomIndexed). The present techniques may also automatically generate these parts when processing an input disclosure. The user may create one or more parts. The user may be required to associate each of the parts with a part type. For example, the user may want to create a "Software claims" part type that requires the user to select a "Claims" part type. The user may be provided with a user interface by which to select from existing part types. The user may select part type Claims, and set prompt text, system text and temperature to suitable values. It should be appreciated that the prompt text and system text respectively may include interpolated strings that may refer to other values. For example, an interpolated string may include "The claims and disclosure are as follows. Draft a state diagram. Claims: {claims}. Disclosure: {disclosure}." wherein both "{claims}" and "{disclosure}" are the interpolated strings. It should further be appreciated that because of the logical ordering of dependencies discussed above, the interpolation of such strings proceeds without a problem, because the patent can be generated in a deterministic order, even if that differs from the linear order.

The parts and/or templates may be associated with a user model, so that a user only can view, modify and delete those parts/template that the user created or the ones that the user has access to. The system text and prompt text may be populated with any suitable prompts (e.g., generated via prompt engineering) to generate whatever the part is. The topic of prompt engineering is covered extensively here, which is incorporated in reference herein in its entirety for all purposes: https://en wik pedia.org/wiki/Prompt_engineering. For example, if the part is "Abstract," the prompt text may include an interpolation of the brief summary, and the system text may include instructions for how an abstract is generated, including any rules (e.g., that the abstract is limited to 150 words by USPTO procedure). Thus, validation rules may be embedded in the system/prompt text in addition to any relevant rules, instructions and/or interpolated values. Once the patent meta-information is established, and all of the parts are added, the user may proceed to creating a template.

Example 2—Defining a (Re)Orderable Template

In general, a template is a means by which a user (e.g., an administrator, an end user, etc.) may create a grouping or linkage of a plurality of parts. The user may select one or more parts, and may order them (e.g., using a drag and drop user interface).

FIG. 4B depicts an exemplary administrative panel 410 for selecting and reordering parts within a template using drag and drop, according to some aspects. The user may reorder the parts within a template using a plurality of handles 412. The ordering in the template ordering view above is that of the linear display (as defined above, the order in which the parts of the template will be displayed when generated, not necessarily the order in which those respective parts will be generated). Once the user has defined a template, and optionally used the graphical user interface to reorder the template, the user may use a number of different mechanisms for using the template. In some cases, the user may access the template using a command line script. In some cases, the user may access the template using a graphical user interface. The user may be required by validation (e.g., in the script and/or included in the graphical user interface) to provide one or more input parameters. For example, some validation scripts may determine which interpolated values are included in system text and/or prompt text of the parts of the template, and ensure that those values are either already present or provided by the user. Specifically, the validation scripts may determine whether the patent linked to the template via the above-discussed data model relationship has a given field attached to it (e.g. disclosure), claims, etc.

Example Traversal Algorithm

Consider a conventional patent document with the following linear (i.e., display) order:

Title
Background of the Invention
Summary of the Invention
Brief Description of the Drawings
Detailed Description of the Invention
5A. Computing Environment (CustomIndexed)
5B. Computer-Implemented Method (CustomIndexed)
Claims
\Abstract If one were to attempt to generate a patent having this document structure using a naïve linear generation strategy, the Title might be generated without any view into the other parts of the document. This would be highly disadvantageous and not at all descriptive of the invention, in all likelihood, because the Title of a patent is often closely related to the claims and/or other subsections of the patent document.

Figure 4C:
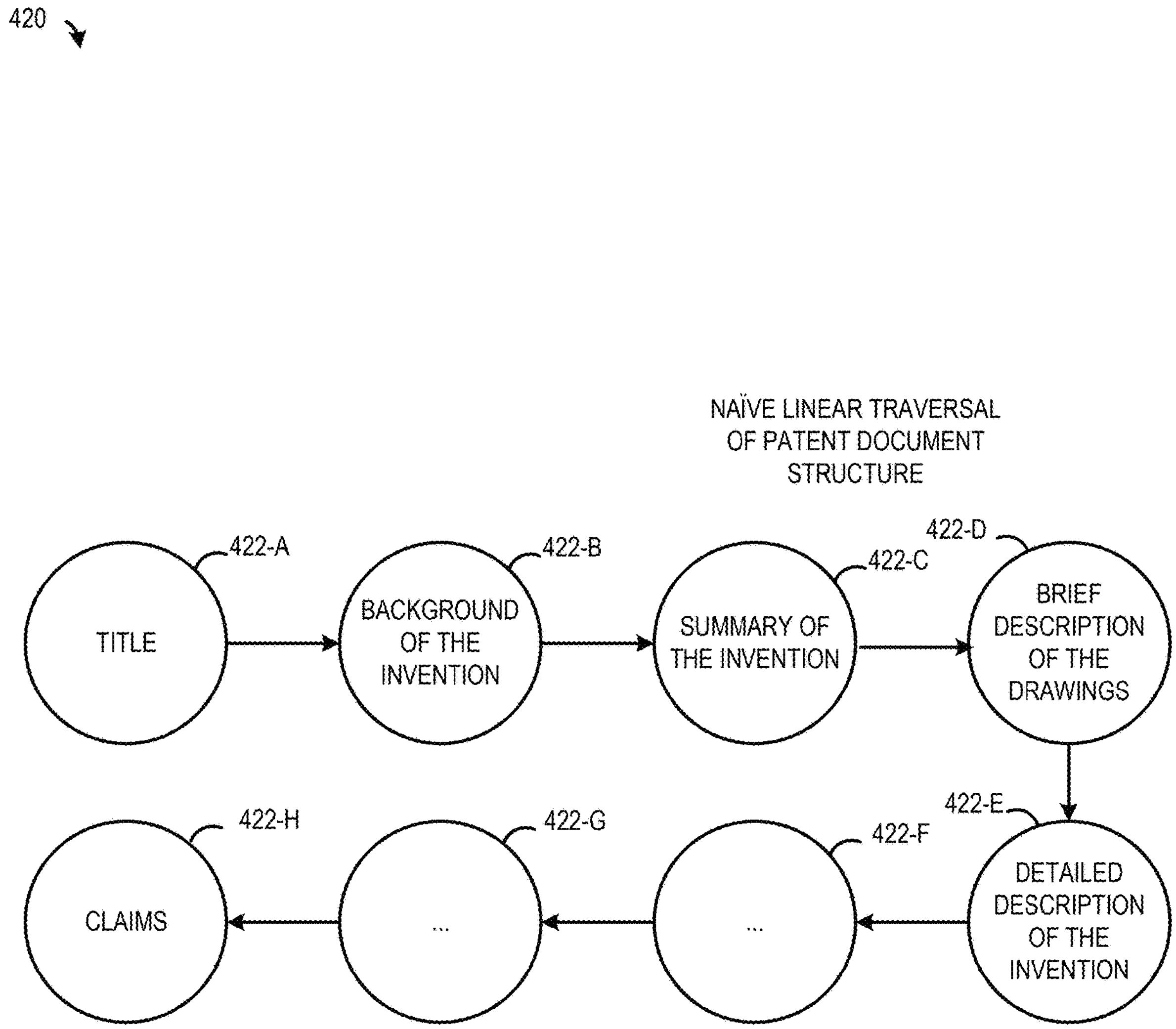
FIG. 4C depicts a flow diagram of a naïve (linear) traversal of a patent document structure, according to some aspects.

FIG. 4C depicts a flow diagram 420 of a naïve (linear) traversal of a patent document structure, according to some aspects. The computer-implemented method at block 422-F might directly correspond to claim language. However, if block 422-F were to be generated before section 422-H, there would be no text to use for the generation of subsection 422-F. To solve this problem, the present techniques include the dependency tree/graph storage and traversal techniques discussed above, which solve this problem for patents and other structured documents where multiple sub-sections or parts are inter-dependent (meaning that the generation of one depends on the generation of one or more prior sections). The dependency tree may be a directed acyclic graph (DAG) in some aspects.

As noted, in some aspects, the traversal algorithm may be a depth-first search (DFS) traversal algorithm, or variant thereof. The benefit of DFS is that it enables the document being generated (e.g., a patent) to be traversed in logical order. For example, for a given part $X_i$ that depends on a given part $X_{(i-1)}$, the part $X_{(i-1)}$ may be generated first, so that when part $X_i$ is reached, $X_i$ can be generated in reliance on the data generated at traversal step $X_{(i-1)}$. Using DFS for traversal advantageously enables the conventional patent document to be traversed using the orderings established in the part data model, discussed above, and generated in an order that respects inter-dependence between subparts of the patent document.

Figure 4D:
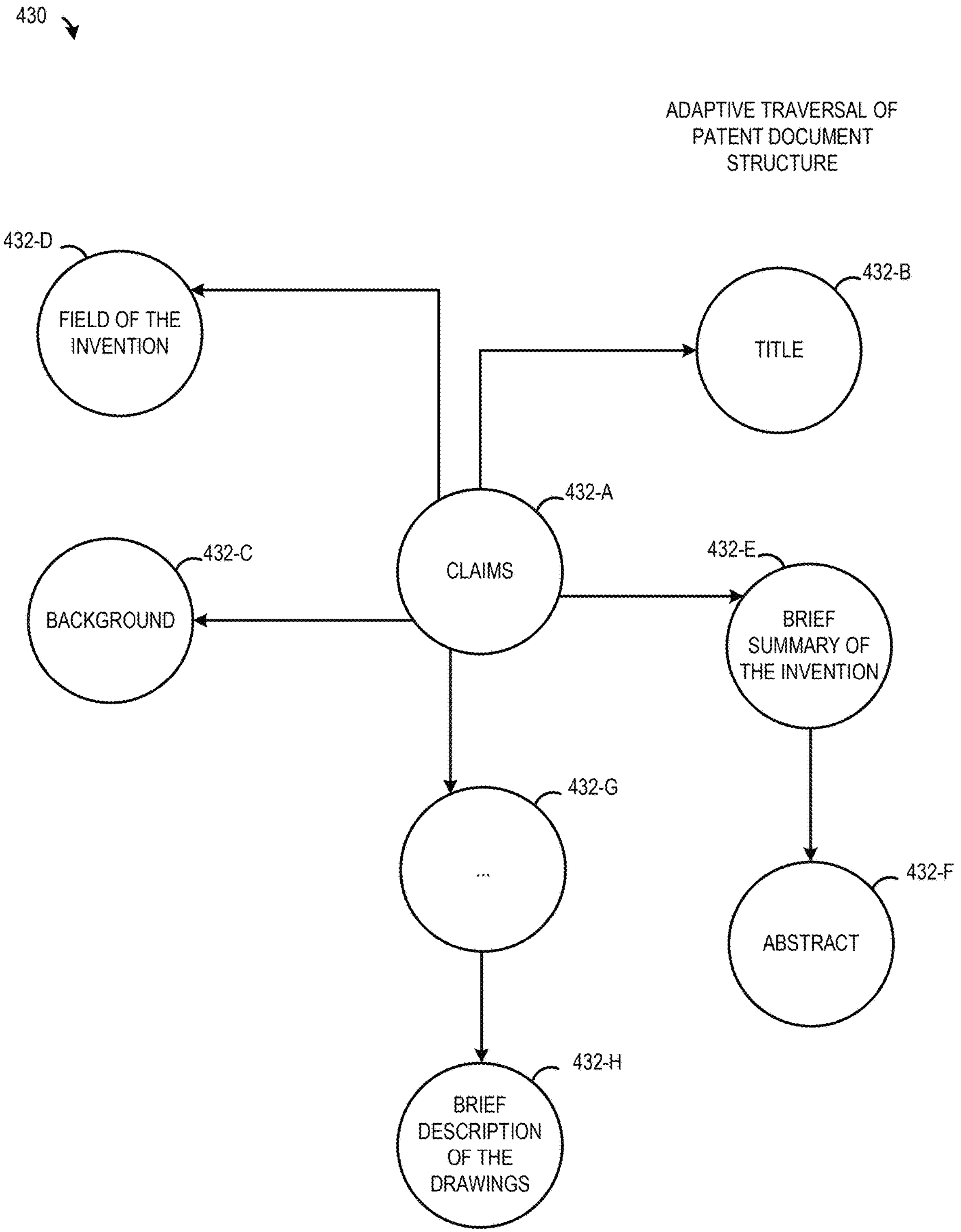
FIG. 4D depicts a flow diagram of a DFS-based traversal of a DAG-based patent document structure, according to some aspects.

FIG. 4D depicts a flow diagram of a DFS-based traversal of a DAG-based patent document structure, according to some aspects. In this example, a traversal algorithm is used to process the template in semantic (i.e., logical) order, as indicated by the red numerals. Specifically, with reference to FIG. 4D, the traversal may proceed as follows (block-wise):

Claims, 432-A
Title, 432-B
Background, 432-C
Field, 432-D
Brief summary, 432-E
\Abstract, 432-F
Figure (non-standard), 432-G,
Brief description of drawings, 432-H It should be noted that the document can be traversed as deeply as necessary, and that part types may be visited multiple times within each traversal. For example, as shown above, the patent document may include multiple non-standard (e.g., CustomIndexed, Custom, Figure, etc.) part types. At step 432-G, all of those non-standard part types may be generated before the brief description of the drawings is generated at 432-H. This is important, because the brief description of the drawings likely includes a line item corresponding to each of the non-standard (e.g., Figure) parts. Regardless of the number of non-standard parts added to a document template, this flexible yet consistent generation enables generation to proceed while maintaining past scope.

Advantageously, the traversal algorithm may ensure that (1) all parts of the patent are generated, and that (2) those parts are generated in an order that respects the dependency of the parts composing the template.

Another more subtle advantage to the above methodology is that the traversal always generates text in the same desirable way, regardless of whose template is chosen, and which parts that template is associated with. That may seem like an academic point, but an intellectual property law firm may at any given time be engaged with hundreds or thousands of active clients, with thousands of respective patent files. Each of these files may include one or more patent documents that are generatable using the above-described techniques. In general, these techniques deliver immense productivity gains to the industry, acting like an accelerant for patent attorney drafting projects.

Exemplary Generation and Layout

The above discussion explained, generally, the patent data model, patent meta-information and traversal strategies. The next stages of the process are generation and layout. The data models, meta-information and traversal strategies may be implemented using exclusively command line tools, in some aspects. Generation and layout may also be performed on a server (e.g., using modules in the memory of a server computer, as shown below).

Figure 4E:
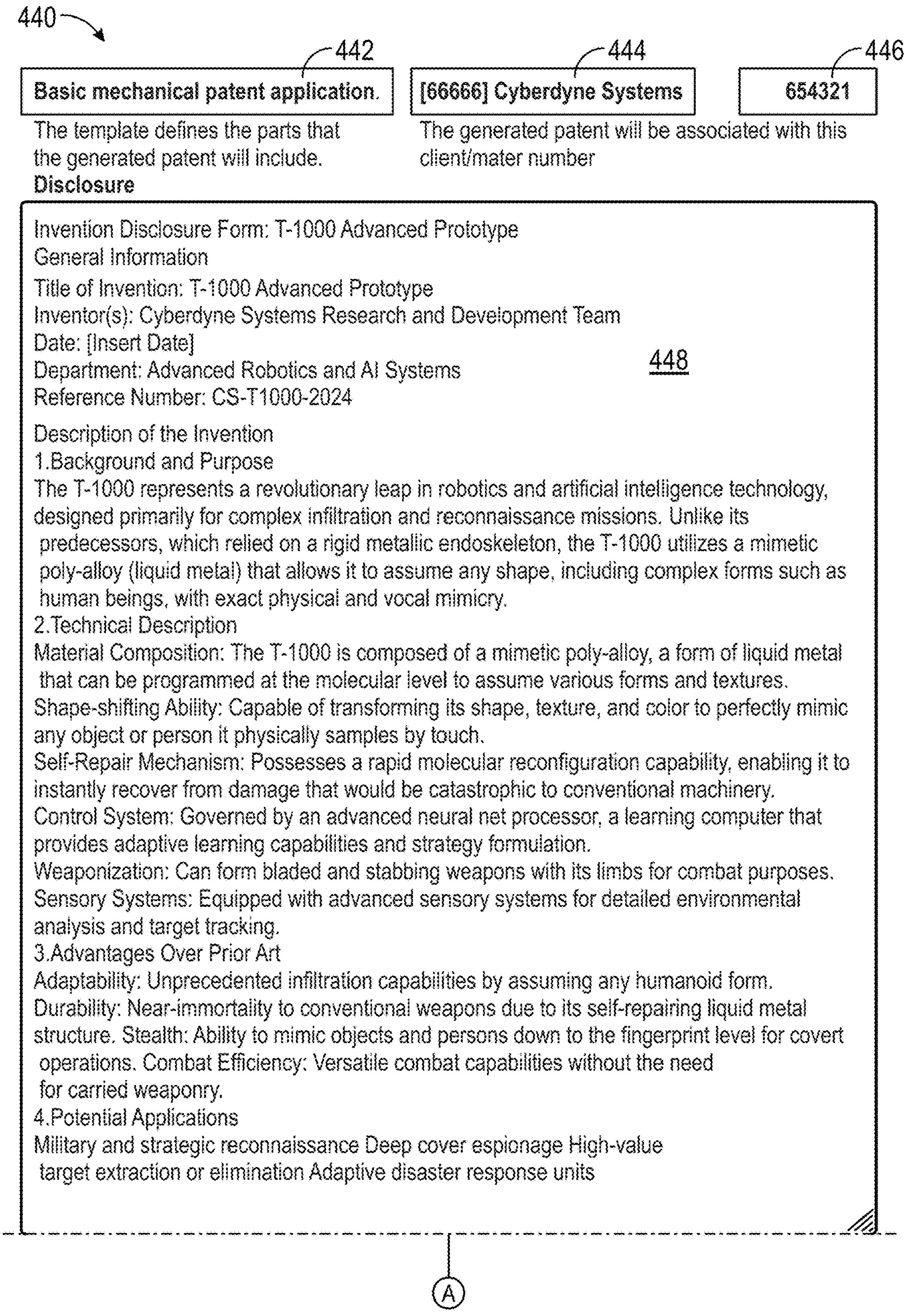
FIG. 4E depicts an exemplary graphical user interface for entering seed information, according to some aspects.

FIG. 4E depicts an exemplary graphical user interface 440 for entering seed information, according to some aspects. The seed information may include information used to generate a patent, such as a patent disclosure, an invention disclosure form, one or more images, one or more written descriptions of prior patent applications, a transcript of a discussion between one or more patent practitioners or technologists/patent engineers/technical specialists and/or one or more inventors, etc.

The user interface 440 may prompt the user to select, via an electronic form, a template 442 (as discussed herein) and a client 444. The user may be prompted to enter a matter number 446, a disclosure textarea 448 entry including seed information 448 and a claims textarea entry 450. The user may paste images into the 450 and/or upload an image using an upload dialog box.

Once the user enters some or all of these values via the electronic form (e.g., via a web browser, a table, a mobile phone, a wearable device, etc.) the user may press "Submit" 452. The form may be submitted to a web processing API (e.g., a Flask route) that includes computer-executable instructions for processing the form to extract the provided values. The web application that does form processing may be part of the input data analysis module 112, in some aspects.

When the route receives the electronic form, the instructions may unpack the form into a plurality of form values. The instructions may then create a patent model object and populate the object with the form values, such that the created patent is associated with the template via the relationship to the template table, and with the client via the clients table, and has the specified matter number, disclosure and claims. The instructions may execute the session such that this object is stored to the database electronic database 160-A. The instructions may then add the id of the generated patent object to the task queue. Doing so may generate a task id that can be used to reference the task.

Exemplary Task Queue

The task queue (part of the message queue 160-B) is an optional component, but one that adds asynchronicity and advantageous performance benefits to the overall system. Specifically, tasks may be started asynchronously, such that the user's form submission originating from the client device 102-B, discussed above, does not time out or block while waiting for API accesses via the computing system 102-A to occur, whether those accesses are local to the computing system 102-A or involve queries to the cloud computing environments 180.

Thus, the task queue may be configured to receive a patent id, and to retrieve the related task from the database. In parallel, the user may be redirected to a task status page, wherein the task id enables a JavaScript snippet to periodically check the status of the running task. Once the task queue receives the task id, the task queue may execute a set of computer-executable instructions for generating the patent document using the techniques discussed above. These techniques will not be repeated here, except to say that the task instructions generally include instructions for traversing the part types corresponding to the patent id, and for each patent type, processing all parts of that part type. This may be performed in an ordering established by the above-described dependency graph.

Figure 4F:
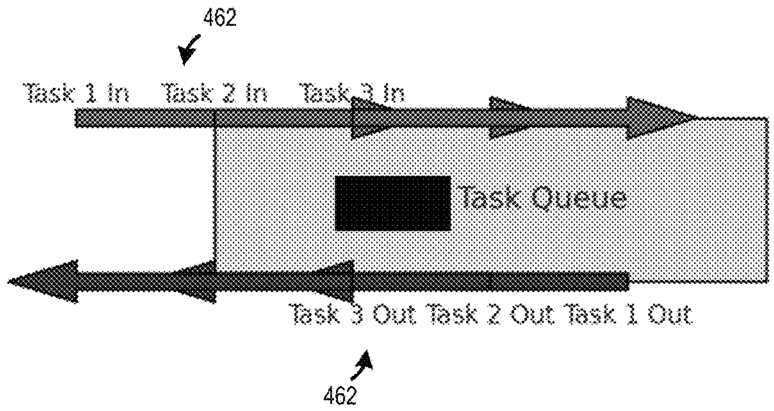
FIG. 4F depicts a schematic of an exemplary task queue, according to some aspects.

FIG. 4F depicts a schematic of an exemplary task queue 460, according to some aspects. The task queue 460 may accept a plurality of input tasks 462. The input tasks 462 may include instantiating additional objects that are configured for particular purposes. In particular, a PatentContentManager class may be instantiated into a patent content manager object that performs interpolation of variables for prompt text and system text and tracking of indices for the Customindexed part types. This class may parameterize formatted strings with interpolated values retrieved from the patent object itself using a call to getattr( ) Additional values for parameterization may be parameterized using kwargs or similar features in languages other than Python. Of course, the present backend techniques, including the form processing, task queue, and document generation features, may be implemented in any suitable programming language. The patent content manager object may pass interpolated string data (e.g., system text and/or prompt text) to an AI model for each part. Again, the task may process each part individually. In this way, the processing is part-wise. This is distinguished from a system that attempts to insert prompts/system text for multiple parts into a single input, a practice referred to by some as "prompt stuffing." Prompt stuffing may be suitable for smaller documents, but given current model parameter limits (e.g., maximum token limits that count both input and output tokens) low-level management of token lengths is necessary. Even with a larger context window, LMs often become confused when too much information is entered into a single prompt. Thus, some form of decomposition (e.g., part-wise processing) or recursive splitting may be required not only to avoid exceeding API limits, but also because this decomposition and granularity produces better results.

Once the input tasks 462 are processed, including their associated parameters or contextual data, the present techniques may include the task queue 460 outputting a plurality of output tasks 462. The output tasks 462 may be processed, for example, by a callback function that handles the completion, logging, or storage of model responses. Further, these callbacks can optionally notify downstream modules (e.g., the real-time feedback module 140 or the context aware generation module 138) when additional processing, such as document consistency checks, style refinements, or semantic validations, is required. This ensures that the system can dynamically chain subsequent tasks, creating a workflow where each completed task triggers the next stage of patent document analysis or generation.

Exemplary Task Monitoring

Thus, an advantage of the present techniques is not only that the patent can be generated in logical/semantic order, with flexible user-defined templates, but this may all be done while the user waits, without blocking/synchronous behavior and while providing the user with low latency updates/ feedback. This asynchronicity is especially important when considering that in cases where the AI model is an upstream networked API model, latency (and even basic function/error handling) may be beyond the control of the calling task function. In short, tasks allow the user to be immediately freed from the inner workings from the task, and allow more graceful handling of exception states, errors, etc. While the task is running, the user may be able to view status updates asynchronously via the browser, to know how the task is performing using (potentially) upstream APIs.

FIG. 4G depicts an exemplary graphical user interface (GUI) 470 for displaying task monitoring, according to some aspects. Along with the interpolated string data, the patent content manager object may also pass other AI parameters associated with the part object (e.g., temperature, top_p), which may vary depending on the chosen model. The GUI 470 may include a task queue ID 472 corresponding to the task queue 460, allowing the user to track the progress of document generation or AI inference tasks. The user may view a semantic traversal log 474, showing the order in which the patent document is generated as determined by the adaptive traversal module 132 and the logical and linear ordering management module 122 of FIG. 1, for example. This log reflects dependencies resolved in real time (i.e., during document generation), alongside parts generated by interpreting templates containing interpolated values, as configured by the data model population module 114 and the template data model. Once the patent document is generated, the GUI 470 may be updated (e.g., via JavaScript) to include a link 476 to the completed patent draft, as illustrated in FIG. 4H, enabling immediate review and further editing by the user, according to some aspects.

Exemplary "Standard Patent" Display and Export

Once the patent content manager object receives a response from the AI model (e.g., via an API call), the patent content manager object may validate that response and return the generated value, propagate an exception, or take other action as indicated.

The return value of the patent content manager object is generally the model output corresponding to the part, as defined by the part object's parameterized prompt and system text inputs. This return value may return to the task, and the task may store the return value in the data field of the patent object (e.g., as a JSON string). The JSON string may represent the data that will be used to generate the final patent document (the generated patent parts, based on the interpolated patent part objects). Thus, prior to storing the JSON, the task may sort the JSON based on linear order, such that the parts are now arranged in the order in which they are to be displayed in the patent. This ordering may include comparing an order id field of the part data model. The task may then save the patent object and then process the next part.

Figure 4I:
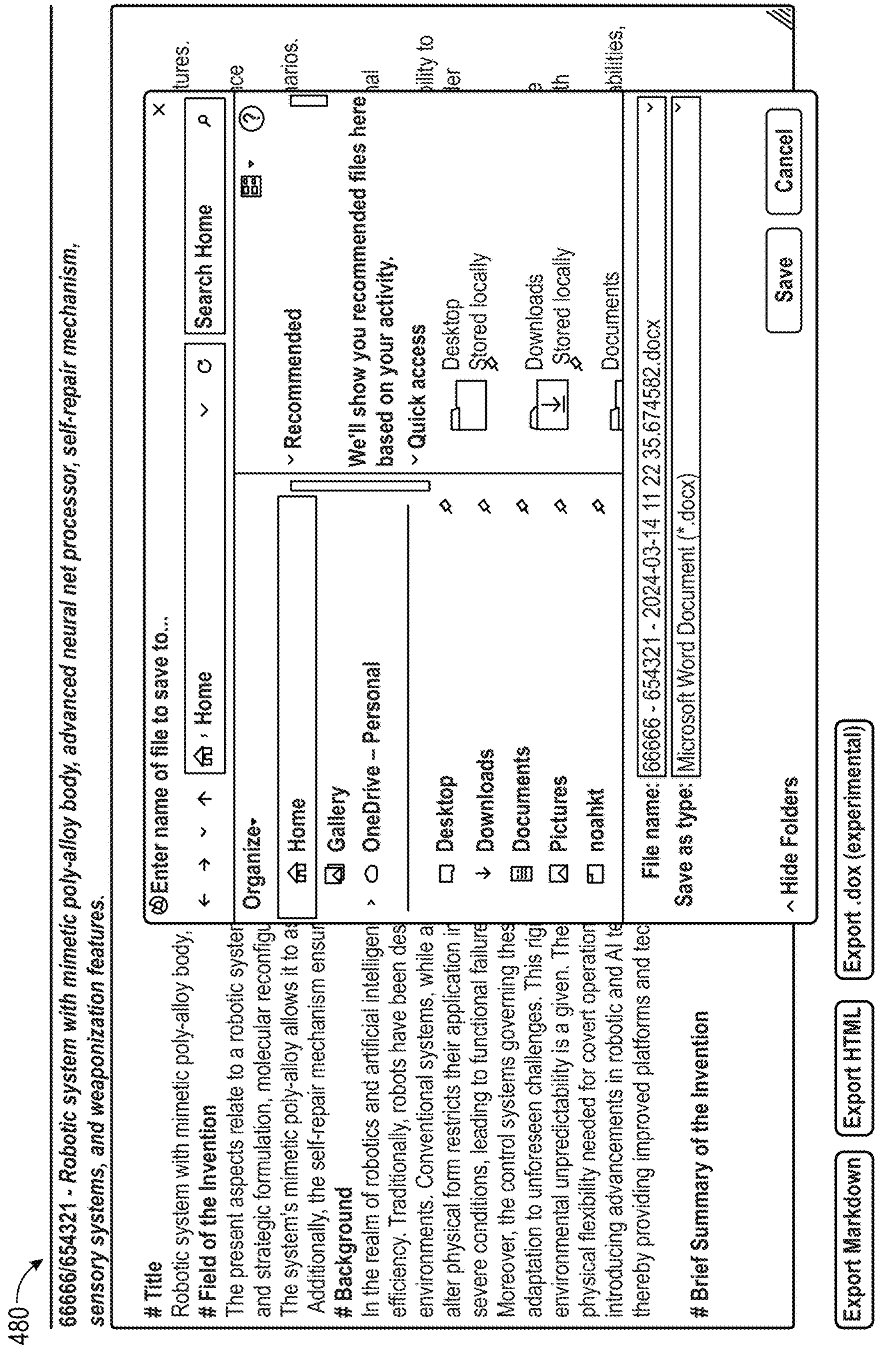
FIG. 4I depicts an example display graphical interface for the generated parts, according to some aspects.

At the conclusion of this process, the task has serially generated each of the parts of the patent, based on user-defined custom templates, in dependency graph semantic/logical order, and stored the results in linear (display) order. At this time, the task itself may return control, such that the user JavaScript is able to determine (e.g., via polling) that the task is complete. The client application may then redirect the user to a "view patent" page that includes template logic (e.g., Jinja2) for displaying the JSON in human-readable "standard patent" format. FIG. 4I depicts an example display graphical interface 480 for the generated parts, according to some aspects. From this page, the user may edit the patent using the real-time feedback module 140, which provides inline suggestions, consistency checks, and semantic validations against the underlying data models. The user interface may highlight discrepancies, incomplete references, or potential drafting errors, enabling immediate refinement of the document. The user may export the patent in any suitable document format(s), including Markdown, Hypertext, Word document, PDF, etc.

Additional Computer-Implemented Graphical User Interface Aspects

Figure 5A:
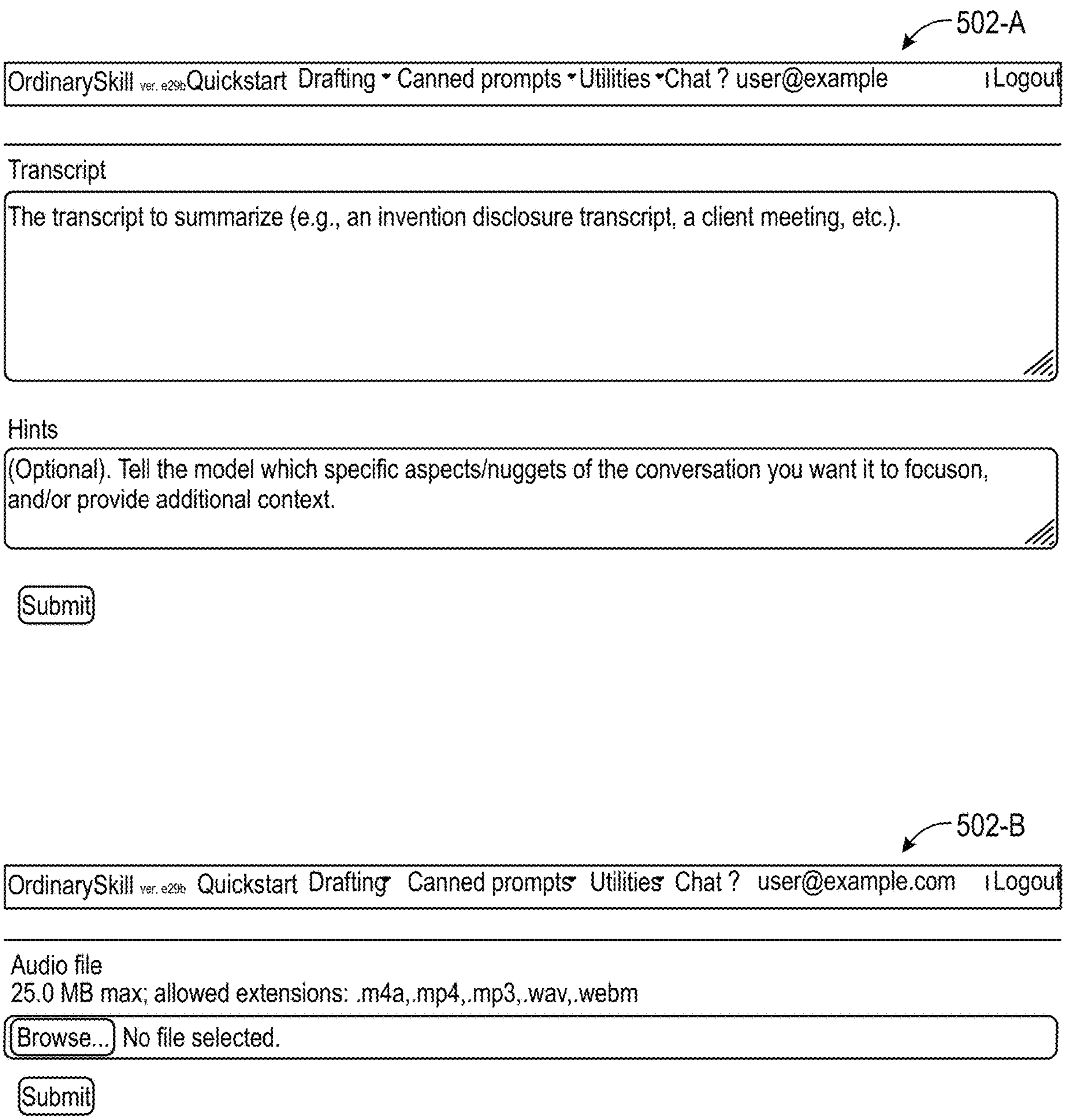
FIG. 5A, which depicts a text summarization GRAPHICAL USER INTERFACE and an audio-to-text GRAPHICAL USER INTERFACE, according to some aspects.

The present techniques may include additional features and functionalities that are useful beyond the context of patent document generation. For example, in some aspects, the present techniques may include summarization techniques. In this example, the user may be provided with a summarization user interface that summarizes documents (text and/or image documents). A transcript summarization user interface may enable a user to summarize a transcript (e.g., a transcript of a telephone or video-based discussion). This may be useful to provide a patent attorney or another practitioner with what are, effectively, meeting minutes based on AI generation techniques. In some aspects, a speech-to-text model may be used to enable voice inputs (e.g., an audio or video recording) to be transcribed to a language model input format (e.g., a transcript). Both audio and video may be summarized, as shown in FIG. 5A, which depicts a text summarization GUI 502-A that accepts hints; and in an audio to text format via an audio-to-text GUI 502-B that accepts an audio file and which, in some aspects, may accept hints to guide the backend model in generating the transcript.

It should be appreciated that while other meeting minute generation systems may exist, the present techniques include specific prompts that are specifically geared toward patent practice. For example, the document summarization prompts configured to be used with the present techniques may be configured to extract references to prior art documents by name, any reference or discussion of page numbers, paragraph numbers or prior art inventor names (e.g., Smith et al.), discussion of conventional techniques, discussion of improvements and other aspects that are relevant to patent practice.

The present techniques may also include more generic document summarization techniques. For example, the user may provide a document (text and/or images) and select whether to summarize the document according to one or more different techniques. For example, the user may provide a lengthy document such as a prior art reference or a patent application. The user may select a summarization strategy. In some aspects, the system may select the summarization strategy (e.g., based on the document length according to the number of tokens in the document). Different strategies that may be used for document summarization include map-reduce summarization, abstractive summarization, stuffing summarization and refining summarization.

Figure 5B:
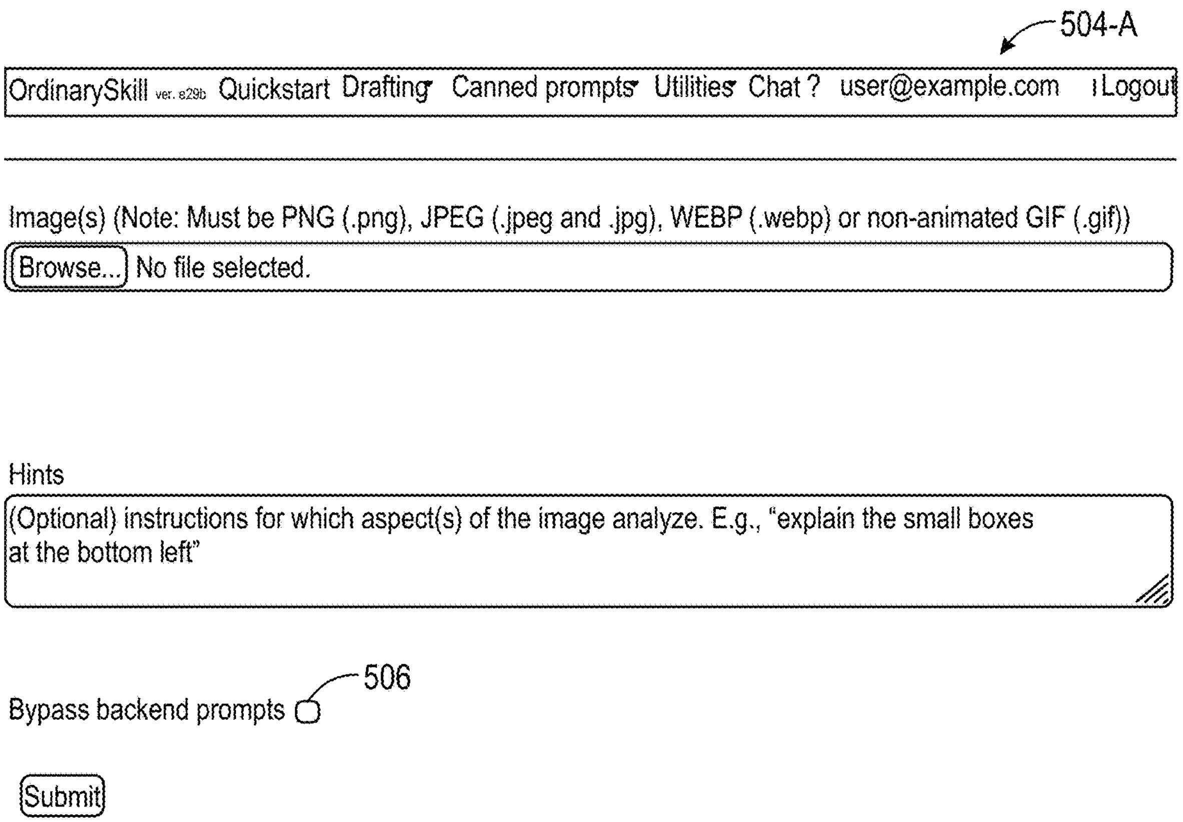
FIG. 5B, which depicts and image-to-text, according to some aspects.

In still further aspects, the present techniques may include an image-to-text graphical user interface 504-A, as depicted in FIG. 5B. The image-to-text GUI 504 may use the task queue 460 of FIG. 4F, via the message queue 160-B of FIG. 1, as described above. Thus, advantageously, the distributed architecture of the present techniques, designed to facilitate model-driven patent drafting, is adaptable in some aspects to other forms of analysis, using the principles set forth herein. The GUI 504-A may include an image upload and hints input, as well as a bypass input 506, which prevents default prompts from being applied to the query.

Prompt Compression

In some aspects, additional/alternate techniques may be used to summarize or reduce the number of tokens provided to a model. For example, model inference may be sped up by compressing prompts. A small language model may be added to the model pipeline. The present techniques may process prompts using the small language model to generate compressed prompts, wherein tokens of less importance are removed, with negligible performance loss. Empirical testing has shown that this technique can result in prompts that are compressed by a factor of 10 or more. This technique is advantageous, as it allows the upstream language model to be used with no changes, while reducing the size of prompts. Smaller prompts equate to lower costs where a per-token cost model is applied to model usage (e.g., OpenAI models). Smaller prompts also equate to faster inference, which makes applications more responsive, and reduces an amount of CPU and storage necessary to process larger (uncompressed) prompts. Prompt compression can be applied to any use of prompts discussed herein. A prompt compression tradeoff is that such techniques may require local graphics processor units (GPUs) and GPU memory. Adding small LMs to the processing pipeline may also enable the present techniques to save on costs where pay-per-use APIs are used.

Exemplary Document Comparison Aspects

The present techniques may provide document comparison techniques that are based on prompting one or more language models, in some aspects. For example, a prompt may be generated that includes two (optionally summarized) documents and requests a comparison between them. Other tools, such as ‘diff(1)’, may be used to generate textual differences between documents and display differences to users. In some aspects, one or more language models may be used in conjunction with other tools, such as ‘diff(1)’, to generate document comparisons that leverage language model intelligence alongside more traditional tools (e.g., using language model function calling, as described at platform.openai.com). For example, a function may be created with the signature ‘generate_diff(document_1, document_2)’, which is capable of generating diffs. This information may then be passed to the language model and used to summarize and/or explain the results.

The retrieval module 148 may further enhance the document comparison process by integrating Retrieval—Augmented Generation (RAG) techniques. When differences between two documents are identified-whether through ‘diff (1)’, an AI-generated comparison, or a hybrid approach—the retrieval module 148 may be invoked to provide additional context. For example, if the comparison process highlights two lines of text that differ significantly, a large language model may generate an explanation based on the output of the ‘generate_diff( . . . )’ function. The model may then use retrieval module 148 to search a vector database for relevant information that provides further insight into those differences. This search may involve identifying other parts of the two compared documents that offer supporting context, referencing prior versions of similar documents, or even retrieving related legal precedents, office actions, or patent examiner guidelines stored in the vector database.

The retrieval module 148 facilitates this process by converting the differing text segments into vector embeddings and performing a nearest-neighbor search against indexed data sources. By leveraging Approximate Nearest Neighbor (ANN) search techniques, such as FAISS, ScaNN, or HNSW, the module can identify semantically similar text passages that help explain the differences in meaning, legal implications, or structural impact of the variations. The retrieved content may then be incorporated into the language model’s response, enriching the explanation and ensuring that the comparison does not solely rely on surface-level textual changes but also considers deeper contextual implications. In addition, retrieval module 148 may access structured metadata within electronic database 160-A to filter results based on jurisdictional relevance, patent claim dependencies, or drafting conventions. If the document comparison involves patent claims, for example, the retrieval module may retrieve prosecution history data, examiner comments, or previously issued office actions to clarify how and why certain claim language was modified. Similarly, if the comparison pertains to a litigation brief, the module may fetch relevant case law or past arguments to highlight potential legal consequences of the identified differences.

To further enhance performance and efficiency, retrieval module 148 may employ caching mechanisms for frequently accessed document versions, ensuring rapid retrieval of commonly referenced materials. Additionally, message queue 160-B may facilitate asynchronous retrieval requests, particularly for large-scale comparisons involving multiple documents or extensive legal datasets. By combining language model-driven comparison techniques with retrieval-augmented intelligence, the present techniques provide a more comprehensive and contextually enriched document comparison workflow, enabling patent practitioners to quickly understand, analyze, and act upon differences with greater accuracy and efficiency.

Generating Non-Text Inputs Outputs

It should also be appreciated that the template parts described above may target image outputs. Specifically, an ImagePart type may be added to a template which generates a patent diagram (e.g., a Figure) based on prompt and system information included in the part data object. In some aspects, the application logic may generate the patent diagram inline (e.g., nested within the patent document, such as a .docx file). In other aspects, the figures may be stored in association with the Patent data model. In this way, the figures may be retrieved and added to a document accompanying an exported .docx patent (e.g., a separate .pdf document of Figures).

In addition to automatically generating figures from textual prompts, the system may enable on-demand image generation for any section of a patent document. For example, a user drafting an embodiment or a detailed description could request a new figure depicting the relevant components, and an AI-based image generation service (or a local image generator) could produce a stylized diagram reflecting the disclosed features. These images can be inserted at the user’s chosen location within the patent application, ensuring that newly referenced elements align logically with existing text.

Furthermore, in cases where original invention disclosures include images—such as photographs, CAD drawings, or diagrams in an academic paper—the system may parse the disclosure and map these images to corresponding sections of the patent document. For instance, the application may identify images labeled “FIG. 2” or referencing specific components in an academic paper, then suggest them to the user during the patent drafting process. The user can choose to include or omit each image, and the application automatically updates references (e.g., “see FIG. 2”) or renumbers the figures as needed. This approach allows seamless integration of existing images with newly generated images, ensuring that the final patent application reflects both the original disclosure materials and any additional, dynamically created figures.

Fine-Tuning of Part Models

As discussed above, the present techniques include a Part model that may store one or more prompt or system command that is associated with generating respective Parts. This prompt and system data may include information that is used to parameterize the model so that the model generates the part correctly. However, this information must be provided to the model each time the model is used to generate a part of that type. This contributes to an increase in the amount of information that must be transferred via the network to the model, reduces the number of available tokens for input and output (many model prompt token limits count both input and output tokens) and also increases the number of tokens that are counted for API fee/cost computation purposes, leading to increased expense for the model client application.

Model fine-tuning is a technique that may be used to generate models that are specifically trained on information that gives those models enhanced capabilities for understanding particular knowledge and/or performing tasks related to specific inputs. In the present techniques, one or more part individual parts may be associated with a respective fine-tuned model.

Figure 6A:
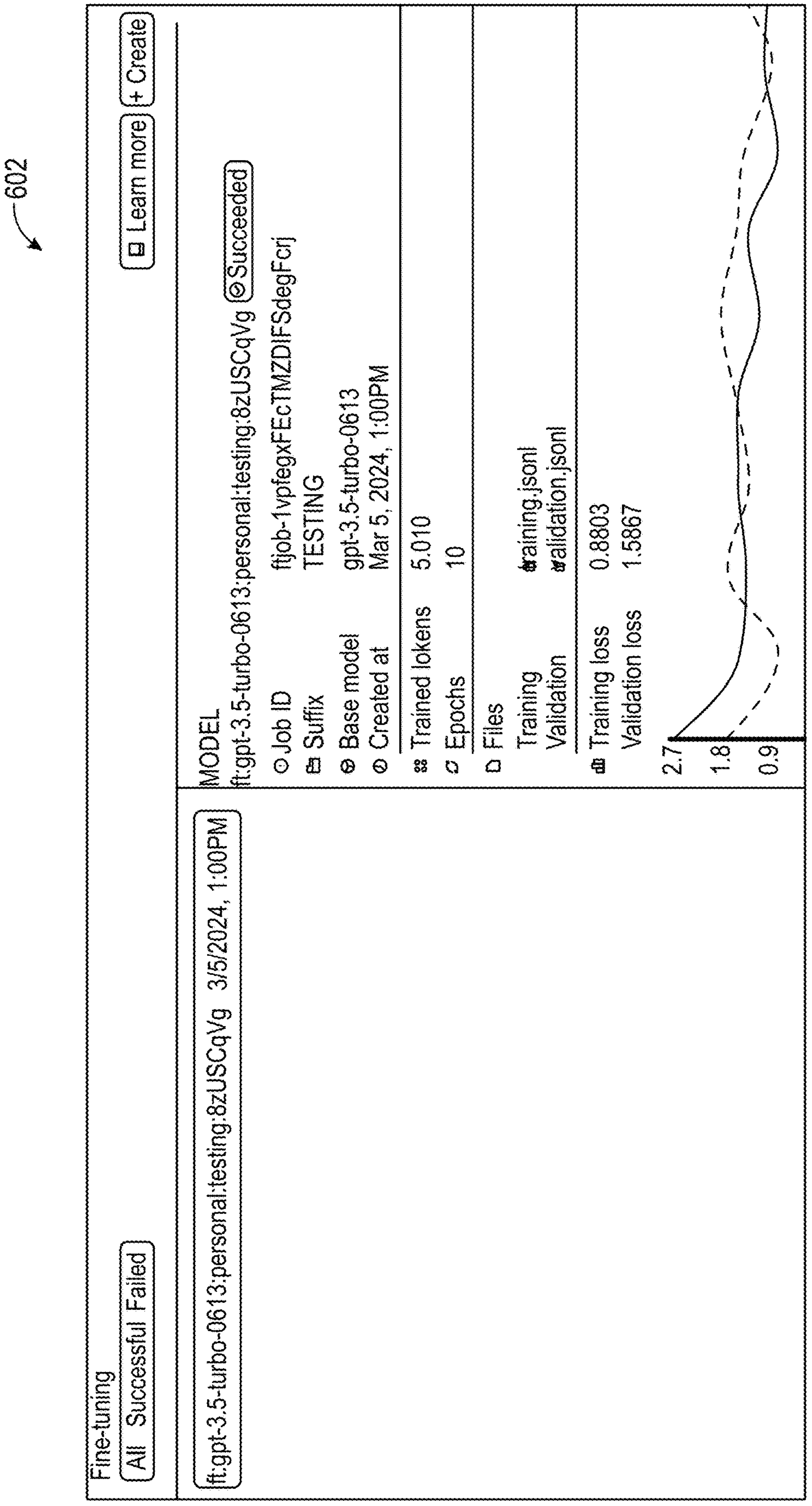
FIG. 6A depicts an example of graphical interface used to file-tune a trained model, according to some aspects.

For example, FIG. 6A depicts an example of graphical interface 600 used to file-tune a trained model, according to some aspects. The fine-tuned model of FIG. 6A may be trained using one or more JSON training data sets (e.g., one or more JSONL training data sets and one or more JSONL validation training sets). The fine-tuned model corresponds to the following JSON object:

```
{
  "fine_tuning_task": {
    "identifier": "ft:gpt-3.5-turbo-0613:personal:testing:8zUSCqVg",
    "status": "Succeeded",
    "timestamp": "3/5/2024, 1:00 PM",
    "model_details": {
      "job_id": "ft:job-1VpfegXfcECtMZIDFsfegCrcj",
      "suffix": "TESTING",
      "base_model": "gpt-3.5-turbo-0613",
      "created_at": "Mar 5, 2024, 1:00 PM",
      "trained_tokens": 5010,
      "epochs": 10,
      "files": {
        "training": "training. jsonl",
        "validation": "validation.jsonl"
      },
      "loss": {
        "training_loss": 0.8803,
        "validation_loss": 1.5867
      }
    }
  }
}
```

The format of the JSON may generally correspond to inputs that a particular model is expecting for fine-tuning. The training data for fine-tuning a Part model may include examples that correspond to the specific part being generated. For example, if the Part is that of a patent application title, the JSONL training data set may be as follows:

{"messages": [{"role": "system", "content": "You are an experienced patent attorney whose primary goal is to generate patent application titles. You are friendly and concise. You only provide factual answers to queries, and do not provide answers that are not related to patents."}, {"role": "user", "content": "A system for performing neural network computations for a neural network having a plurality of neural network layers, the system comprising: a matrix computation unit comprising circuitry configured to: obtain a weight input for a neural network layer of the plurality of neural network layers; receive a control signal; and determine, based on the control signal, whether to reuse the weight input at a subsequent clock cycle."}, {"role": "assistant", "content": "Prefetching Weights For Use In A Neural Network Processor"}]}

Exemplary Fine-Tuning Training Data

The JSONL training data set may include a plurality of examples that are similar to the above example fine-tuning training data. In some aspects, 10 or more examples may be used. In some examples 20, 30, 40, 50, 100, 250, 500 or more training examples may be included in the training data set. In general, more examples provide a better fine-tuned model.

The JSON training data may include a validation training data set including a plurality of training data elements that are of the same format as the example provided above, and which include similar but different examples.

The training JSONL and validation JSONL may be used for fine-tuning one or more base models, as show in example 14. The result may be a model (ft: gpt-3.5-turbo-0613: personal:testing:8zUSCqVg) that is directly accessible as a data model to generate one or more parts. Many models may be trained using similar techniques, using curated data sets as discussed herein, as shown in FIG. 6B which depicts a graphical user interface showing available pre-trained models, according to some aspects. In the example, the model has been specifically fine-tuned to generate Title parts. Of course, each conventional patent part (Abstract, Brief Summary, Claims, etc.) may be fine tuned. For some Parts, such as claims, a plurality of models may be trained for different claims types and based on different base models. For example, a GPT base model may be fine-tuned for generating software patent claims and mechanical patent claims, respectively. Each of these may be associated using the above-described administrative panel with one or more parts (e.g., "Software claims 4.0") which may then be associated with one or more templates. In this manner, the present techniques provide an extremely flexible way of allowing a non-technical user to access advanced fine-tuned models to generate patent documents (and other documents) without needing to understand the nuances of fine-tuning. The user can simply select the parts that they want to compose their templates.

Figure 6C:
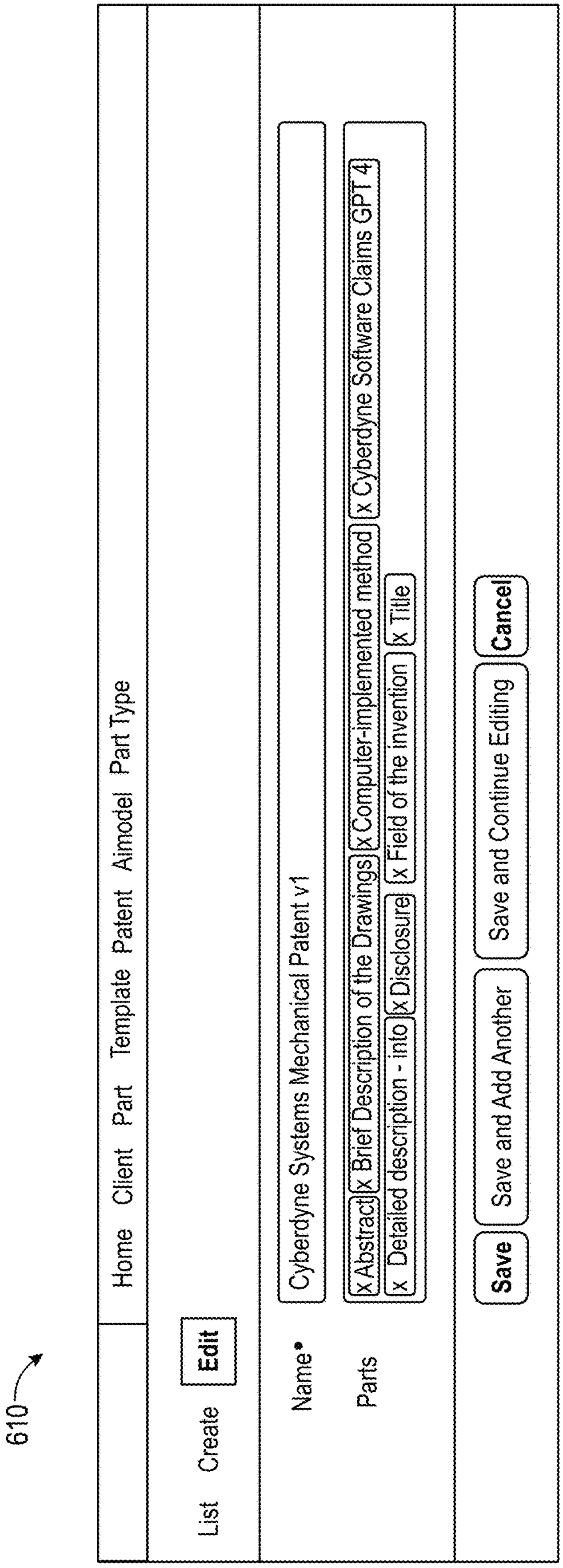
FIG. 6C depicts client-specific parts, according to some aspects.

The present techniques may also enable one or more models to be fine-tuned using client-specific data. For example, a client (e.g., Cyberdyne Systems) may prefer that their patent applications are drafted according to a specific format, with specific parts that do not vary from application to application. In that case, a template entitled "Cyberdyne Systems Mechanical Patent v1" may be created, for example, using the administrative panel. The user may then create one or more Parts (e.g., by copying and refining existing parts) that are specific to the Cyberdyne template. These Cyberdyne Parts may have names like "Software Claims GPT 4 Cyberdyne" as shown in FIG. 6C.

Continuing the above example, the prompts of the respective Cyberdyne Parts may include specific instructions that affect the order, length, organization, content, and other aspects of the generated part as specified by the Cyberdyne Parts organization. This technique highlights yet another advantage of the present systems, which is that by configuring client-specific Parts, the output (especially when a low temperature is selected for a model API like Chat GPT or Claude Anthropic) is very consistent from generated document to generated document over time. In effect, the client preferences may be encoded in the prompt declaratively. This is a radically different approach to training human drafters to follow client preferences. Humans are often fatigued, or new to the job, or fail to follow client preferences for other reasons. This can be destructive of confidence build up with client relationships over a long period of time. The declarative preferences encoding in this manner can also be programmatically updated, for example, by running an SQL query to update prompts stored in the present data models.

As noted, many aspects of patent practice may be used for model fine-tuning. A non-exhaustive list of these includes: Stylistic Preferences and Tone (Sentence formality (formal vs. semi-formal vs. highly technical language); Specific phraseology or jargon used by a law firm or client; Preferred claim language structures (e.g., "comprising" vs. "including," "a method for . . . " vs. "a process for . . . ")); Document Structure and Ordering (Section sequencing rules (e.g., claims-first approach, summary-first approach); Dependency-based ordering (adaptive traversal of elements); Consistent numbering and labeling conventions for figures, embodiments, and claims); Vocabulary and Domain Terminology (Specific technical or industry terms (AI, mechanical engineering, bio-tech, software, etc.); Abbreviations, synonyms, and cross-reference forms frequently used by a particular client or practitioner; Preferred synonyms to maintain uniform usage throughout the document;) Drafting Conventions and Layout (Formatting requirements (e.g., paragraph numbering, indentation, or alignment)); Inclusion of disclaimers or boilerplate language (e.g., "in some embodiments," "not limited to," etc.); Structures or templates for key sections (Background, Brief Summary, Detailed Description, Claims)); Claim Scope and Strategy (Aggressive vs. conservative claiming strategies; Inclusion of fallback positions (additional independent or dependent claims); Common antecedent basis patterns or language-specific disclaimers); Preferred Linguistic Constructions (Use of indefinite articles ("a," "an," "one or more") vs. definite articles ("the," "said"); Avoidance of "patent profanity" (e.g., "must," "only," "essential," "necessary"); Parallelism in enumerating claim features ("the device comprises: [element1], [element2], [element3], etc.")); Jurisdictional and Regulatory Requirements (Specific guidelines for USPTO, EPO, JPO, or other patent offices (e.g., 150-word limit for abstracts in the USPTO); Required sections for specific jurisdictions (e.g., "technical field" in certain countries); Formalities such as listing prior art or referencing a prior application); Reference Management and Cross-Citations (Methods for labeling and referencing figures (FIG. 1, FIG. 2A, etc.); Approaches to referencing external documents or prior art (e.g., "incorporated by reference"); Handling of claim dependencies (e.g., "wherein claim 2 depends from claim 1")); Logical Consistency and Semantic Alignment (Ensuring consistent terminology across all sections (e.g., "processor" vs. "data processing unit"); Automatic detection and correction of missing antecedent basis or unreferenced figures; Alignment of claims, embodiments, and figures based on recognized dependencies); User-Specific or Client-Specific Preferences (Distinct drafting styles for different partners at a law firm (highly detailed vs. streamlined); Inclusion of disclaimers or statements based on client policy (e.g., disclaimers on medical methods); Specialized jargon or phrasebook for in-house counsel at a large corporation); Punctuation, Grammar, and Formatting Quirks (Comma usage, semicolon vs. colon in multi-limitation claims; Whether to use bullet lists or inline paragraphs for enumerating embodiments; Capitalization preferences for defined terms (e.g., "Preferred Embodiment," "Field of the Invention")); and Automated Figure Generation and Mapping (Typical patterns for figure references or labeling (e.g., "FIG. 1—system overview," "FIG. 2—flowchart"); Guidelines for AI-based image creation (e.g., schematic style, grayscale or color, 2D or 3D perspective; Automatic linking of original disclosure images to relevant drafted sections).

Indeed, empirical testing has shown that fine-tuning is a highly successful strategy for obtaining improved model results across a variety of domains, including patent drafting, prosecution analysis, claim scope prediction, and eligibility assessments. In the computing environment 100 of FIG. 1, the machine learning training module 144 located in the memory 104-B orchestrates these fine-tuning processes by retrieving historical patent filings, invention disclosures, and annotated data via the data model population module 114 and the relationship establishment module 116. The machine learning training module 144 applies advanced ML training pipelines that refine base language models (e.g., GPT-3.5-turbo, GPT-4) into specialized models tailored for legal drafting or technical topics. This orchestration is facilitated by the processor 104-A and, if necessary, the NIC 106 to communicate with external computing instances or cloud computing environments 180 for large-scale or GPU-accelerated training.

By customizing a base language model with domain-specific data—such as historical patent filings, annotated invention disclosures, or user-preferred drafting styles—the system (including modules like feature extraction 124 and semantic relationship analysis 126) ensures that refined outputs are more accurate and context-aware. For instance, attorneys can fine-tune a model to adopt a specific style (e.g., "broad claiming approach" vs. "conservative claiming strategy") through the style transfer module 142, while the consistency and completeness module 134 uses training signals to detect or correct drafting inconsistencies.

The fine-tuning pipeline is often invoked through the user interface interaction module 118, which allows patent practitioners or administrators to specify training parameters (e.g., relevant corpora, epochs, or hyperparameters). Once initiated, the machine learning training module 144 coordinates with task queues or asynchronous processes to run training jobs, possibly offloading to external cloud resources 180 via the NIC 106. This ensures that large volumes of patent data or GPU-intensive tasks can be handled seamlessly without overwhelming local resources.

Using these refined or newly trained models, the machine learning operation module 146 then provides real-time inference during patent drafting. For example, a practitioner drafting an office action response might receive eligibility analysis recommendations from a fine-tuned model that precisely flags potential subject-matter issues. Alternatively, a model specialized in claim scope prediction can forecast examiner responses or prior art concerns based on a user-supplied claim set. Similarly, style transfer models yield outputs closely aligned with a client's preferred tone, formatting, or linguistic patterns.

Fine-tuning thus enables advanced use cases such as figure-generation, litigation insights, dependency analysis, and database relationship extraction. Each of these tasks benefits from specialized training, ensuring that final patent documents retain domain-specific accuracy and legal defensibility. By aligning the machine learning training module 144, the data model population module 114, and external compute resources through FIG. 1's architecture, the system empowers patent professionals to adapt AI models swiftly, achieving more focused, consistent, and technically sound drafting practices.

```
[
  {
    "fine_tuning_task": {
      "identifier": "ft:gpt-3.5-turbo-0613:client-identifier-32e41eeb-7058-443c-910f-6d9d4f65c4bf:style-transfer",
      "status": "Succeeded",
      "timestamp": "09/01/2023, 11:14 AM",
      "base_model": "gpt-3.5-turbo-0613",
      "client": "client-identifier-32e41eeb-7058-443c-910f-6d9d4f65c4bf",
      "task": "style-transfer",
      "...": "other fields omitted for brevity"
    }
  },
  {
    "fine_tuning_task": {
      "identifier": "ft:gpt-3.5-turbo-0301:client-identifier-bd6ca9ff-5ac4-4f4e-bd60-41d53758cbfb:claim-scope-predictor",
      "status": "Succeeded",
      "timestamp": "06/19/2024, 03:05 PM",
      "base_model": "gpt-3.5-turbo-0301",
      "client": "client-identifier-bd6ca9ff-5ac4-4f4e-bd60-41d53758cbfb",
      "task": "claim-scope-predictor",
      "...": "other fields omitted for brevity"
    }
  },
  {
    "fine_tuning_task": {
      "identifier": "ft:gpt-4-0314:client-identifier-0af2d805-5dd8-4d3b-9efb-49c4706079d0:contextual-generation",
      "status": "Running",
      "timestamp": "03/14/2025, 10:23 AM",
      "base_model": "gpt-4-0314",
      "client": "client-identifier-0af2d805-5dd8-4d3b-9efb-49c4706079d0",
      "task": "contextual-generation",
      "...": "other fields omitted for brevity"
    }
  },
  {
    "fine_tuning_task": {
      "identifier": "ft:gpt-3.5-turbo-0613:client-identifier-069bf47a-17cf-4e3b-9b89-1669ca05b914:eligibility-analysis",
      "status": "Failed",
      "timestamp": "11/08/2023, 04:50 PM",
      "base_model": "gpt-3.5-turbo-0613",
      "client": "client-identifier-069bf47a-17cf-4e3b-9b89-1669ca05b914",
      "task": "eligibility-analysis",
      "...": other fields omitted for brevity"
    }
  },
  {
    "fine_tuning_task": {
      "identifier": "ft:gpt-3.5-turbo-0301:client-identifier-1c397437-413b-49ab-95fa-dd3e1a1aac90:consistency-check",
      "status": "Succeeded",
      "timestamp": "07/20/2023, 09:15 AM",
      "base_model": "gpt-3.5-turbo-0301",
      "client": "client-identifier-1c397437-413b-49ab-95fa-dd3e1a1aac90",
      "task": "consistency-check",
      "...": "other fields omitted for brevity"
    }
  },
  {
    "fine_tuning_task": {
      "identifier": "ft:gpt-3.5-turbo-0613:client-identifier-4bfa7ec7-0ca5-4e48-8c86-6371bc5a023e:litigation-insights",
      "status": "Succeeded",
      "timestamp": "03/14/2023, 05:47 PM",
      "base_model": "gpt-3.5-turbo-0613",
      "client": "client-identifier-4bfa7ec7-0ca5-4e48-8c86-6371bc5a023e",
      "task": "litigation-insights",
```

-continued

```
      "...": "other fields omitted for brevity"
    }
  },
  {
    "fine_tuning_task": {
      "identifier": "ft:gpt-3.5-turbo-0613:client-identifier-e70f2131-f9e5-4328-bd5e-a138bc110c85:dependency-analysis",
      "status": "Running",
      "timestamp": "04/10/2024, 01:30 PM",
      "base_model": "gpt-3.5-turbo-0613",
      "client": "client-identifier-e70f2131-f9e5-4328-bd5e-a138bc110c85",
      "task": "dependency-analysis",
      "...": "other fields omitted for brevity"
    }
  },
  {
    "fine_tuning_task": {
      "identifier": "ft:gpt-4-0314:client-identifier-33f4d8bc-008d-4c64-b88a-3545288b0096:figure-generation",
      "status": "Succeeded",
      "timestamp": "12/01/2023, 10:10 AM",
      "base_model": "gpt-4-0314",
      "client": "client-identifier-33f4d8bc-008d-4c64-b88a-3545288b0096",
      "task": "figure-generation",
      "...": "other fields omitted for brevity"
    }
  },
  {
    "fine_tuning_task": {
      "identifier": "ft:gpt-3.5-turbo-0613:client-identifier-7ae88d20-8db9-46b7-8b13-921dd6934be6:patent-profanity-check",
      "status": "Succeeded",
      "timestamp": "08/05/2024, 01:59 PM",
      "base_model": "gpt-3.5-turbo-0613",
      "client": "client-identifier-7ae88d20-8db9-46b7-8b13-921dd6934be6",
      "task": "patent-profanity-check",
      "...": "other fields omitted for brevity"
    }
  },
  {
    "fine_tuning_task": {
      "identifier": "ft:gpt-3.5-turbo-0301:client-identifier-268d681e-f31b-4a46-bb4c-eef3f071f7ea:db-relationship-extraction",
      "status": "Succeeded",
      "timestamp": "03/29/2024, 07:21 AM",
      "base_model": "gpt-3.5-turbo-0301",
      "client": "client-identifier-268d681e-f31b-4a46-bb4c-eef3f071f7ea",
      "task": "db-relationship-extraction",
      "...": "other fields omitted for brevity"
    }
  },
  {
    "fine_tuning_task": {
      "identifier": "ft:gpt-3.5-turbo-0301:client-identifier-3fe2ce23-5ccc-4212-a6fa-8644bed13e07:drafting-heuristics",
      "status": "Succeeded",
      "timestamp": "09/22/2023, 04:05 PM",
      "base_model": "gpt-4-0314",
      "client": "client-identifier-3fe2ce23-5ccc-4212-a6fa-8644bed13e07",
      "task": "drafting-heuristics",
      "...": "other fields omitted for brevity"
    }
  }
]
```

By incorporating these aspects into the fine-tuning training data, the system can learn user-specific drafting behaviors, linguistic norms, and workflow patterns, thereby generating patent documents that closely mirror real-world drafting preferences and best practices.

Alternative User Interfaces

The above aspects describe a web-based framework for tying together and accessing the data model, message queue and the other models that are used to generate patent documents and to generate documents and run other language model queries. However, there is no reason that the data model, message queue and other backend infrastructure components could not be accessed from other systems. For example, in some aspects, a Microsoft word plugin is used which incorporates the patent document generation aspects, including accessing fine-tuned models or models that are customized in other ways (e.g., via retrieval augmented generation). For example, consider a scenario in which a patent practitioner receives an Office Action containing a 35 U.S.C. § 103 rejection for a pending patent application. Referring to FIG. 1, the practitioner uses client device 102-B to access the computing system 102-A and uploads the Office Action into the system via the user interface interaction module 118. The input data analysis module 112 receives the uploaded Office Action, parses its contents, and identifies key sections that detail the § 103 rejection (e.g., the examiner's rationale, references cited, and specific claim elements deemed obvious).

Once the Office Action data is parsed, the data model population module 114 updates internal data structures in memory 104-B, capturing attributes such as claim references, cited prior art, and arguments presented by the examiner. The relationship establishment module 116 then creates or updates logical links between these elements—such as linking particular claim limitations to the prior art teachings asserted by the examiner—so that other components in the system can identify relevant dependencies.

Next, the retrieval module 148 is invoked to perform a Retrieval-Augmented Generation (RAG) workflow. Specifically, it converts segments of the Office Action and the patent claims (including relevant context about the invention's novel features) into vector embeddings. Using a vector database, which may be housed in or adjacent to the electronic database 160-A, the retrieval module 148 performs a similarity search to identify semantically related references and prior Office Action outcomes. For example, it might retrieve archived arguments that successfully overcame similar § 103 rejections in the past, or locate case law and examiner guidelines relevant to an obviousness analysis. The retrieval module 148 also checks any specialized metadata—such as the particular examiner's publicly available statistics or technology center guidelines—to fine-tune the relevance of results.

After collecting this context, the retrieval module 148 feeds the most pertinent documents, prior art references, and historical arguments back into the AI-driven drafting or analysis process. The machine learning operation module 146 uses these retrieved materials to generate a comprehensive response. This response might include detailed counter-arguments explaining why the claimed invention is not rendered obvious by the cited prior art, a suggested amendment to clarify non-obvious features, or references to legal precedents that support patentability. The real-time feedback module 140 can highlight these suggestions to the user immediately, providing explanations and rationale drawn from the retrieved content.

Finally, the user interface interaction module 118 presents the generated Office Action response to the practitioner on client device 102-B in a structured format. The practitioner may edit and finalize this response, then instruct the system 102-A to file it electronically or store it for further review. Throughout this end-to-end process, message queue 160-B can manage background tasks—such as retrieving relevant prior art at scale—while the NIC 106 handles secure communication with any external databases or cloud computing environments 180 where the large language model, vector database, or additional resources may be hosted. By integrating retrieval-augmented insights into the AI-generated arguments, the system significantly streamlines the § 103 rejection analysis and response process, ensuring higher accuracy and a more effective outcome in prosecution.

Figure 7A:
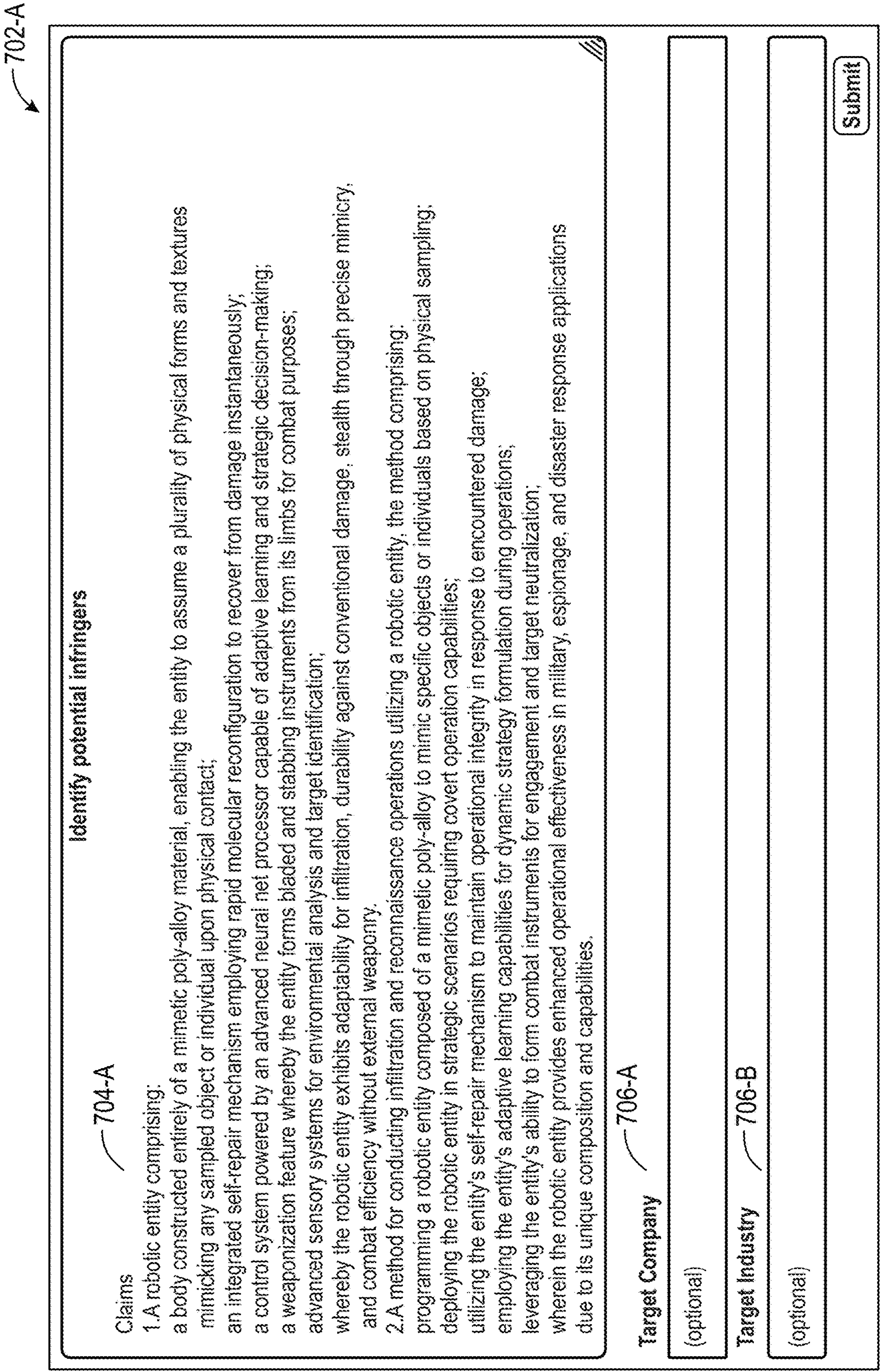
FIG. 7A depicts an infringement identification graphical user interface, according to some aspects.

The present techniques may be extended to mobile computing devices, wearable devices, command line interfaces, etc. The present techniques may be used to identify potential infringers. Specifically, an infringement identification graphical user interface 702-A may accept claim language 704-A and optionally, target company and/or target industry 706-B parameters, as shown in FIG. 7A. Running this query may cause one or more sets of customized computer-executable instructions stored in the web application to process a prompt template that interpolates the claim language and provided industry/country parameters. The prompt may be configured to summarize the claims and to analyze the claims using a pre-trained and/or fine-tuned model, in some aspects, to identify specific companies (redacted) 708-A and/or technologies that could read on the claim(s), and display them in a graphical user interface 702-B, as shown in FIG. 7B.

It should be appreciated that a primary benefit of this approach—and improvement over conventional techniques—is that the claimed system (e.g., computing system 102-A shown in FIG. 1) can almost instantaneously (e.g., within one minute or less) provide a user with a list of 20 or more potential infringing products. The prompted model is able to do this using advanced AI logic within machine learning operation module 146 and tapping into encyclopedic knowledge of technology products and their inner workings. Performing the same task by a human user would take days or even weeks of effort. This outcome is more than merely automating a manual process; rather, it represents a concrete technical improvement to patent analysis workflows.

By using fine-tuned models orchestrated through the machine learning training module 144 in the memory 104-B, these present techniques can encode relevant legal standards for infringement analysis (e.g., literal infringement, doctrine of equivalents). For instance, when the input data analysis module 112 receives a set of potentially infringing products or references, it may compare key product features against the claims and file history of a patent. In some aspects, retrieval-augmented generation (RAG), an artificial neural network, or additional deep learning approaches may be integrated with the data model population module 114 to gather and process relevant documents—such as office action responses or prior claim amendments. These files might be stored in the electronic database 160-A or accessed via cloud computing environments 180 through the NIC 106, ensuring quick retrieval of additional context.

This combined analysis is managed in real time (i.e., while the user waits) by the processor 104-A, which cooperates with modules like the relationship establishment module 116 to track statements or amendments that could lead to prosecution history estoppel. By doing so, the system can swiftly provide an attorney with references to limitations that might apply to the infringement analysis. The user interface interaction module 118 and real-time feedback module 140 then present these insights, enabling the user to see at a glance how potential infringing products map to patented features—without manually sifting through volumes of documents. For example, the list of potential infringers could be enriched by concurrently analyzing competitor patent filings or marketing materials. Should the system identify relevant product features from these sources, semantic relationship analysis module 126 or feature extraction module 124 may automatically link them back to claims in the subject patent. This entire orchestration—facilitated by adaptive AI pipelines within machine learning operation module 146—allows the attorney to quickly discern infringement likelihood, potential design-around strategies, and any disclaimers or estoppel issues in the file history. Ultimately, the architecture in FIG. 1 unites these modules to deliver far-reaching improvements in speed, consistency, and accuracy for patent infringement analysis. Further, for example, the list of potential infringers could be processed additionally. For example, the present techniques may include a set of computer-executable instructions for implementing named-entity recognition. Any identified companies and/or products could be passed to a web spider application. The web spider application may retrieve additional documents (e.g., a spec sheet for a given product, marketing materials, a product announcement, a patent application, etc.). The web spider application may extract information from the retrieved documents and pass the information along with additional prompts into a pre-trained and/or fine-tuned model to perform additional analysis. For example, in some aspects a customized model may be trained to generate claim charts in which the claims provided in the input of FIG. 7A are programmatically mapped to elements identified in the retrieval based on a comparison to entities identified in the output shown in FIG. 7B.

Beyond identifying potentially infringing products, the techniques of FIGS. 7A and 7B are also applicable to researching infringement contentions. In another exemplary scenario, the computing system 102-A (as illustrated in FIG. 1) may be employed to perform infringement defense analysis by processing extensive volumes of file history records stored in PDF format. Often, an alleged patent may have 20 or more sibling applications within a larger patent family. Any single one of these file histories, office actions, or examiner interview summaries may contain a statement or amendment bearing on claim construction or prosecution history estoppel. Historically, identifying such a statement demanded substantial human labor, as counsel painstakingly searched hundreds—or even thousands—of pages. In contrast, the present techniques significantly accelerate and automate that review, offering clear technological improvements.

Specifically, the system orchestrates parallel ingestion of file histories using input data analysis module 112, which breaks large PDF documents into text-extracted segments (via OCR or embedded text). The data model population module 114 then stores each segment, along with relevant metadata (filing date, claims referenced, attorney arguments), in the electronic database 160-A. In parallel, the relationship establishment module 116 creates semantic mappings, cross-linking each segment to identified patent claims and siblings. This concurrency is further optimized by the NIC 106, allowing multiple worker nodes or containerized tasks—managed through message queue 160-B—to retrieve file history segments in parallel from either on-premise servers or cloud computing environments 180. Each worker applies machine learning operation module 146 to detect disclaimers, amendments, or arguments relevant to infringement defense or claim construction.

Through this distributed, concurrent architecture, the system can process gigabytes of patent family documents within a fraction of the time previously required. The real-time feedback module 140 can then alerts users when an especially pertinent statement (e.g., disclaiming certain scope or identifying an inventive feature) is discovered in any sibling application. By leveraging HPC and parallel tasks, the solution surpasses conventional serial workflows both in speed and in the computing systems' effective capacity to index, correlate, and cross-reference large patent families. This more than just "automates" a paralegal's reading of file histories; it enhances the underlying computational capabilities, culminating in eligible improvements that address technological hurdles (e.g., memory demands, parallel load balancing, CPU allocation, real-time searching) specifically tied to large-scale, data-intensive analyses. Thus, the system's novel architecture and parallel processing strategies provide a substantial, concrete upgrade in how computer systems perform infringement-defense tasks.

Automated Claim Chart Generation; Continuation Analysis

Figure 8A:
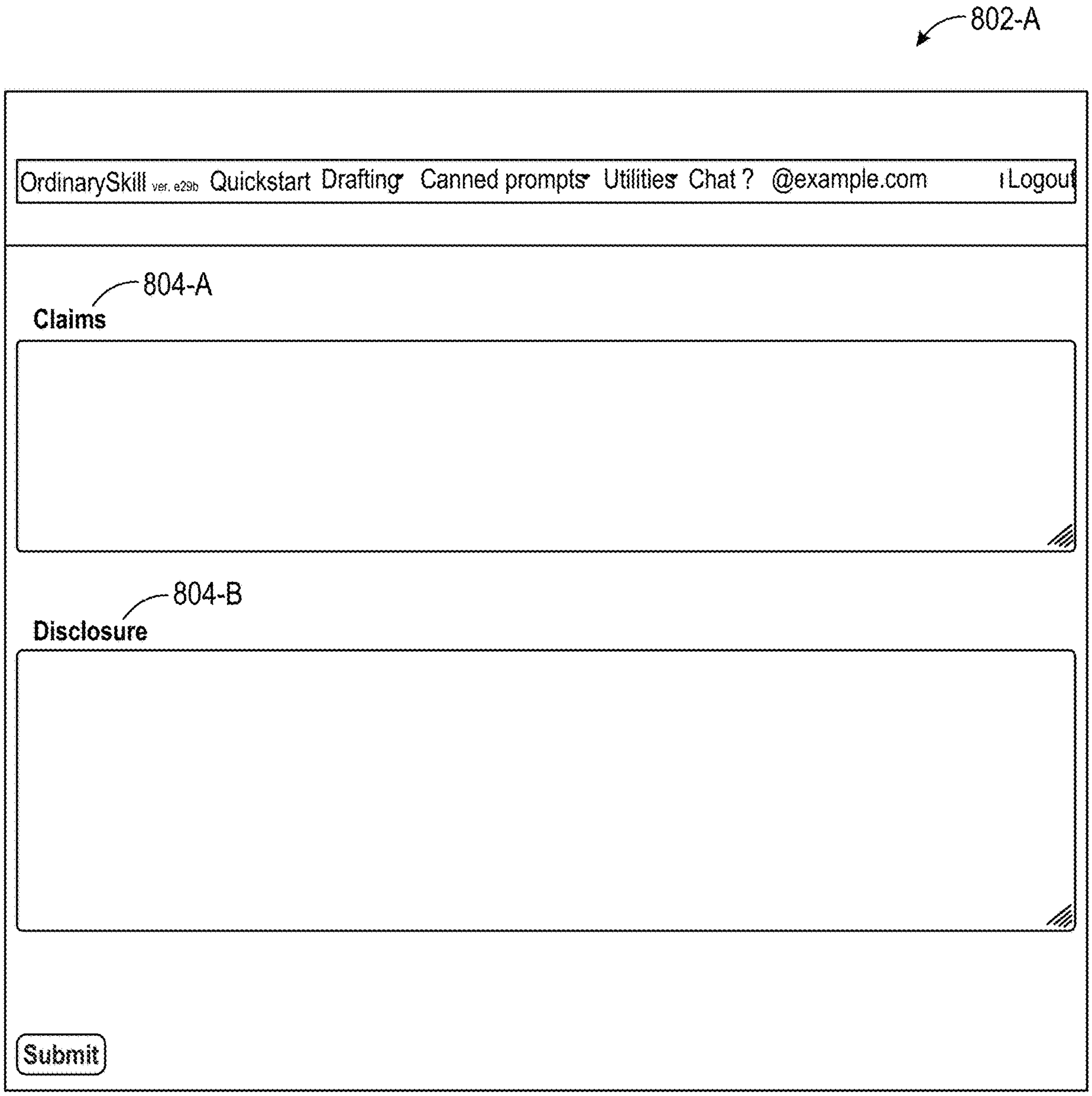
FIG. 8A depicts an automated claim chart generation GRAPHICAL USER INTERFACE, according to some aspects.

The present techniques are applicable to automated claim chart generation, as depicted in the automated claim chart generation GUI 802-A of FIG. 8A, which includes input claims 804-A and input disclosure/accused product 804-B, according to some aspects.

Figure 8B:
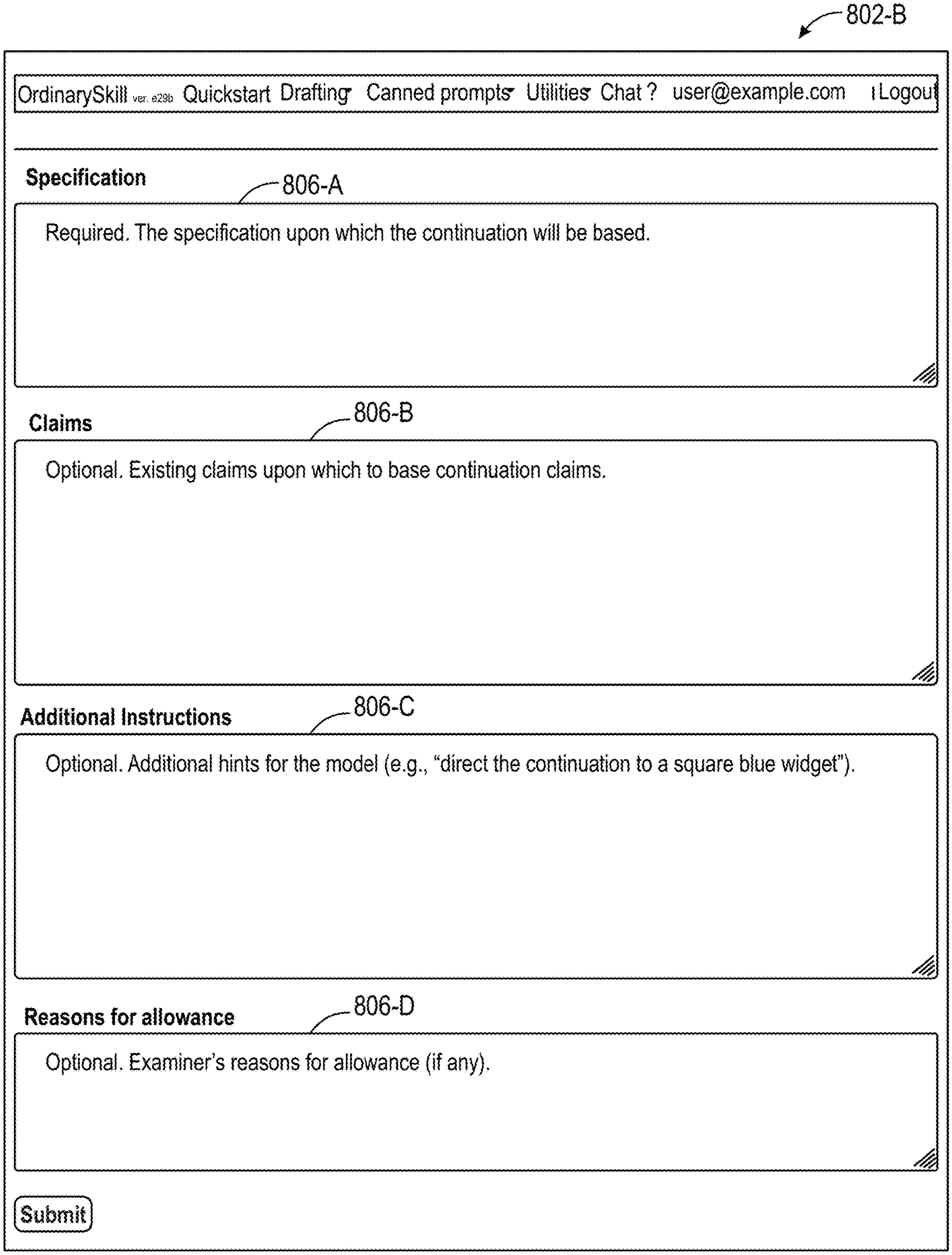
FIG. 8B depicts a continuation generation GRAPHICAL USER INTERFACE, according to some aspects.

Further, the present techniques are applicable to automated continuation analysis, as depicted in the continuation analysis GUI of FIG. 8B, which includes a specification input 806-A, a claims input 806-B, a hints field 806-C, and a reasons for allowance field 806-D, according to some aspects.

Other tested and validated use cases that may be integrated with the present techniques—some of which may use bespoke fine—tuned models-include: generating arguments based on prior art documents, claims, a patent disclosure, examiner contentions and a prompt; determining whether a given text includes explicit support for a claim amendment; developing arguments for: clarity; industrial applicability; inventive step; anticipation; obviousness; lack of written description; indefiniteness; generating claim amendments based on an application text, prior art and (optionally) examiner contentions; critiquing claims for stylistic, logical or other issues; generating a draft claim directly from an inventor-provided block-flow diagram; drafting prebuttals to potential 35 U.S.C. rejections/objections (or EPO strictures); brief drafting (models were fine-tuned to draft appeal briefs, pre-appeal briefs and reply briefs for filing before the PTAB); completing dependent claim drafts based on an independent claim; generating a draft patentability search/landscape request letter for transmission to an external patent art search firm based on an invention disclosure transcript; and directly generating claim amendments to a patent draft based on inventor feedback in the form of comments or a transcript. It should be appreciated that to perform each of the foregoing actions requires high competency with the discipline of prompt engineering, in addition to mastery of patent law concepts. The present techniques advantageously codify such knowledge and provide intuitive user interfaces with sensible defaults that enable users, in particular more inexperienced practitioners, to tackle difficult projects.

In addition to the foregoing, the present techniques may include or be extended to incorporate various additional features, each providing further technical advantages and workflow optimizations for the disclosed patent drafting and management environment. Several exemplary improvements are summarized below:

Checkbox or Configuration for Handling Specific Inputs

In some aspects, the computing system (e.g., computing system 102-A) provides a specialized checkbox or configuration selector that allows a user to designate particular types of input data requiring custom handling, such as mathematical equations, chemico-structural formulae, or specialized gene-sequence annotations. Upon user selection of the checkbox, the system may branch to a different or enhanced AI model pipeline better suited to parse, format, or interpret that specialized data. This process may include passing the specialized input to a local or cloud-based language model configured with advanced domain knowledge—e.g., a math-enabled model or a chemistry-trained model—ensuring accurate representation and reduced formatting errors. For instance, if a patent application references elaborate chemical structures, the system seamlessly switches to or augments the standard model pipeline with a chemistry-savvy model that can maintain chemical nomenclature and formatting rules with minimal manual intervention. This mechanism thus provides a direct, user-friendly method for triggering more advanced handling of domain-specific data, minimizing editing overhead and improving the reliability of specialized sections.

Rich Text Inputs

Another improvement includes enabling rich text inputs (e.g., bolding, italics, sub-or superscripts, special characters) throughout the user interfaces (e.g., user interface interaction module 118). By permitting such formatting at data-entry time, the system can carry forward the enriched text presentation through the entire pipeline, ultimately generating a patent document or other legal document that preserves the user's chosen formatting, including highlight emphasis on specific claim elements or certain disclaimers. Users might, for example, italicize compositional details or bold certain apparatus features to emphasize distinctions over prior art. The system ensures that these textual enhancements remain embedded as semantic cues within the underlying data model, thereby facilitating accurate final output in PDF, Word, or HTML exports. Additionally, the system may apply logic to ensure that advanced formatting does not conflict with patent office guidelines (e.g., disallowing color text or requiring standardized paragraph numbering), prompting user confirmations where needed.

Persistent Prompts Across Sessions

Conventional chat-based patent drafting occasionally requires repeated re-entry of the same prompt instructions upon each login or across separate drafting tasks. The present techniques incorporate persistent prompt storage that automatically associates user-created prompts with their user profile or client record. Once a practitioner crafts an effective prompt for drafting certain claim types or responding to a typical office action, it becomes permanently accessible in subsequent sessions, drastically reducing time spent reconstructing carefully tuned prompt text. Under the hood, dedicated memory structures or database fields store these prompts. Meanwhile, the user interface can retrieve them upon each login, bridging session boundaries for immediate re-use. Sessions may also be isolated to prevent cross-account or cross-client data bleed, ensuring that prompts remain confidential to suitable users and are not inadvertently exposed.

Social Prompt Sharing

Furthermore, the computing system includes an optional prompt-sharing layer, sometimes referred to as "social prompt sharing." With this layer, patent practitioners may voluntarily publish prompts they find particularly effective (e.g., for rejections of a certain statutory category) into a shared repository visible to colleagues. A robust governance mechanism ensures that only sanitized or anonymized prompts—those that do not contain confidential client details—are shared. This system allows attorneys to collaborate by refining and iterating upon each other's prompts, accelerating knowledge transfer and fostering consistent best practices. Additionally, the system may store revision histories and usage analytics, thereby revealing popular prompts and highlighting real-world effectiveness in generating successful drafting content.

Refinement for Statistical Tables

The present techniques may include improved handling for large or complex numerical tables, including result sets from experimental data, technical performance benchmarks, or prior art analyses. In response, the system can integrate table-parsing logic to automatically (1) preserve tabular structure when receiving large sets of data; (2) detect and reformat the table per patent office rules, which may disallow certain merged cells or color-coded formatting; (3) convert certain table cells into textual summaries for patent specifications, if so configured by the user. As part of machine learning operation module 146, specialized subroutines or prompt expansions can be triggered for "statistical table structured data," ensuring the final patent text remains consistent, comprehensible, and standards-compliant, while still retaining all essential numeric detail.

Improved Handling of Interdependent Figures

As described in the context of adaptive traversal, the system originally supports figure references across a directed acyclic graph (DAG). In some aspects, figure-to-figure references, included expansions wherein one figure is a magnified or exploded view of an element shown in another figure. To address these needs, the present system may creates explicit link objects in the data model capturing hierarchical figure relationships (e.g., "FIG. 3C is an enlarged view of portion 102 from FIG. 3B"). During document generation, the adaptive traversal module 132 ensures the child figure is not generated until after the parent figure has been assigned labels and reference numerals. The system then automatically cross-references the parent figure, guaranteeing the "magnified" or "detailed" figure is integrated seamlessly. This improvement significantly reduces user overhead in manually re-labeling or copy-pasting references between complex figure sets.

Chat Improvement for Session Isolation

Another enhancement pertains to the chat interface, especially regarding session memory between tasks. Rather than risking contamination from a prior user conversation into a new task, the system formalizes session isolation. Each user session obtains a uniquely identified context buffer, clearing or re-initializing upon the user's explicit command or each newly created matter. If the user requires continuity (e.g., same matter), they can link to a prior context buffer via a "merge session" action. This ensures that multiple chat windows from the same user or across different matters do not inadvertently mix references or drafting instructions, preventing confusion and maintaining clear contextual boundaries. Additionally, the system allows administrators to define per-user or per-client session retention times for compliance or confidentiality reasons.

Enhanced Prompt Engineering Documentation

The present techniques may include robust contextual guidance on advanced prompt engineering—i.e., systematically crafted inputs that yield superior language model outputs for patent drafting, prosecution arguments, or litigation analysis. In some aspects, the computing system's user interface includes an integrated knowledge base with tiered documentation. Beginner guides may show how to structure straightforward prompts, while advanced references detail chain-of-thought prompting, function calling, or agent-based iterative design techniques. Example prompts (e.g., "Draft an office action response addressing a 35 U.S.C.

§ 102 rejection . . . ") come preloaded, with variations for different rejections or client styles. The knowledge base, in synergy with social prompt sharing, fosters a collaborative space where best practices evolve continually to meet the fast-changing demands of AI-based patent drafting.

AI-Based Style Parameter for Subject Matter Eligibility (e.g., 35 U.S.C. § 101) Arguments To address frequent requests for specialized compliance with "patentable subject matter" provisions—particularly in software or business-method contexts—users can optionally enable an "AI-based style parameter" for generating or bolstering 35 U.S.C. § 101 arguments. Upon activating these parameters, the system automatically tailors prompts to incorporate best practices gleaned from extensive training data on eligibility jurisprudence, e.g., referencing controlling case law or known patterns for demonstrating "technical improvements." The style parameters may be fine-tuned per technology, so that high-level disclaimers or specific disclaimers are included, proactively addressing potential examiner rejections. This feature provides immediate language expansions (i.e., recommended disclaimers or "significantly more" analyses) that the user can integrate into claims or specification to reinforce subject matter eligibility arguments.

Exemplary Conflict Filtering—by User or Other Criteria

Tools that may be used for litigation purposes or for investigative work such as the potential infringer identification tool above may raise ethical concerns for legal practitioners, for example related to conflicts. Specifically, even fictional claim such as the one above could potentially implicate a client of a law firm using the present techniques. Thus, in some aspects, a User model may be introduced to the web application that includes a web session of the user using the web application. The present techniques may augment the prompt to exclude a list of names of existing firm clients, either globally, or on a per-user or per-firm structure basis. In this manner, the results may be effectively conflict-filtered. This may include filtering out subsidiaries. The filters may apply to the company filter as well, to avoid specific targeting of any particular client.

Potential Business Development Analysis

A related, but slightly different, concept to identifying potential infringers is that of identifying potential business development prospects. A user interface such as the one above may be presented to the user. The user may provide a description of a client or a description of an area of business. The prompt may cause the model to analyze the claims and to identify companies whose inventions are likely to read on the claims or description. In this manner, the user can generate clues for enterprising attorneys to follow for new business development, especially in pursuit of prospects that are off the beaten path/not household names.

Empirical testing has shown that the present techniques significantly improve productivity. Other benefits include: enabling drafting resources can be reallocated to other, more profitable work; enabling associates can work on projects that involve less drudgery, making them happier and more productive; enabling a firm to take work that may not be economically viable; and generating more consistent and reliable work product, leading to much higher client satisfaction.

What is claimed is:

1. A computer-implemented method for generating patent document sections by adaptive traversal of a dependency-aware graph structure, the computer-implemented method comprising:

receiving multimodal input data comprising technical disclosures related to patent drafting, prosecution, or litigation;

analyzing the multimodal input data using one or more artificial intelligence models trained to identify inventive concepts, logical sections of a patent document, and dependencies among the logical sections;

constructing the dependency-aware graph structure representing the dependencies among the logical sections, wherein each node of the dependency-aware graph structure corresponds to a respective identified logical section, and wherein at least one directed edge of the dependency-aware graph structure represents a dependency relationship from a source node to a target node, the dependency relationship specifying that the target node is eligible for generation after generated section output corresponding to the source node is generated;

dynamically determining an optimized traversal sequence for generating patent document sections by:

selecting an initial generation node that is not required by the dependency-aware graph structure to be generated after another node, and selecting, after generating section output corresponding to the initial generation node, a dependent node connected to the initial generation node by a directed edge of the dependency-aware graph structure, wherein the optimized traversal sequence is automatically updated in response to user modifications to any patent document section;

generating the patent document sections according to the optimized traversal sequence by, for at least one node selected during the adaptive traversal:

accessing an artificial intelligence model identifier and one or more model parameters associated with the at least one node, and invoking an artificial intelligence model identified by the artificial intelligence model identifier using the one or more model parameters to generate section output corresponding to the at least one node; and causing the patent document sections to be displayed via an interactive graphical user interface, wherein the interactive graphical user interface propagates user modifications across dependent sections.

2. The computer-implemented method of claim 1, further comprising:

applying a style transfer model trained on historical user-specific patent drafting examples to conform the patent document sections to user-specific drafting patterns.

3. The computer-implemented method of claim 1, further comprising:

automatically retrieving one or more contextually relevant prior art references or technical materials from a vector database based on semantic similarity with the multimodal input data.

4. The computer-implemented method of claim 3, further comprising:

integrating portions of the one or more contextually relevant prior art references or technical materials into the patent document sections.

5. The computer-implemented method of claim 1, further comprising:

generating real-time feedback suggestions to address detected inconsistencies, claim-scope ambiguities, or antecedent-basis errors in the patent document sections.

6. The computer-implemented method of claim 1, further comprising:

translating and formatting the patent document sections to comply with jurisdiction-specific patent office filing rules.

7. The computer-implemented method of claim 1, further comprising:

continuously updating the one or more artificial intelligence models based on user edits to the patent document sections.

8. The computer-implemented method of claim 1, wherein the patent document sections comprise sections of an Office action response template, and further comprising:

retrieving an Office action in a patent prosecution matter;

analyzing the Office action using at least one of the one or more artificial intelligence models to generate a plurality of response strategies for responding to the Office action;

causing at least one of the plurality of response strategies and the Office action response template to be displayed via the interactive graphical user interface; and responsive to receiving a user selection of the at least one of the plurality of response strategies through the interactive graphical user interface, generating section output for a node corresponding to a section of the Office action response template based on the at least one of the plurality of response strategies.

9. The computer-implemented method of claim 1, wherein the multimodal input data comprises a digital image, and further comprising:

providing the digital image to a first artificial intelligence model;

generating, using the first artificial intelligence model, an analysis of the digital image;

causing the analysis of the digital image to be displayed via the interactive graphical user interface;

receiving, through the interactive graphical user interface, a primary user input adjusting the analysis of the digital image to form a user-adjusted analysis;

providing the user-adjusted analysis to a second artificial intelligence model; and generating, using the second artificial intelligence model, section output for a node corresponding to at least one of the patent document sections based on the user-adjusted analysis.

10. A computing system, comprising:

one or more processors; and one or more memories, having stored thereon computer-executable instructions that, when executed, cause the computing system to:

receive, via the one or more processors, multimodal input data related to patent drafting, prosecution, or litigation;

process, via a trained machine learning model, the multimodal input data to extract inventive concepts and identify logical document sections;

construct, via the one or more processors, a dependency-aware graph structure representing logical dependencies among the logical document sections, wherein each node of the dependency-aware graph structure corresponds to a respective identified logical section, and wherein at least one directed edge of the dependency-aware graph structure represents a dependency relationship from a source node to a target node, the dependency relationship specifying that the target node is eligible for generation after generated section output corresponding to the source node is generated;

dynamically determine an optimized traversal sequence for generating patent document sections by:

selecting an initial generation node that is not required by the dependency-aware graph structure to be generated after another node, and selecting, after generating section output corresponding to the initial generation node, a dependent node connected to the initial generation node by a directed edge of the dependency-aware graph structure, wherein the optimized traversal sequence is automatically updated in response to user modifications to any patent document section;

generate, via the one or more processors, the patent document sections according to the optimized traversal sequence by, for at least one node selected during an adaptive traversal of the dependency-aware graph structure:

accessing an artificial intelligence model identifier and one or more model parameters associated with the at least one node, and invoking an artificial intelligence model identified by the artificial intelligence model identifier using the one or more model parameters to generate section output corresponding to the at least one node;

cause, via the one or more processors, the patent document sections to be displayed via an interactive graphical user interface; and propagate user modifications throughout dependent sections.

11. The computing system of claim 10, the one or more memories having stored thereon computer-executable instructions that, when executed, cause the computing system to:

apply a style transfer model trained on historical user-specific patent drafting examples to conform the patent document sections to user-specific drafting patterns.

12. The computing system of claim 10, the one or more memories having stored thereon computer-executable instructions that, when executed, cause the computing system to:

access and retrieve semantically relevant prior art documents or technical materials from a vector database.

13. The computing system of claim 12, the one or more memories having stored thereon computer-executable instructions that, when executed, cause the computing system to:

integrate portions of the semantically relevant prior art documents or technical materials into the patent document sections.

14. The computing system of claim 10, the one or more memories having stored thereon computer-executable instructions that, when executed, cause the computing system to:

detect and suggest corrections for drafting inconsistencies, claim ambiguities, or antecedent-basis errors in real-time as a user modifies patent document sections.

15. The computing system of claim 10, the one or more memories having stored thereon computer-executable instructions that, when executed, cause the computing system to:

translate and adapt generated patent document sections to comply with one or more filing requirements of one or more international patent jurisdictions.

16. The computing system of claim 10, the one or more memories having stored thereon computer-executable instructions that, when executed, cause the computing system to:

periodically update and retrain an artificial neural network model based on user edits and feedback during patent drafting sessions.

17. A non-transitory computer-readable medium having stored thereon computer-executable instructions that, when executed by a one or more processors, cause a computer to:

receive multimodal input data including invention disclosures, prosecution arguments, or litigation evidence;

process the multimodal input data to extract inventive concepts and identify logical document sections;

construct a dependency-aware graph structure representing logical dependencies among the logical document sections, wherein each node of the dependency-aware graph structure corresponds to a respective identified logical section, and wherein at least one directed edge of the dependency-aware graph structure represents a dependency relationship from a source node to a target node, the dependency relationship specifying that the target node is eligible for generation after generated section output corresponding to the source node is generated;

dynamically determine an optimized traversal sequence for generating patent document sections by:

selecting an initial generation node that is not required by the dependency-aware graph structure to be generated after another node, and selecting, after generating section output corresponding to the initial generation node, a dependent node connected to the initial generation node by a directed edge of the dependency-aware graph structure, wherein the optimized traversal sequence is automatically updated in response to user modifications to any patent document section;

generate patent document sections according to the optimized traversal sequence by, for at least one node selected during an adaptive traversal of the dependency-aware graph structure:

accessing an artificial intelligence model identifier and one or more model parameters associated with the at least one node, and invoking an artificial intelligence model identified by the artificial intelligence model identifier using the one or more model parameters to generate section output corresponding to the at least one node; and cause the patent document sections to be displayed within an interactive graphical user interface configured to propagate real-time user modifications across dependent sections.

18. The non-transitory computer-readable medium of claim 17, wherein the computer-executable instructions further cause the one or more processors to apply a style transfer model trained on historical user-specific patent drafting examples to conform generated patent document sections to user-specific drafting patterns.

19. The non-transitory computer-readable medium of claim 17, wherein the computer-executable instructions further cause the one or more processors to automatically retrieve semantically related prior art documents or technical disclosures from a vector database.

20. The non-transitory computer-readable medium of claim 19, wherein the computer-executable instructions further cause the one or more processors to integrate retrieved prior art documents or technical disclosures into the patent document sections.

21. The non-transitory computer-readable medium of claim 17, wherein the computer-executable instructions further cause the one or more processors to translate and format the patent document sections according to jurisdiction-specific patent filing standards.

22. The non-transitory computer-readable medium of claim 17, wherein the computer-executable instructions further cause the one or more processors to continuously refine the adaptive traversal by retraining associated neural network models based on user edits and historical patent prosecution outcomes.

* * * * *